US006650462B2

(12) United States Patent
Katase

(10) Patent No.: US 6,650,462 B2
(45) Date of Patent: Nov. 18, 2003

(54) METHOD AND CIRCUIT FOR DRIVING ELECTROPHORETIC DISPLAY AND ELECTRONIC DEVICE USING SAME

(75) Inventor: Makoto Katase, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 95 days.

(21) Appl. No.: 09/884,093

(22) Filed: Jun. 20, 2001

(65) Prior Publication Data

US 2002/0021483 A1 Feb. 21, 2002

(30) Foreign Application Priority Data

Jun. 22, 2000 (JP) ....................................... 2000-187923
Aug. 4, 2000 (JP) ....................................... 2000-237090
Jun. 19, 2001 (JP) ....................................... 2001-185566

(51) Int. Cl.[7] ........................... G02B 26/00; G09G 3/34
(52) U.S. Cl. ....................... 359/296; 359/290; 359/238; 345/107; 345/86
(58) Field of Search ................................ 359/296, 290, 359/238, 297; 345/107, 86, 60, 84, 85

(56) References Cited

U.S. PATENT DOCUMENTS 3,668,106 A 6/1972 Ota ............................ 358/305
6,177,921 B1 * 1/2001 Comiskey et al. .......... 345/107
6,369,792 B1 * 4/2002 Kikinis ....................... 345/107
2002/0141801 A1 * 10/2002 Shimoda et al. .............. 400/76

FOREIGN PATENT DOCUMENTS

JP 49-32038 8/1974
JP 50-15115 6/1975

OTHER PUBLICATIONS

Kawai, "Microcapsule–type Electrophoretic Display (MC–EPD)", Japan Hardcopy, pp. 237–240, 1999.

Kawai, "Microcapsule–type Electrophoretic Display (MC–EPD)", Journal of the Imaging Society of Japan, vol. 38, No. 2, pp. 51–56, 1999.

* cited by examiner

*Primary Examiner*—Jordan M. Schwartz
*Assistant Examiner*—Tim Thompson
(74) *Attorney, Agent, or Firm*—Oliff & Berridge, PLC

(57) ABSTRACT

An active matrix electrophoretic display is driven. In a reset period Tr a reset voltage is applied to each pixel electrode. Next, in a writing period an applied voltage is applied to each of said pixel electrode during a time period corresponding to a gradation value designated by an image data. Next, a common voltage is applied to each of said pixel electrode, so that electric charge accumulated in each capacitor is taken away and no electric field is applied to each dispersal system, thereby a displayed image is held.

19 Claims, 50 Drawing Sheets

FIG. 34

| ROW \ COLUMN | 1 | 2 | … | j | … | n |
|---|---|---|---|---|---|---|
| 1 | | | … | | … | |
| 2 | | | … | | … | |
| ⋮ | ⋮ | ⋮ | ⋱ | | ⋰ | ⋮ |
| i | | | … | | … | |
| i+1 | | | … | | … | |
| i+2 | | | … | 1 | … | |
| i+3 | | | … | | … | |
| ⋮ | | ⋮ | ⋰ | | ⋱ | ⋮ |
| 128 | | | … | | … | |

FIG. 35

| ROW \ COLUMN | 1 | 2 | … | i | i+1 | i+2 | i+3 | … | 64 | 65 | … | 128 |
|---|---|---|---|---|---|---|---|---|---|---|---|---|
| 1 | 1 | | … | | | | | … | | 0 | … | |
| 2 | | 1 | … | | | | | … | | 0 | … | |
| ⋮ | ⋮ | ⋮ | ⋱ | ⋮ | ⋮ | ⋮ | ⋮ | ⋰ | ⋮ | 0 | ⋰ | |
| i | | | … | 1 | | | 1 | … | | 0 | … | |
| i+1 | | | … | | 1 | | | … | | | … | |
| i+2 | | | … | | | 1 | | … | | | … | |
| i+3 | | | … | | | | 1 | … | | | … | |
| ⋮ | ⋮ | ⋮ | ⋰ | ⋮ | ⋮ | ⋮ | ⋮ | ⋱ | | | ⋱ | |
| 64 | | | … | | | | | … | 1 | | … | |

LOWER BITS STORAGE AREA

UPPER BITS STORAGE AREA

| Cr | YCK1 | Dbj | Xj |
|---|---|---|---|
| L | L | L | HIGH-IMPEDANCE |
| L | L | H | Vcom |
| L | H | L | Va |
| L | H | H | Va |
| H | L | L | Vrest |
| H | L | H | Vrest |
| H | H | L | Vrest |
| H | H | H | Vrest |

FIG. 49

| Cr | YCK1 | Ddbj | | Xj |
|---|---|---|---|---|
| | | LOWER BITS | UPPER BITS | |
| L | L | L | L or H | HIGH-IMPEDANCE |
| L | L | H | L or H | Vcom |
| L | H | L | L (0) | +Va |
| | | | H (1) | -Va |
| L | H | H | L (0) | +Va |
| | | | H (1) | -Va |
| H | L | L | L or H | Vrest |
| H | L | H | L or H | Vrest |
| H | H | L | L or H | Vrest |
| H | H | H | L or H | Vrest |

METHOD AND CIRCUIT FOR DRIVING ELECTROPHORETIC DISPLAY AND ELECTRONIC DEVICE USING SAME

TECHNICAL FIELD

The present invention relates to a method for driving an electrophoretic display which has dispersal systems comprised of pigment particles, a drive circuit for the display, and an electronic device in which the display is used.

BACKGROUND ART

Electrophoretic displays utilizing electrophoresis are classed as non-luminous devices. In electrophoresis, pigment particles migrate under the action of a Coulomb force which is generated when an electrostatic field is applied to a dielectric fluid in which the particles are dispersed.

In the conventional art, electrophoretic displays are known which consist of a pair of panels or substrates spaced apart in opposing relation, each of which is provided with an electrode. Between these electrodes a dyed dielectric fluid is provided. Differing voltages are applied via a switching element to the electrodes to generate an electrostatic field in the dielectric fluid, causing the electrically charged pigment particles to migrate in the direction of the applied field. Suspended in the fluid are particles having a pigment color different to the fluid in which they are suspended (hereinafter referred to simply as particles).

However, prior art electrophoretic displays suffer from a problem in that they afford poor viewing characteristics. The present invention has been made to overcome this problem, and provides for the first time an active matrix electrophoretic display, which display has superior viewing characteristics. As stated above, the object of the present invention is to provide an active matrix electrophoretic display. Also provided is a drive circuit integral to the device, and a method for driving the display by using the circuit.

DISCLOSURE OF INVENTION

The method of the present invention is applied to an electrophoretic display. The electrophoretic display comprises a first electrode, a plurality of second electrodes and a plurality of dispersal systems. The dispersal systems comprise a colored fluid in which pigment particles are suspended. A dispersal system is provided between the first electrode and each of one of the second electrodes. An electrostatic field is applied between the first and second electrodes for a predetermined time to cause the particles to migrate to a desired position corresponding to a color gradation of an image to be displayed.

In the method of the present invention, a constant voltage is applied for a set period of time which is calculated on the basis of a difference between a current average position of pigment particles and a subsequent desired position. By continually updating a voltage gradient using these position parameters, positions of pigment particles can be updated without the need for an initialization step. Since no initialization step is required, display updates can be affected rapidly. After applying the constant voltage to migrate particles to a desired position, the electrostatic field is removed and the particles become static, thereby providing desired display characteristics.

In the method and device of the present invention, to further improve display image characteristics, it is preferable for there to be variations in the properties of pigment particles employed. It should be further noted that when a voltage differential is cancelled between the 1st and a 2nd electrode by applying a constant voltage to make the pigment particles static, a capacitor formed by the 1st and 2nd electrode and the dispersal system functions to discharge an accumulated electric charge.

Furthermore, it is preferable before canceling a differential voltage between the electrodes to apply a differential voltage or brake voltage between the electrodes to brake movement of the particles. This is particularly important in the case that minimal fluid resistance acts against pigment particles, since, in such a case, there is significant inertial movement of particles and pronounced display fluctuations. This method enables to halt particles rapidly because the brake voltage is applied.

Since a direction of motion of a particle is determined by a direction of an applied electrostatic field, an applied brake voltage preferably has an opposite polarity to that of an initial voltage applied.

When applying a voltage between the 1st and 2nd electrodes, it is preferable that a time period for which the voltage is applied be measured against a reference time, so that in the event that the former time exceeds the latter, the voltage can be applied again, to prevent sedimentation or rising of pigment particles under gravity. In this way, display image characteristics provided by the method and device of the present invention can be maintained effectively.

A method of the present invention is employed in an electrophoretic display which comprises a plurality of data lines, a plurality of scanning lines each of which intersects each of the data lines, a common electrode, a plurality of pixel electrodes each of which is provided at each intersection spaced in opposing relation to the common electrode, a plurality of dispersal systems, each one of which comprises a colored fluid in which pigment particles are suspended, each of the systems being provided between the common electrode and one of the pixel electrodes, and a plurality of switching elements; with one of each of the switching elements being provided at a corresponding one of each of the intersections of the data lines and the scanning lines; with an on/off control terminal being connected to one of the scanning lines passing through one of the intersections; and with one of the data lines passing through one of the intersections, being connected to one of the pixel electrodes provided at each of one of the intersections.

The method comprises applying a predetermined common voltage to the first, common, electrode, selecting the scanning lines sequentially, applying a voltage during a predetermined time period to the selected scanning lines, to turn on all switching elements connected to the selected scanning lines, applying a constant voltage to each of the data lines for a set time period to migrate particles of each of corresponding pixels, and which are provided at the intersection of the data line and the selected scanning line, to attain a desired color gradation of an image to be displayed, and finally applying the common, first, voltage to the selected scanning lines.

It is to be noted that in the present invention, a constant voltage is applied as required, via switching elements, to respective pixel electrodes, over a set period of time, to attain a desired gradation of a displayed image. In addition, a common voltage is applied to the pixel electrodes to remove an electric charge accumulated between the electrodes, whereby an electrostatic field acting between the electrodes is removed, to fix a position of the particles, thereby creating a matrix in the electrophoretic display.

Furthermore, it is also possible to apply a brake voltage to a data line to brake particle motion before applying a common voltage to the data line, thus enabling particle movement to be halted rapidly. A method of the present invention is employed for an electrophoretic display which comprises a plurality of data lines, a plurality of scanning lines each of which intersects each of the data lines, a common electrode, a plurality of pixel electrodes each of which is provided at each intersection being spaced in opposing relation to the common electrode, a plurality of dispersal systems each one of which comprising a colored fluid in which pigment particles are suspended provided, each one of the systems being provided between the common electrode and one of the pixel electrodes, and a plurality of switching elements, with one of each of the switching elements being provided at a corresponding one of each of the intersections of the data lines and the scanning lines, with an on/off control terminal being connected to one of the scanning lines passing through one of the intersections; and with one of the data lines passing through one of the intersections, being connected to one of the pixel electrodes provided at each of one the intersections.further comprises applying a predetermined voltage to the first, common, electrode; applying a selection voltage to turn on all switching elements connected to a selected scanning line during a first period in one horizontal line scan; applying a constant voltage to data lines during the 1st period; and if a color gradation of a pixel to be displayed is not attained within a period during which the constant voltage is applied, selecting a scanning line corresponding to pixels in a 2nd period in the horizontal scan; and, further, applying the voltage to only a data line corresponding to the pixels in the second period.

In this invention, after applying the constant voltage to the pixel electrodes, the corresponding switching elements are turned off. The voltage applied is maintained as an accumulated charge between the electrodes. Once a set time period passes for attaining a desired color gradation of an image to be displayed, the switching elements are turned on again to apply the common voltage, and thus remove the electrostatic field acting between the electrodes. By using this method, a constant voltage can be applied over a longer period, and it is therefore possible to drive the data lines using a low voltage.

A method of the present invention is employed for an electrophoretic display which comprises a plurality of data lines, a plurality of scanning lines each of which intersects each of the data lines, a common electrode, a plurality of pixel electrodes each of which is provided at each intersection being spaced in opposing relation to the common electrode, a plurality of dispersal systems each one of which comprising a colored fluid in which pigment particles are suspended provided, each one of the systems being provided between the common electrode and one of the pixel electrodes, and a plurality of switching elements, with one of each of the switching elements being provided at a corresponding one of each of the intersections of the data lines and the scanning lines, with an on/off control terminal being connected to one of the scanning lines passing through one of the intersections; and with one of the data lines passing through one of the intersections, being connected to one of the pixel electrodes provided at each of one the intersections. The method comprising applying a predetermined voltage to the common electrode, applying a selection voltage to turn on all switching elements connected to the selected scanning line during a 1st period in a horizontal line scanning, applying a constant voltage to the data lines during the period, if a time to attain a color gradation of a pixel to be displayed passes after finishing applying the constant voltage, selecting the scanning line corresponding to the pixels during a 2nd period in the horizontal line scanning, applying the selection voltage to the selected scanning line, applying a brake voltage to brake a motion of the particles to only a selected data line corresponding to pixels in a selected period, and, after the particle movement is halted, selecting a scanning line corresponding to the pixels to apply the voltage to only the selected data line during a 3rd period of horizontal line scanning; and, finally, applying the common voltage to the data lines of pixel electrodes corresponding to pixels selected during the 3rd period.

Since, in the method of the present invention, it is possible to hold both the constant voltage and the brake voltage within one horizontal line scan, it is possible to lower not only an applied constant voltage, but also a brake voltage.

A drive circuit of the present invention is designed for use with an electrophoretic display, the drive circuit comprising a voltage application unit for applying a common voltage to the common electrode; a scanning line drive unit for selecting scanning lines sequentially, and applying a selection voltage to turn on all switching elements connected to those selected scanning lines; a data line drive unit for applying a constant voltage to respective data lines during a time period in which migration of particles of the pixel to a desired position can be effected to thereby attain a desired color gradation of an image to be displayed, and which applies the common voltage to the respective data lines.

In the present invention, a constant voltage is applied, as required, during a set period of time, via switching elements, to respective pixel electrodes to thereby attain a desired color gradation of a displayed image. Namely, by using the method and circuit of the present invention for driving an electrophoretic display, a matrix is created.

In addition, the common voltage is applied to the pixel electrode to remove an electric charge accumulated between the common electrode and the pixel electrodes after the switching elements are turned off, thereby removing an electrostatic field between the electrodes and fixing a position of the particles, to maintain a displayed image.

Furthermore, it is also possible to apply a brake voltage to each data line to brake particle motion after applying the constant voltage to the data lines, and before applying the common voltage to the data line, to halt particle movement rapidly.

A drive circuit of the present invention is utilized for an electrophoretic display and has a voltage application unit for applying a predetermined common voltage; a scanning drive unit which, during a 1st time period in each horizontal scan, selects scanning lines sequentially, by applying a selection voltage to turn on all switching elements connected to the selected scanning line, and when a time required for attaining a color gradation of a pixel to be displayed passes after finishing applying the selection voltage, selecting the scanning line corresponding to the pixel during a 2nd period of each horizontal line scanning, and applies the selection voltage to the selected scanning line; and a data line drive unit which applies the constant voltage to all the data lines during a 1 st period of each horizontal scan and applies the common voltage to the data line corresponding to the pixel.

It is also possible to utilize the drive circuit of the present invention in an electrophoretic display. The circuit includes a voltage applying unit for applying a predetermined common voltage, and a scanning drive unit. Each horizontal scan consists of a 1st, 2nd, and 3rd time period. In a first time period scanning lines are selected sequentially. Next, a selection voltage is applied to turn on all switching elements connected to the selected scanning line; and, when a time required for attaining a color gradation of a pixel to be displayed passes after selection of a scanning line in the 1st time period, a the scanning line corresponding to the pixel during the 2nd time period in a horizontal scan in which the scanning line is selected, and applies the selection voltage to the selected scanning line, selects the scanning line in the 3rd time period in a horizontal scan after a predetermined time passes; and a data line drive unit which applies the constant voltage to all the data lines during the 1st time period in a horizontal scanning, applies a brake voltage to stop the particles rapidly in the 2nd time period in which the scanning line is selected, and applies the common voltage to the respective data lines in the 3rd time period in which the scanning line is selected.

It is preferable that, when an displayed image is being switched, a time period used when migrating pigment particles in a pixel to a position to attain a color gradation of the pixel corresponds to a difference between color gradations both before and after switching.

An electronic device of this invention has a display unit utilizing electrophoretic display. For example, an electronic book, personal computer, mobile phone, electronic advertising board, and electronic traffic sign.

BRIEF DESCRIPTION OF THE DRAWINGS

In the accompanying drawings:

FIG. 34 is a conceptual diagram showing the relation between the address of the first field memory 335 and the pixels;

FIG. 35 is a conceptual diagram showing the relation between the address of the second field memory 336 and the pixels;

FIG. 49 is a truth table of the selection unit Uj used in the PWM circuit 144C;

DETAILED DESCRIPTION OF THE PREFERRED EMBODIMENTS

Referring to the accompanying drawings, preferred embodiments of the present invention will now be described.

(1) First Embodiment

An electrophoretic display of the present embodiment displays an image according to an input image signal (VID). The display is capable of showing both static and animated images, but is particularly suited to showing static images.

(1-1) Outline of an Electrophoretic Display

Figure 1:
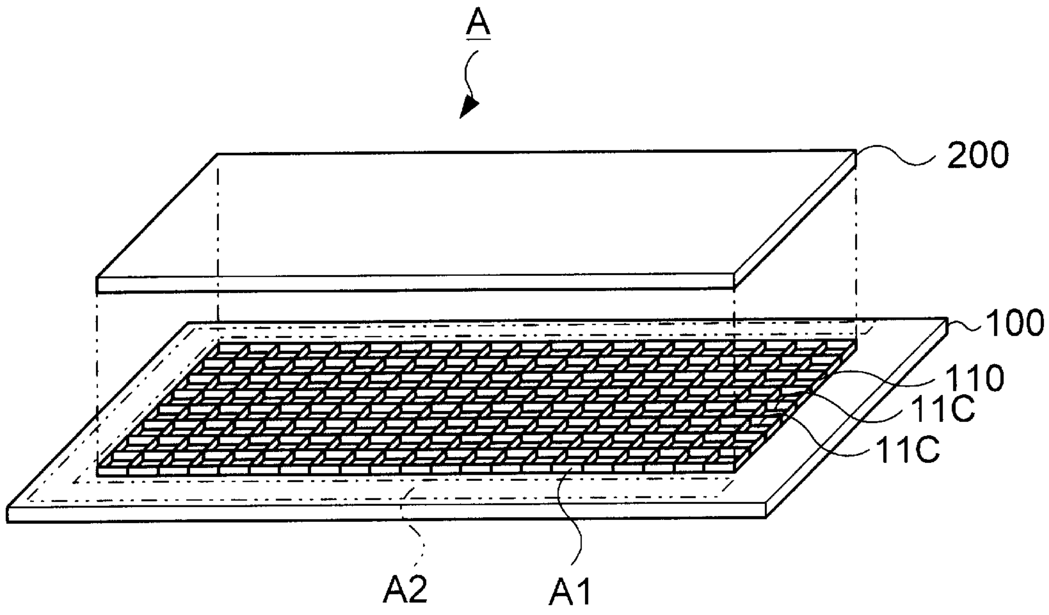
FIG. 1 is an exploded perspective view showing a mechanical configuration of an electrophoretic display panel based on the first embodiment of the present invention.
Figure 2:
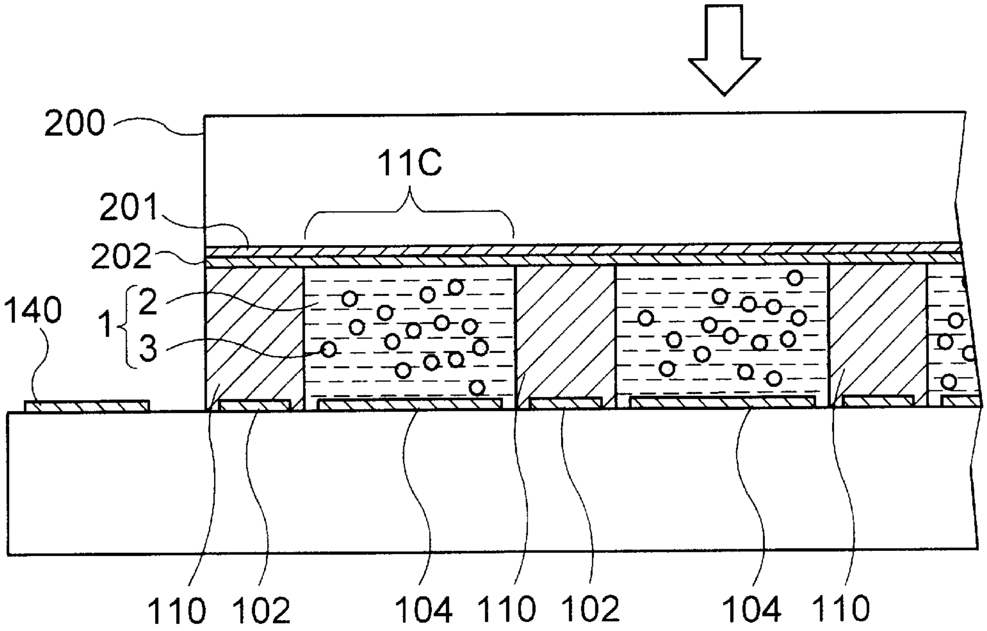
FIG. 2 is a partial sectional view of the panel.

An electrophoretic display base on this embodiment has an electrophoretic display and peripheral drive circuits. FIG. 1 is an exploded perspective view showing the mechanical configuration of an electrophoretic display panel A, according to the first embodiment of the present invention. FIG. 2 is a partial sectional view of the panel.

As shown in FIGS. 1 and 2, an electrophoretic display panel A has an element substrate 100 and an opposing substrate 200. Element substrate 100 is made of glass, a semiconductor or some other suitable materials. A plurality of pixel electrodes 104 and bulkheads 110 are formed on the element substrate. Opposing substrate 200 is made of glass or some other suitable transparent material. A common electrode 201 is formed on opposing substrate 200. The element substrate 100 and the opposing substrate 200 are cemented together, facing each other to form the electrophoretic display panel A. A plurality of dispersal systems are inserted between the element substrate 100 and opposing substrate 200. All bulkheads 110 have the same height, enabling the element substrate 100 and the opposing substrate 200 to be spaced at regular intervals. The opposing substrate 200, the common electrode 201 and a sealer 202 are each transparent. An observer views an image in the direction of the arrow shown in FIG. 2. Pigment particles 3 are suspended in a dielectric fluid 2 to form a dispersal system. If required, the dielectric fluid 2 can be provided with an additive such as a surface-active agent. In the dispersal system 1, to avoid sedimentation of pigment particles 3 under gravity, both the dielectric fluid 2 and pigment particles 3 are selected to be approximately equal in specific gravity to each other. The bulkheads 110 separate each pixel, each of which pixels constitutes a unit of an image. These spaces which are divided by the bulkheads 110 are referred to hereinafter as divided cells 11C. Each divided cell 11C is provided with a dispersal system 1. The range in which pigment particles 3 are able to migrate is thereby limited to the inner space of each divided cell 11C. In the dispersal system 1, migration of particles may be uneven or the particles may condense to form a cluster. However, using a plurality of divided cells 11C in the bulkhead 110 prevents such a phenomenon from occurring, and as a result the quality of images displayed can be improved. The dielectric fluid 2 can be dyed black, and the pigment particles 3 having a positive charge can consist of titanium oxide, which has a whitish color.

In electrophoretic display panel A, each pixel is capable of displaying one of the three primary colors (RGB). This is achieved by effecting three different types of dispersion in the dispersal system corresponding to R, G and B colors, respectively. Thus, when it is required to express dispersal system 1, dielectric fluid 2, and pigment particles 3 as a separate primary color each, subscripts "r," "g," and "b" are appended respectively to each element. Thus, in this embodiment, dispersal system 1*r* corresponding to R color has red particles as the pigment particles 3*r* and the dielectric fluid 2*r* is a cyanogen color medium. The pigment particles 3*r* can be made of iron oxide, for example. The dispersal system 1*g* corresponding to G color uses green particles as the pigment particles 3*g*, and the dielectric fluid 2*g* is a magenta-color medium. The pigment particles 3*g* are made of cobalt-green pigment particles, for example. The dispersal system 1*b* corresponding to B color uses blue particles as the pigment particles 3*b*, and the dielectric fluid 2*b* is a yellow medium. The pigment particles 3*b* can be made of cobalt-blue pigment particles, for example. That is, the pigment particles 3 that correspond to each color to be displayed are used, while the dielectric fluid 2 of a certain color (the complementary color, in this embodiment) that absorbs the color to be displayed is used.

If pigment particles 3 migrate towards to the display-surface-side electrode, they will reflect light of a wavelength corresponding to the color to be displayed. On the other hand, when the pigment particles 3 migrate to the opposite-side electrode to the display surface, light of a wavelength corresponding to the color to be displayed is absorbed by the dielectric fluid 2. In this case, such light will not be visible to a user, and therefore no color will be visible. Light intensity reaching a user is determined by the manner in which the dielectric fluid 2 absorbs the light reflected by the pigment particles 3.

In the present invention, an intensity of an electrostatic field applied to the dispersal system 1 determines how the pigment particles 3 are distributed in the direction of thickness of the dispersal system 3. The combined use of the pigment particles 3, the dielectric fluid 2 which absorbs light reflected by pigment particles 3, and controlling the dielectric field strength enables adjustment of light reflectance of a color. As a result, a strength of light reaching an observer can be controlled.

On the element substrate 100, the bulkheads 110 are formed in a display area A1. In the area, in addition to the pixel electrodes 104, thin film transistors (hereinafter, referred to as TFTs) are employed as scanning and data lines. Switching elements are also employed, and will be described later. In the peripheral area A2 of the surface of the element substrate 100, a scanning line drive circuit, a data line drive circuit, and externally connected electrodes, which will be described later, are formed.

Figure 3:
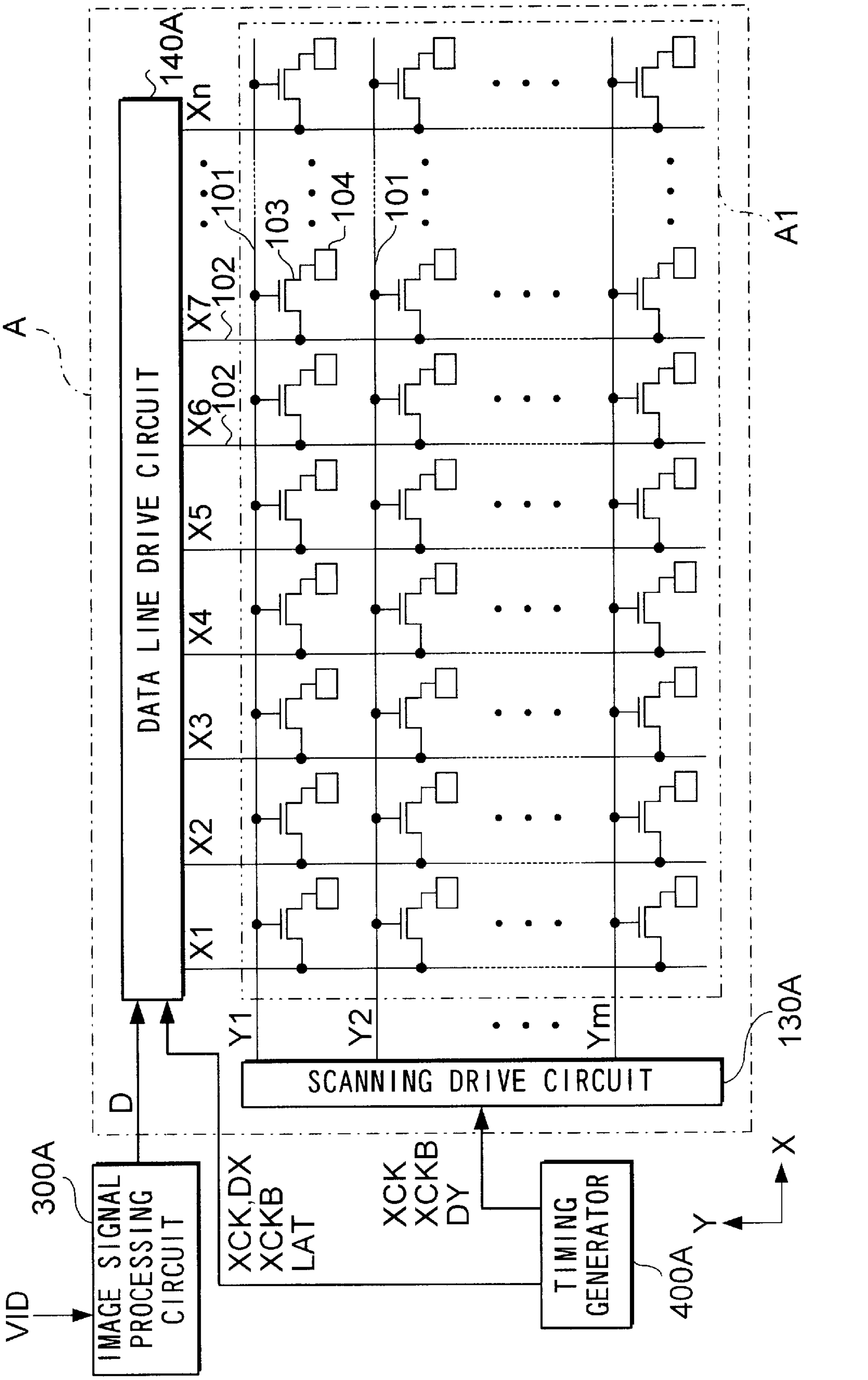
FIG. 3 is a block diagram of an electrical configuration of an electrophoretic display having the panel.

FIG. 3 is a block diagram showing the electrical configuration of the electrophoretic display. As shown, the electrophoretic display is provided with the electrophoretic display panel A; a peripheral circuit including an image processing circuit 300A; and a timing generator 400. The image processing circuit 300A generates image data D by compensating input image signal VID based on the electrical characteristics of the electrophoretic display panel A. The image data D is comprised of three kinds of data each corresponding to a color of the three primary colors (RGB).

The timing generator 400 generates several timing signals synchronously with image D, which is used for driving a scanning drive circuit 130 and data line drive circuit 140A.

In display area A1 of an electrophoretic display panel A, a plurality of scanning lines 101 are formed in parallel to an X-direction, while a plurality of data lines 102 are formed in parallel to a Y-direction, which is orthogonal to the X-direction. A TFT 103 and a pixel electrode 104 are positioned to provide a pixel in the vicinity of each of the intersections made by these scanning lines 101 and data lines 102. The gate electrode of TFT 103 of each pixel is connected to a particular scanning line 101 for the pixel and a source electrode thereof is connected to a particular data line 102 for the pixel. Moreover, a drain electrode of the TFT is connected to pixel electrode 104 of the pixel. Each pixel is composed of a pixel electrode 104, a common electrode 201 formed on opposing substrate 102, and dispersal system 1 provided between the substrates on which the common and pixel electrodes are provided, respectively.

The scanning line drive circuit 130 and data line drive circuit 140, consisting of TFTs, are made using the same production process as pixel TFTs 103. This is advantageous in terms of integration of elements and production costs.

When a scanning signal Yj is brought to its active state, TFTs 103 on the jth scanning line 101, data line signals X1, X2, . . . , Xn are provided sequentially to pixel electrodes 104. On the other hand, the common voltage Vcom is applied from a power supply, not shown, to the common electrode 201 on the opposing substrate 200. This generates an electrostatic field between each of pixel electrodes 104 and the common electrode 201. As a result, the pigment particles 3 within dispersal system 1 migrate, and an image is displayed using gradations based on image data D on a pixel-by-pixel basis.

(1-2) Principle of Displaying

Figure 4:
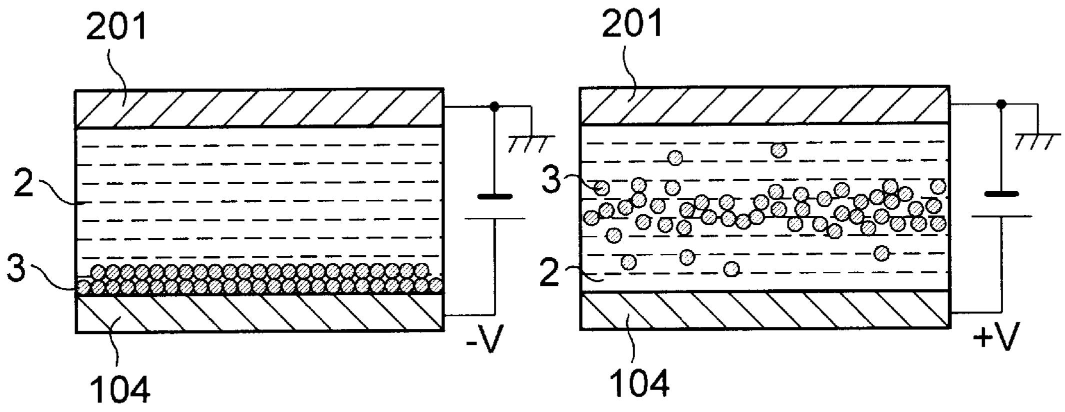
FIG. 4 is a simplified partial sectional view of the divided cell of the panel.

FIG. 4 is a cross-sectional view of a simplified structure of divided cell 11C. In this embodiment, firstly the pigment particles 3 are attracted to pixel electrode 104 as shown in FIG. 4. Supposing that pigment particles 3 are positively charged, an operation is conducted to apply a voltage to pixel electrode 104, which has negative polarity relative to that of common electrode 201.

Next, a positive-polarity voltage is applied to pixel electrode 104, the voltage corresponding to a gradation to be displayed (right side of FIG. 4.). Consequently, the pigment particles migrate towards common electrode 201 in the direction of electric field. When the potential difference is made zero, no electric field acts on the particles, and, under fluid resistance they stop moving. In this case, since the velocity of the particle is determined by a strength of an applied electric field, in other words, an applied voltage. Thus the migration time of a particle is determined by an applied voltage and a duration of application of the voltage. If the voltage is constant, changing the duration will lead to a change in average position of pigment particles 3 in the direction of thickness.

Incident light from the common electrode 201 is reflected by the pigment particles 3 and this reflected light reaches an observer's eye through the common electrode 201. Incident and reflected light are absorbed in the dielectric fluid 2 and the absorption rate is proportional to the optical path length. Hence a gradation recognized by an observer is determined by the positions of pigment particles 3. As mentioned above, since the positions of pigment particles 3 are determined by the duration, changing a duration of application of a constant voltage will lead to a desired gradation to be displayed.

Dispersal system 1 comprises a large number of pigment particles. If they share the same electrical properties (e.g., charge), mechanical properties (e.g., size and mass;), and any other relevant properties, they will migrate at the same velocity. In other words, they will behave in the same manner. However the thickness of a divided cell 11C is made to be from a few up to a maximum of 10 micrometers, and thus a maximum migration length of pigment particle 3 is very short. Consequently, to improve image display characteristics, an infinitesimal migration length must be controlled. To achieve this, low voltages to effect a gradation must be used, which makes gradation control difficult.

Figure 5:
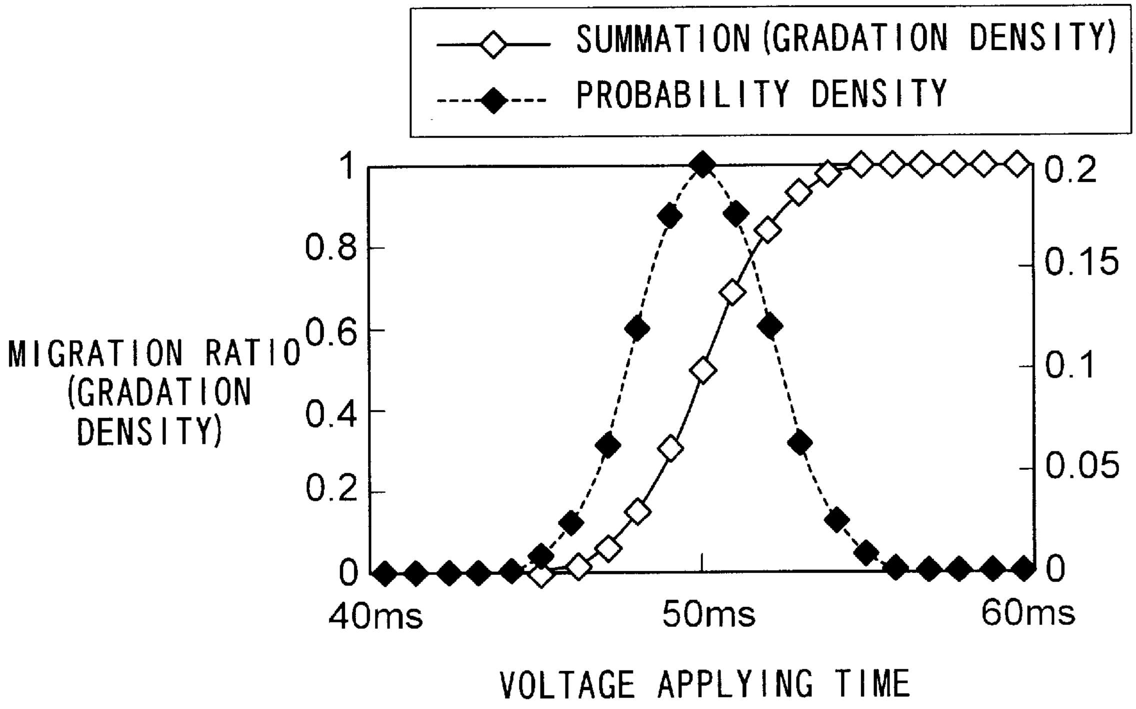
FIG. 5 exemplifies voltage relations between the two electrodes and the divided cell.

To assist in control, the pigment particles are provided with differing properties. These differences enable a statistical distribution to be achieved of positions of pigment particles. FIG. 5 shows an example of a relation between a duration of applying a voltage and the gradation displayed. This is a result of a simulation under the condition that the average time for the particles to reach the common electrode 201 from the pixel electrode is 50 milliseconds; and the standard deviation of the distribution for voltage application is 0.2 millisecond.

In FIG. 5, a solid line shows the characteristics of gradation according to the applied voltage and the dotted line shows the probability density function. Probability density is the number of particles that have reached the common electrode 201 which is normalized with 50 milliseconds. As shown therein, when the duration is lower than 45 milliseconds, few pigment particles reach the common electrode 201; but if the duration is 20 milliseconds, half the particles 3 reaches to it; and if the duration is longer than 55 milliseconds almost all of the particles reach the electrode.

Therefore, the duration should be controlled in a range of from 45 to 55 milliseconds to obtain the desired color gradation image.

(1-3) Drive Circuit

Figure 7:
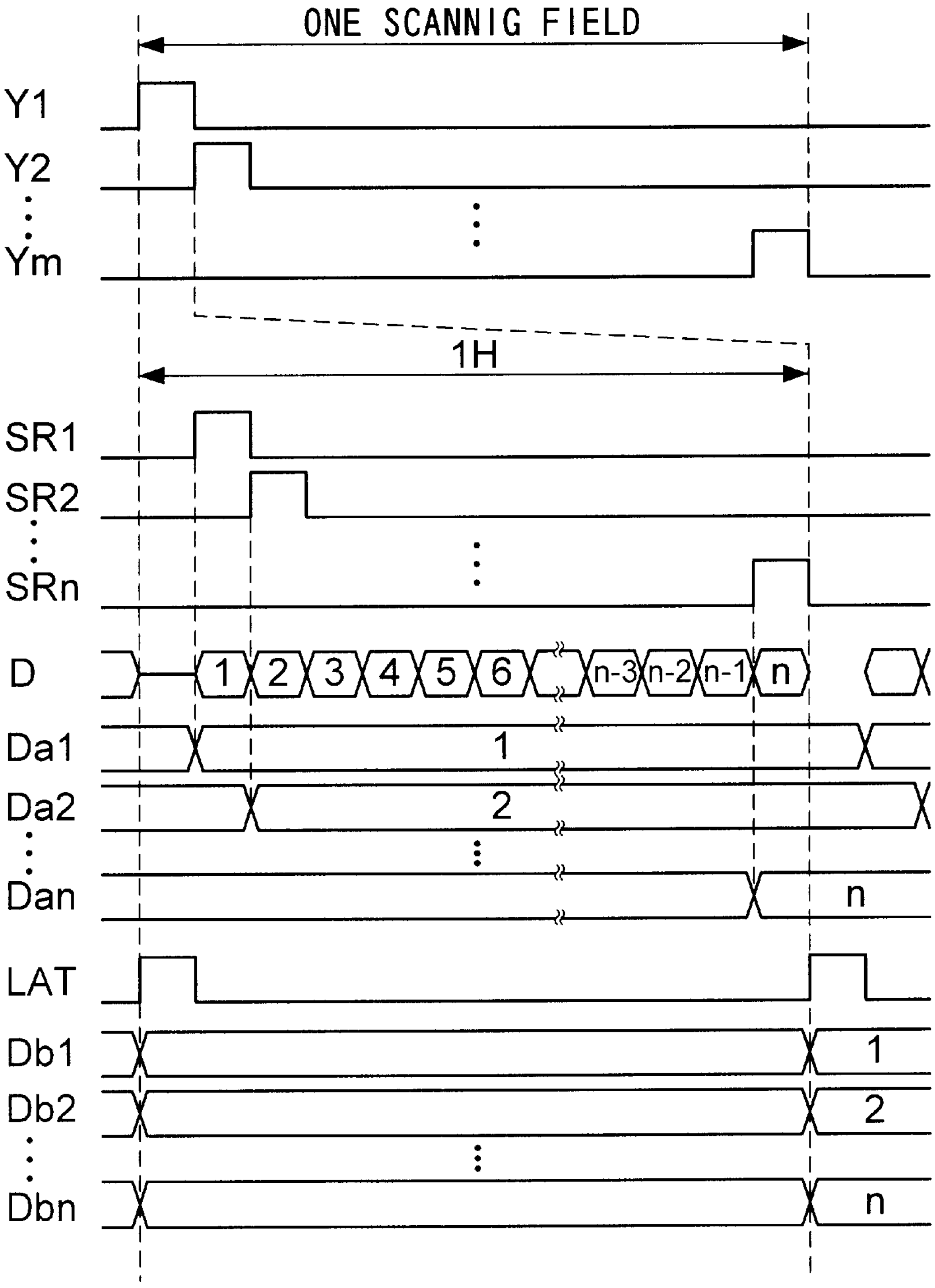
FIG. 7 is a timing chart of the scanning drive circuit 130A and the data line drive circuit 140A.

As shown in FIG. 3, the scanning drive circuit 130 has a shift resister and sequentially shifts a Y-transfer start pulse DY which becomes become active at the beginning of vertical scanning lines based upon a Y-clock signal YCK and its inverted Y-clock YCKB and generates scanning line signals Y1, Y2, . . . , Ym. The timing generator 400A supplies a Y-clock signal YCK, its inverted Y-clock YCKB, and a Y-transfer pulse DY to the scanning line drive circuit 130A. As shown in FIG. 7, scanning signals which sequentially shift their activating period (the H-level period) are generated and output to each scanning line 101.

Figure 6:
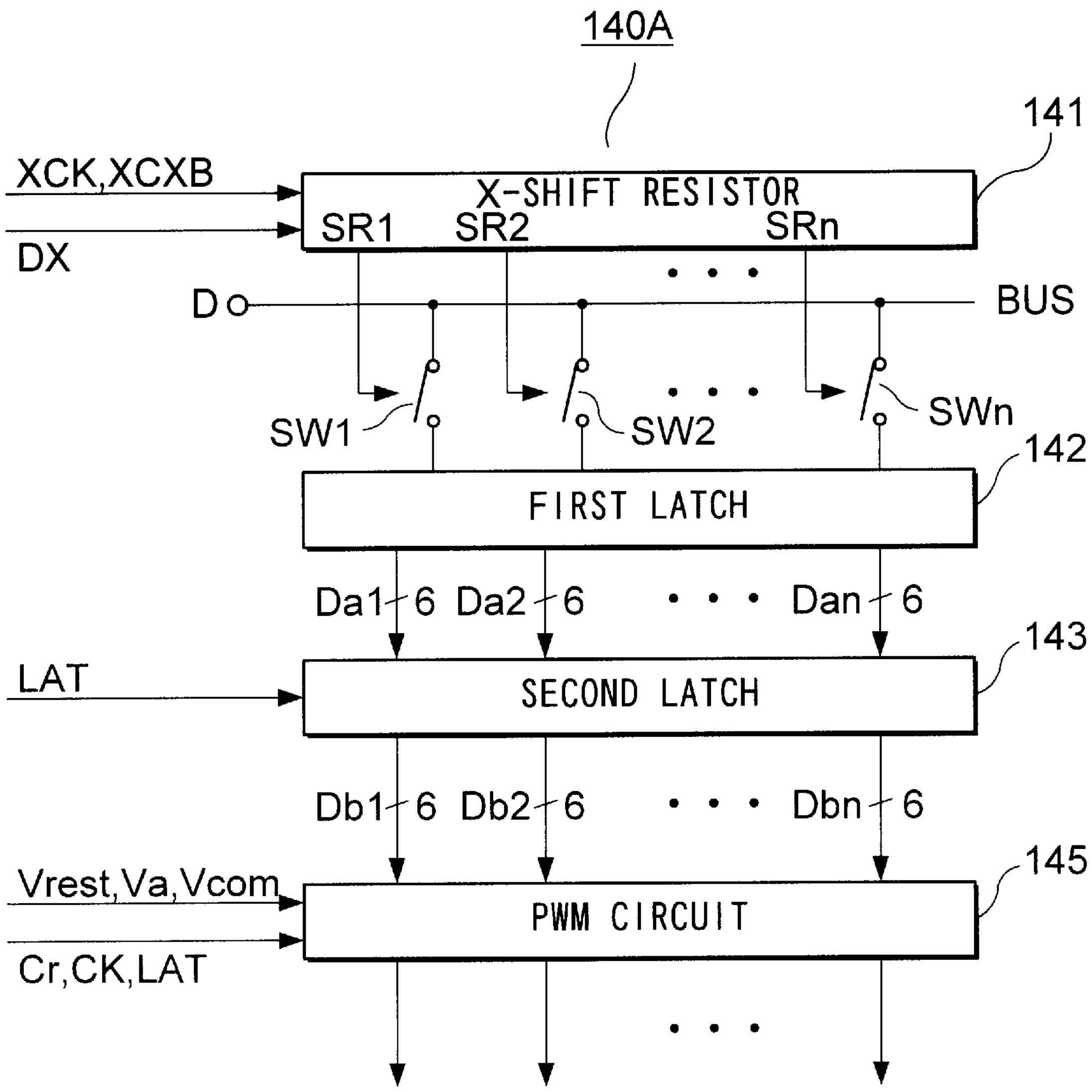
FIG. 6 is a block diagram of the data line drive circuit 140A of the electrophoretic display.

FIG. 6 shows a block diagram of the data line drive circuit 140A. FIG. 7 is a timing chart of the data line drive circuit 140A. As shown in FIG. 6, the data line drive circuit 140A has an X-shift resister 141, a bus BUS, switches SW1, . . . , SWn, a first latch 142, a second latch 143, and a PWM circuit 145. The image data D, which is composed of 6 bits, supplied externally to the bus BUS.

Firstly, the X-shift resister 141 sequentially shifts a X-transfer start pulse DX to generate sampling pulse SR1, SR2, . . . , SRn sequentially according to the X-clock XCK and its inverted X-clock XCKB. Secondly, the first latch 142 has a plurality of latch circuits and the bus BUS is connected to each latch circuit in the first latch group 142 through the switch SW1, . . . , SWn. Sampling pulses SR1, SR2, . . . , SRn are supplied to each input terminal with the corresponding switch. Hence the image data D is imported to the first latch 142 synchronously with with each sampling pulse SR1, SR2, . . . , SRn. A switch SWj is a set of 6 switches according to the 6 bits image data.

The first latch 142 latches image data D supplied from switch SW1, . . . , SWn to obtain dot-sequential data Da1, . . . , Dan (referring to FIG. 7). The second latch 143 latches each dot-sequential data Da1, . . . , Dan with a latch pulse LAT which is active in every horizontal scan as shown in FIG. 7. Thus the second latch 143 makes the dot-sequential image data Da1, . . . , Dan be in phase in every horizontal scanning, to generate line-sequential image data Db1, . . . , Dbn.

Figure 8:
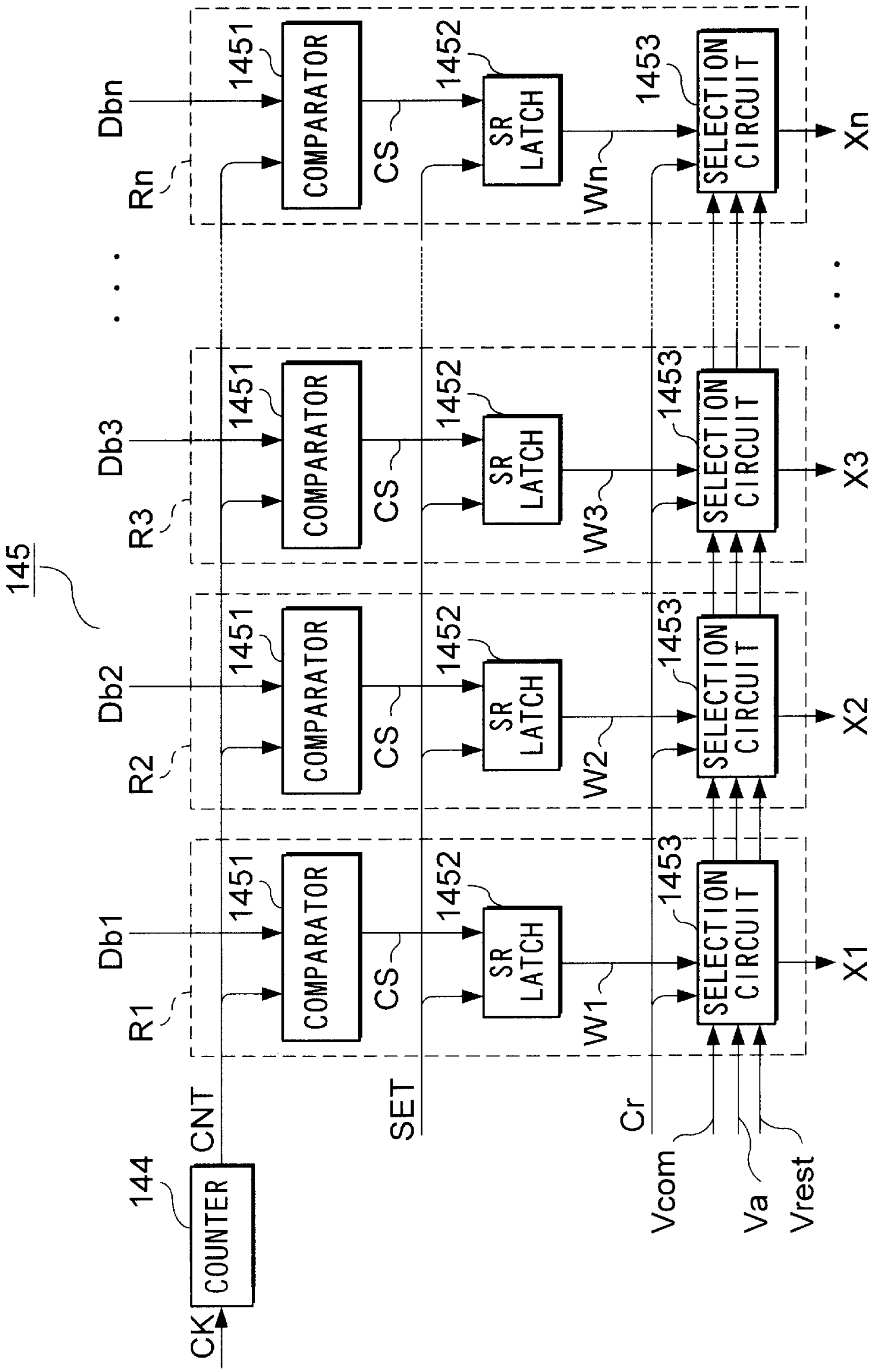
FIG. 8 is a block diagram of the PWM circuit 145 used in the data line drive circuit 140A.

FIG. 8 is a block diagram showing the configuration of the PWM circuit 145. As shown therein, the PWM circuit 145 has n unit circuits from R1 to Rn and a counter 144. Each unit circuit from RI to Rn has a comparator 1451, a SR latch, and a selection circuit 1453. The counter 144 counts a clock signal CK from the beginning of a horizontal scan and generates a count data CNT. The comparator 1451 compares line-sequential data from Db1 to Dbn with count data and supplies a comparison signal CS which is in the H-level when the both data agrees, while in the L-level when the both data does not agree. The comparison signal CS is supplied to a reset terminal of the SR latch 1452. The timing generator 400 supplies a set signal SET to a reset terminal of the SR latch. The set signal SET is in the H-level during a predetermined period from the beginning of a horizontal scanning. A SR latch 1452 of each unit circuit from R1 to Rn generates PWM (Pulse Width Modulation) signal from W1 to Wn, which shifts to the H-level when the set signal SET is brought to the H-level; and later shifts to the L-level when the comparison signal Cs is brought to the H-level.

Figure 9:
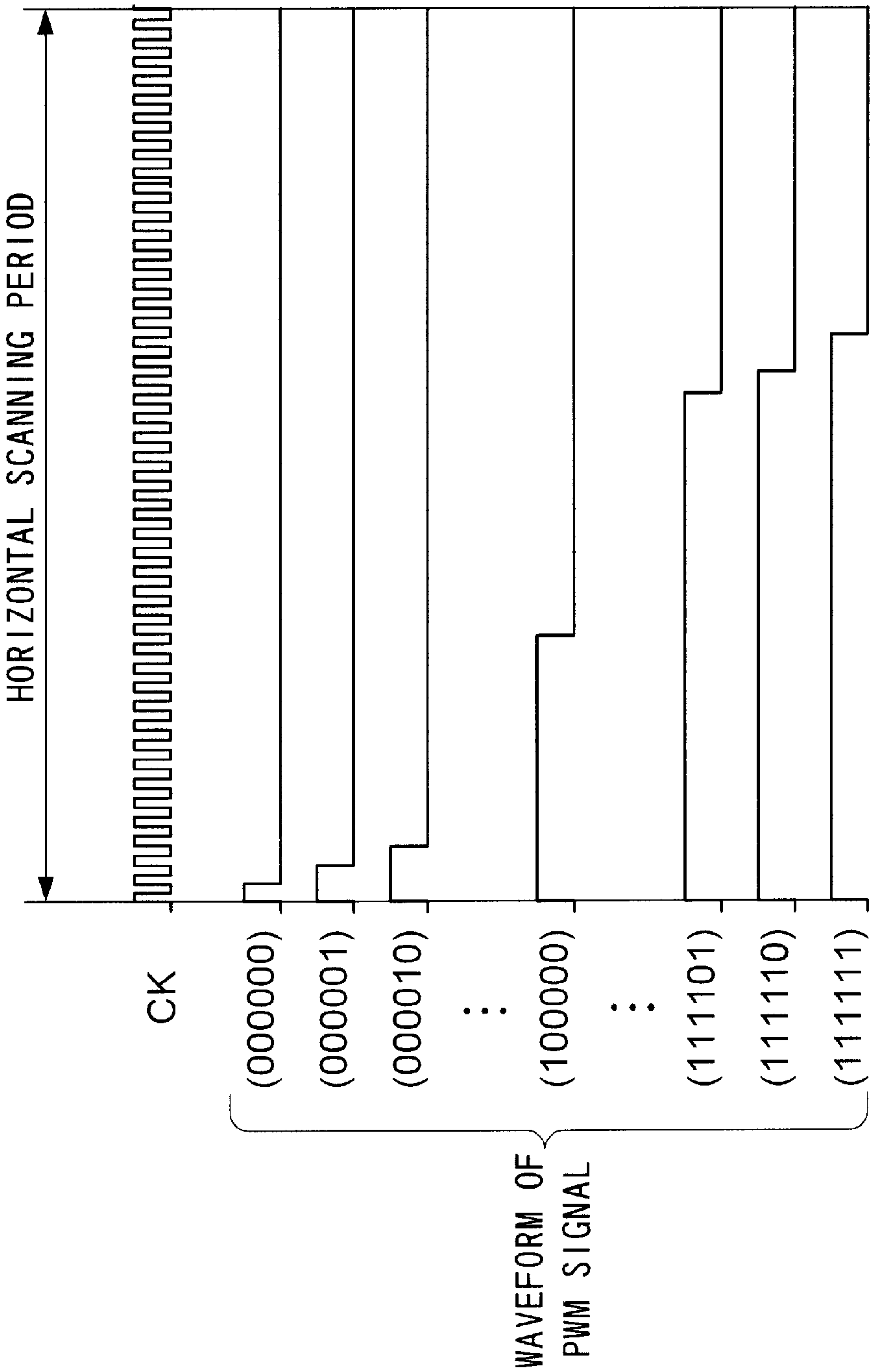
FIG. 9 is a timing chart of a waveform of the PWM signal.

FIG. 9 is a timing chart showing the value of the line-sequential data and a waveform of the PWM signal. As shown therein, the activating (the H-level) period is determined based on the value of a gradation which each line-sequential data designates. It is noted that even if the gradation value is "111111" (100%) a frequency of the clock signal CK is chosen in a way that the period in which the PWM signal is active occupies approximately two-thirds within a horizontal scanning period.

Next, each selection circuit 1453 selects and outputs among the common voltage Vcom, an applied voltage Va, and a reset voltage Vrest based on the PWM signal from W1 to Wn and a reset timing signal Cr. The selection criteria is as follows:

When the reset timing signal Cr is active (the H-level) the reset voltage is selected; when the reset timing signal Cr is inactive (the L-level) and the PWM signal is active (the H-level) the applied voltage Va is selected; and the reset timing signal Cr is inactive and the PWM signal is active (L-level), the common voltage Vcom is selected.

Figure 10:
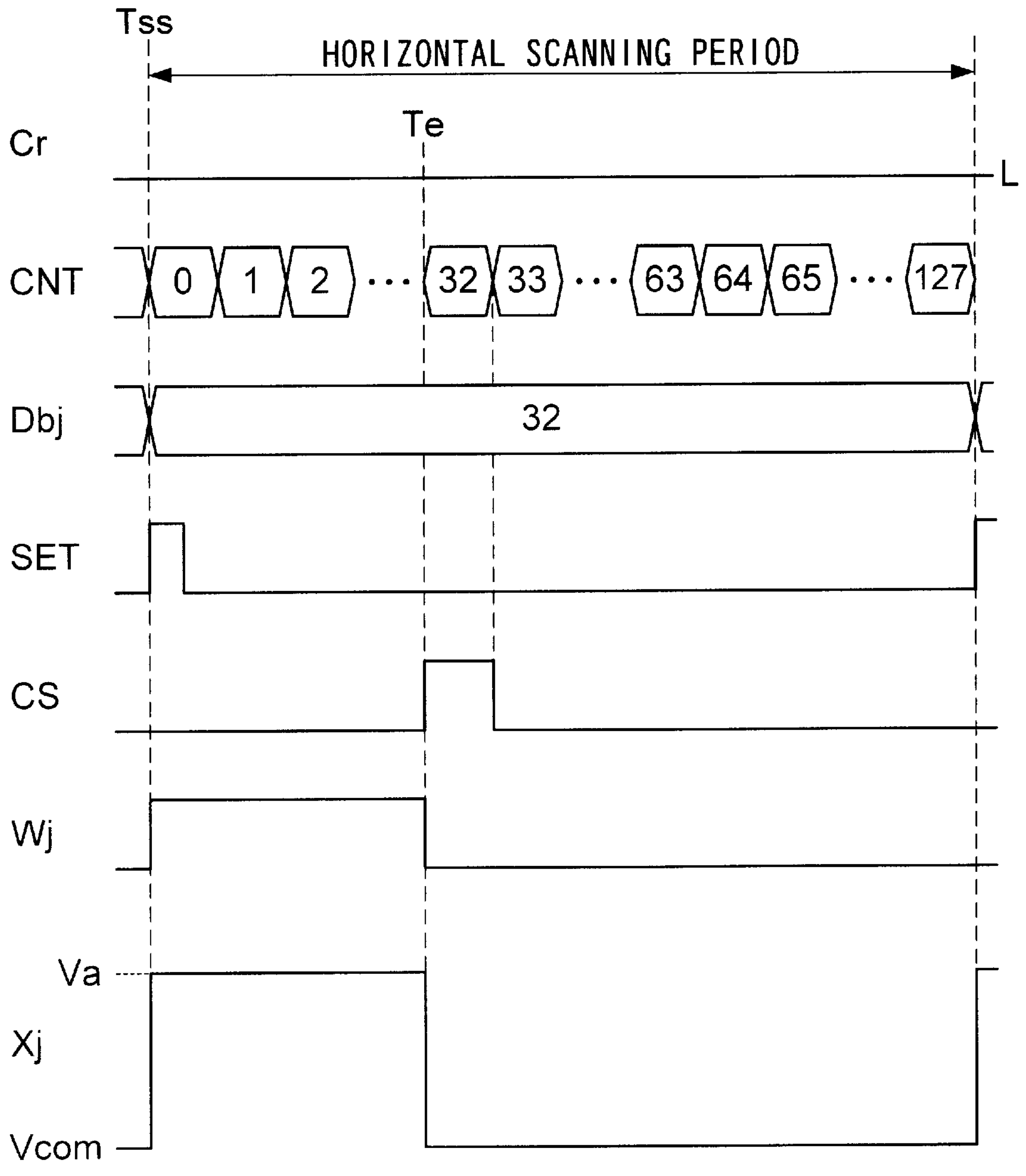
FIG. 10 is a timing chart showing an operation of the unit circuit Rj in the PWM circuit 145.

To be more specific, it is shown that the operation of the jth unit circuit Rj in FIG. 10. Suppose therein the reset timing signal Cr is active in a certain horizontal scanning period and the line-sequential image data Dbj designates the gradation value "32". As shown therein, the set signal SET becomes active in the beginning of the horizontal scanning period Tss with the increase of the count data CNT. The PWM signal shits to the H-level in synchronous with the set signal SET. When time Te comes, the value of the count data becomes "32" and accordingly the comparison signal CS shifts from the H-level to the L-level. As a result, the PWM signal Wj is in the H-level during a period from time Tss to Te.

As mentioned above, the selection circuit 1453 selects the applied voltage Va in the period in which the PWM signal Wj is in the H-level, while selects the common voltage when the PWM signal Wj is in the L-level. Thus the data line signal Xj is equal to the applied voltage Va during a period from time Ts to Te, while equal to the common voltage Vcom during a period from time Te to the end of the horizontal scanning period. In other words, the data line signal Xj is equal to a constant voltage during a period corresponding to a gradation to be displayed, while equal to the common voltage Vcom during the other period. The data line drive circuit 140A generates the data line signals X1, . . . , Xn and supplies them to the data lines 102 in this way.

(1-4) Operation in an Electrophoretic Display (1-4-1) Whole Operation

Figure 11:
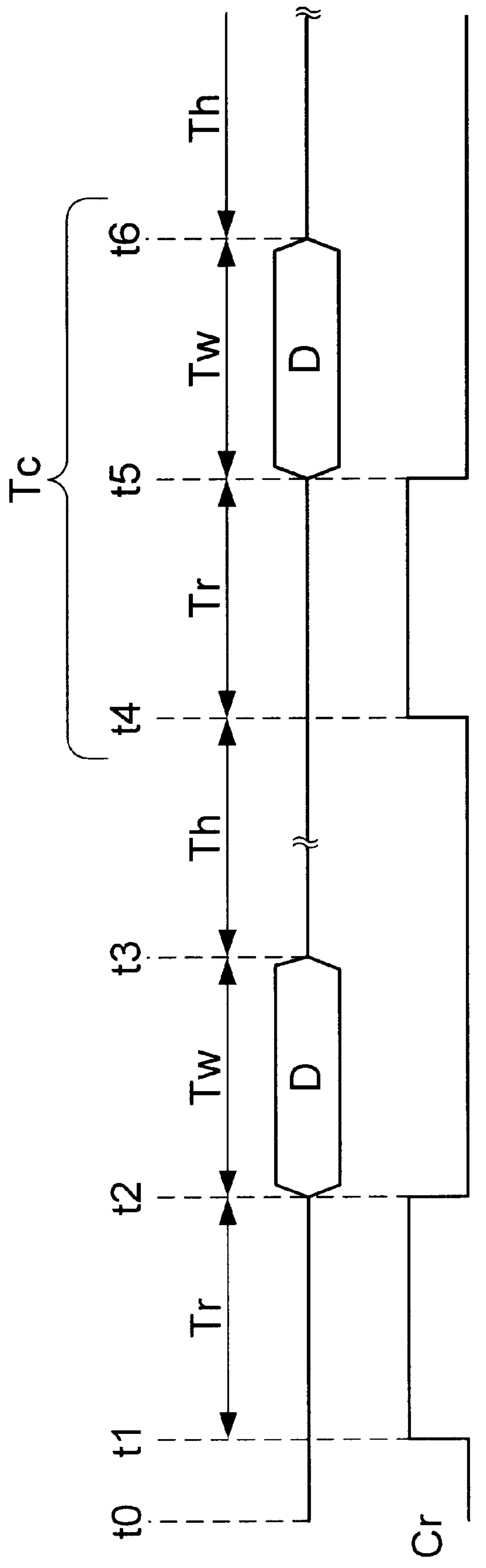
FIG. 11 is a timing chart showing the outputted data from the image processing circuit 300A.

FIG. 11 is a timing chart showing the whole operation of the electrophoretic display. The whole operation will be described referring to this figure.

Firstly, at time T0 when the power supply of the electrophoretic device is switched on, the image signals processing circuit 300A, timing generator 400, and electrophoretic display panel A are turned on.

Then at time t1 when the circuit is stabilized after a predetermined time passes, the timing generator 400A makes the reset timing signal Cr to be active over a period of one scanning field. At this reset time Tr, the particles 3 are attracted to the pixel electrodes 104 to be initialized their positions as described above.

In the period, each selection circuit 1453 of the data line drive circuit 140A selects a reset voltage Vrest to each data line 102 and output them as data line signals from X1 to Xn to each the data line 102. The scanning line drive circuit 130A sequentially selects each the scanning line 101 so that the reset voltage Vrest is applied to all pixel electrodes 104.

Next, a writing period Tw begins at time t2. In the writing period Tw, the image signal processing circuit 300A outputs the image data D during one scanning field. The voltage Va is applied to each pixel electrode 104 during a time period corresponding to a gradation to be displayed so that a piece of displayed image is completed.

Next, in a holding period Th, which starts with time t3 and ends with time t4, the image is held which is written in the immediately preceding writing period Tw. Its length can be set freely. In this period, the image signal processing circuit 300A halts and outputs no data and any electrostatic field is not generated between each of pixel electrodes 104 and the common electrode 201. The particles 3 don't change their positions unless an electrostatic field exists. Therefore a static image has been displayed during the period. In the period, which begins with time t4 and ends with time t6, an image is rewritten. In a similar way in the period from time t1 to t3, the writing operation subsequent to the reset operation is carried out so that a displayed image is updated.

(1-4-2) Resetting Operation

Figure 12:
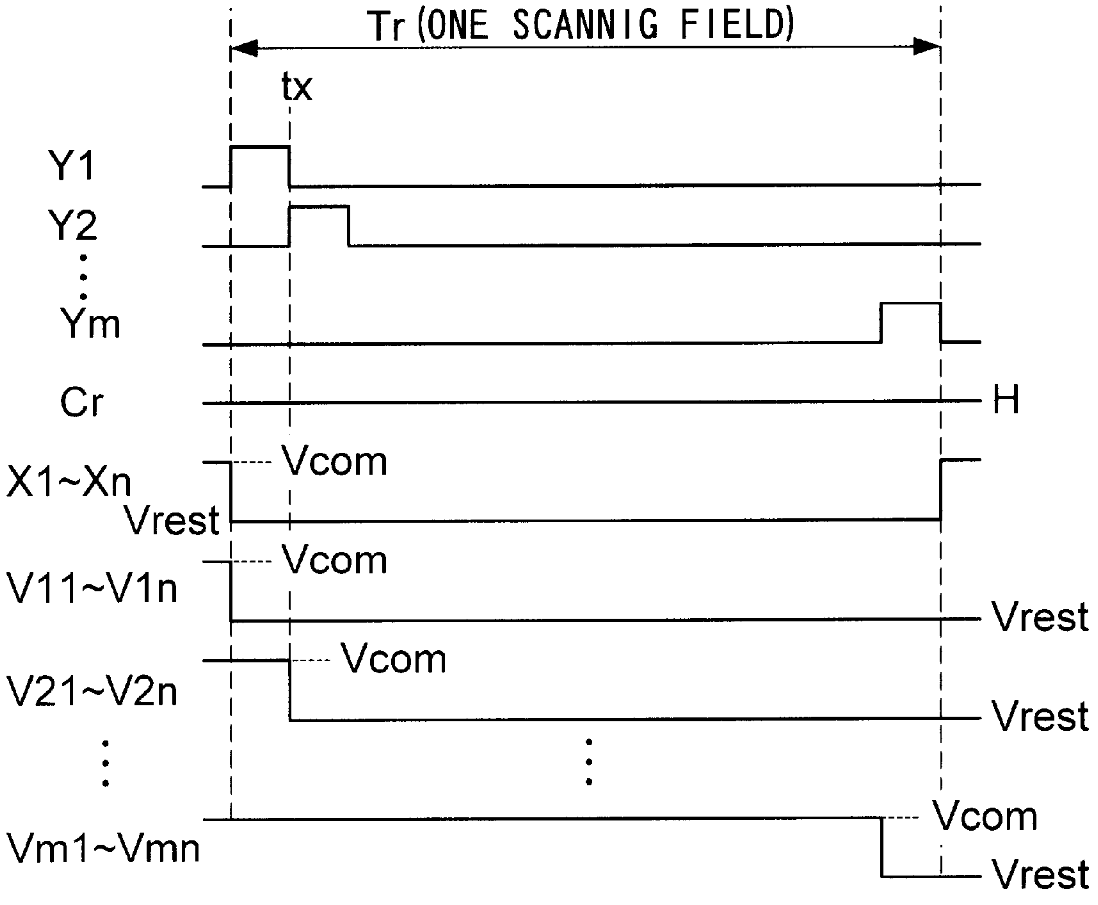
FIG. 12 is a timing chart of the electrophoretic display in the resetting operation.

FIG. 12 is a timing chart of an electrophoretic display in a resetting operation. In the following, a pixel in row i and column j and applied voltage on a pixel electrode 104 of the pixel are represented by Pij and Vij, respectively.

As mentioned above, in the reset period Tr the reset timing signal Cr becomes active (in the H-level), as shown in FIG. 12, so that voltages on the data line signals X1 through Xn is set to the reset voltage Vrest.

In this embodiment, since the particles have a positive charge, a reset voltage Vrest is negative relative to the common voltage Vcom. When the scanning signal Y1 becomes active (in the H-level), TFTs 103 in a 1st line are switched on and the reset voltage Vrest is applied to each pixel electrode 104. After that, the reset voltage Vrest is applied to each the pixel electrode 104 of a 2nd, 3rd, . . . , and mth line.

For example, at time tx when the scanning line signal Y1 changes from inactive from active, each TFT 103 in the first line is switched off, and the pixel electrodes 104 and data lines 102 are therefore disconnected. However each pixel electrode 104 in the first line maintains the reset voltage Vrest because each pixel has a capacitor comprised of the pixel electrode 104, dispersal system 1 and the common electrode 201, and thus electric charge corresponding to the Vrest is accumulated in each the capacitor. In this way the reset voltage Vrest is applied to a pixel electrode, the pigment particles 3 in the dispersal system 1 are attracted to the pixel electrode, and their positions are initialized.

(1-4-3) Writing Operation

Figure 13:
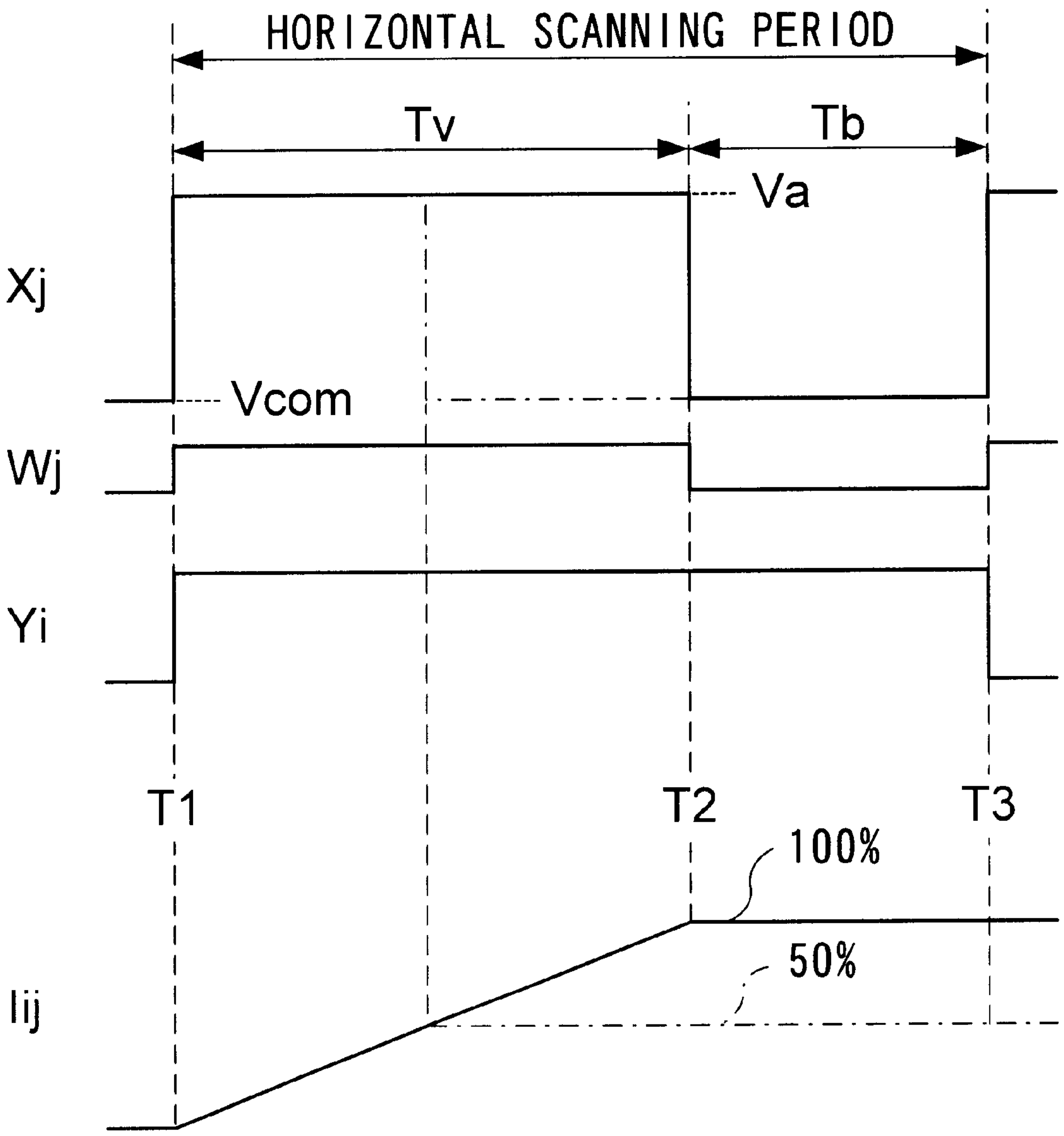
FIG. 13 is a timing chart of the electrophoretic display in the writing operation.

FIG. 13 shows a timing chart of the electrophoretic display in a writing operation. Here an ith row (ith scanning line) and a jth column (jth data line) will be described but it will be apparent that other pixels can be manipulated similarly. In the following, a pixel of an ith row and a jth column and brightness of the pixel are represented by Pij and Iij, respectively.

A data line signal Xj supplied to a jth data line 102 is, as shown in FIG. 12, equal to the applied voltage Va in a voltage applied period Tv in which a PWM signal Wj is active, while to the common voltage in a no-bias period Tb in which the PWM signal Wj is inactive. A waveform of the data line signal Xj depicted in a solid line indicates 100% gradation, while that in a dashed line indicates a 50% gradation.

A scanning line signal Yi supplied to the ith scanning line 101 is active during a period of an ith horizontal scanning. Therefore, the TFT 103 of the pixel Pij is switched on during the period and the data line signal Xj from time T1 to T3 is applied to the pixel electrode 104 of the pixel Pij. That is, in this embodiment, an operation that begins with applying the applied voltage Va to the pixel electrodes 104 and ends by completing application of the common voltage Vcom within a predetermined period of a horizontal scan.

In the following, the particle motion in the pixel Pij will be described. The reset operation is carried out before the writing operation begins, and at time T1 all particles in the pixel Pij are positioned at the side of the pixel electrode 104. At this time, when the applied voltage Va is applied to the pixel electrode 104, an electrostatic field is generated whose direction is from the pixel electrode 104 to the common electrode 201. Thus the particles 3 start to move at time T1.

In this embodiment, since the particles 3 have a whitish color and the dielectric fluid 2 is dyed black, the closer particles 3 are to the common electrode 201, the greater the brightness Iij of the pixel Pij. As a result, Iij increases gradually from time T1, as shown.

Since the pixel Pij is comprised of a dispersal system 1 sandwiched by the pixel electrode 104 and the common electrode 201, it has an electrostatic capacitance dependent on the area of the electrodes, the distance between the two electrodes, and a dielectric constant of the dispersal system 1. Accordingly, even if the TFT 103 is turned off to stop a supply of charge to the pixel electrode 104, a constant electrostatic field is maintained between the two electrodes. Thus, since the particles 3 continue to migrate to the common electrode 201 for as long as an electric field exists, a period in which generation of an electric field, in other words, a process to take away extra charge accumulated in the capacitor, is required. For this reason, a no-bias period Tb is provided.

In the no-bias period Tb the common voltage Vcom being applied to the pixel electrode 104, the pixel electrode 104 and the common electrode 201 becomes equipotential at time T2. Consequently, no electric field is applied to the particles 3 from the time T2. If the fluid resistance of the dielectric fluid 2 is relatively large, the particles 3 will stop migrating at the time T2 when no electric field exists. This results in a constant value of brightness Iij from the time T2 as shown in FIG. 13. If the value of the viscous drag of the dielectric fluid 2 is low, the particles 3 will continue to migrate under inertia. In this case, the image D which is compensated beforehand by taking such particle inertia into account is generated in the image signal processing circuit 300A.

In the writing operation, the voltage Va is applied to the pixel electrode 104 during a period corresponding to a color gradation to be displayed to move the particles 3 by a distance corresponding to the gradation. Next, the common voltage Vcom is applied so as to stop the particles 3 migrating. By using these two processes it is possible to change a brightness Iij of the pixel Pij corresponding to the color gradation to be displayed.

In this embodiment the common voltage Vcom is applied to stop the particles 3, but it is not necessary to apply a voltage which is exactly the same as the common voltage Vcom; instead, any voltage which is sufficient to stop migration of the particles 3 can be utilized. Since the particles 3 can not migrate simply by overcoming fluid resistance, if the value of the viscous drag of the dielectric fluid is large, it is possible to apply a voltage which is different from the common voltage Vcom in the no-bias period.

(1-4-4) Holding Operation

As shown in FIG. 13, at time T3 the scanning line signal Yi shifts from active to inactive, and the TFT 103 of the pixel Pij is thereby turned off. As mentioned above, in the no-bias period Tb, since the common voltage Vcom is applied to the pixel electrode 104, no electrostatic field is generated between the two electrodes. Therefore no electric field is applied to the dispersal system 1 unless a new voltage is applied. This makes it possible to fix a position of the particles 3 and thereby maintain a displayed image.

In the holding period Th, there is no need to apply a voltage to the pixel electrodes 104, and consequently neither the scanning line signals Y1 through Ym nor the data line signals Xi through Xn are required to be generated. This enables a reduction in power consumption, the reduction being carried out as follows: The 1st method is to turn off the main power supply of the electrophoretic display itself. This means that the electrophoretic display panel and peripheral devices such as the image signal processing circuit 300A and the timing generator 400C halt and no power is consumed.

The 2nd method is to stop supply of power to the electrophoretic display panel A, thereby reducing power consumption in the panel.

The 3rd method is to stop supplying the Y-clock YCK, its inverted Y-clock YCKB, the X-clock XCK, its inverted X-clock XCKB, and the clock signal CK to the scanning line drive circuit 130A and the data line drive circuit 140A. Since the scanning line drive circuit 130A and the data line drive circuit 140A are made of complementary TFTs, as described above, power is consumed only when the current is fed through them; in other words, inversion of logic level occurs. Therefore stopping supplying the clocks enables a reduction of power consumption.

(1-4-5) Rewriting Operation

Rewriting is carried out as follows:

In a First Method:

After the reset operation is carried out sequentially, as described above, on a line-by-line basis, the writing operation is also carried out, sequentially, on a line-by-line basis, so that the data line signals X1 through Xn, which experienced pulse width modulation, are supplied to the pixel electrodes 104. This enables frame rewrite of an image.

Figure 14:
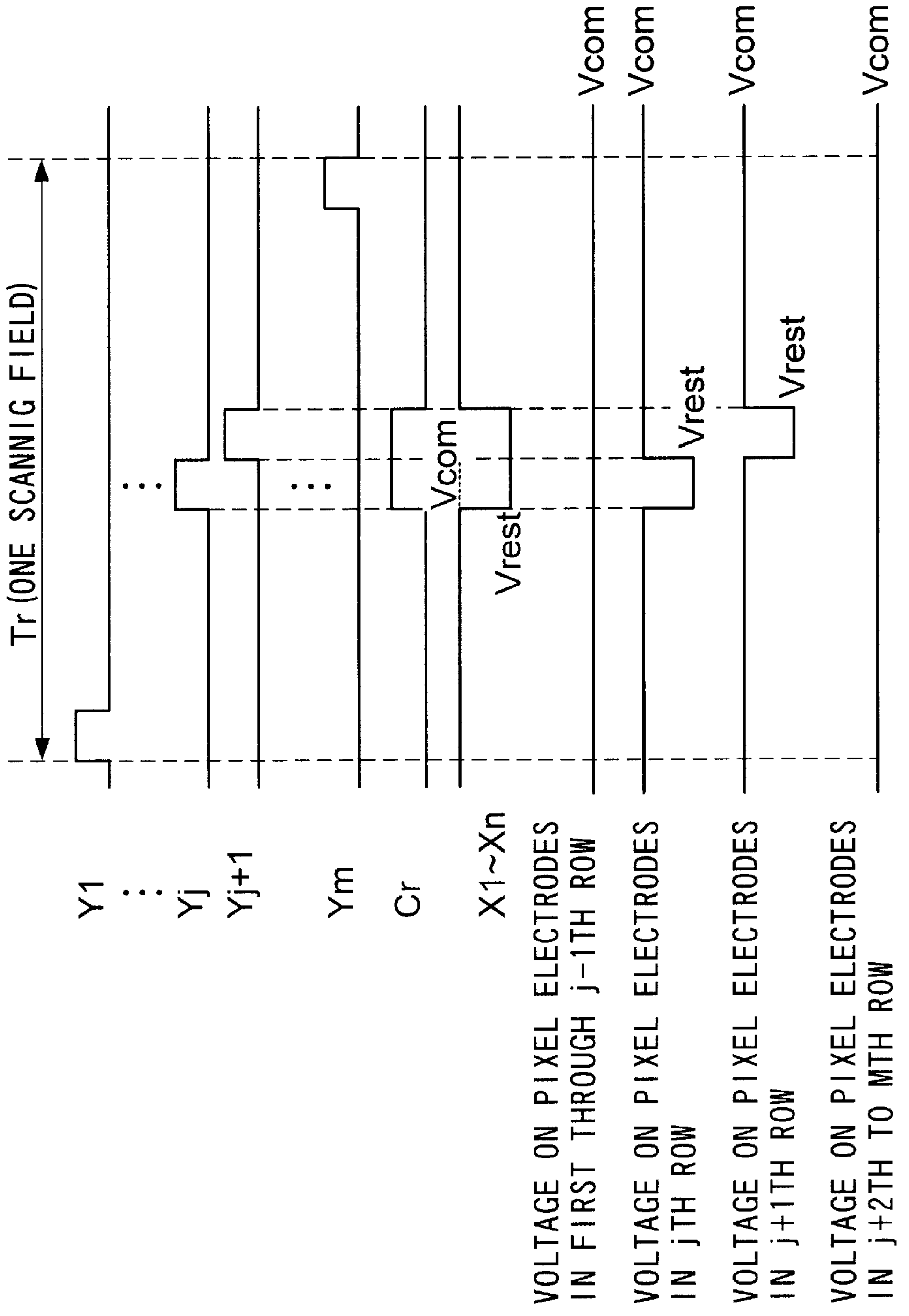
FIG. 14 is a timing chart of the resetting operation in the second method.

The second method consists of a resetting and writing operation carried out only in lines where rewriting is required. By way of example, suppose the jth and the j+1th lines are to be rewritten. FIG. 14 shows a timing chart describing a resetting operation based on this method.

In the resetting period Tr, the image signal processing circuit 300A outputs the reset data Drest. That is, the value of the image data D is '0' in this period; the scanning line driving circuit 130 sequentially outputs the scanning signal Y1 through Yj and Yj+1 through Ym as shown in FIG. 14; the reset timing signal Cr is in the L-level during the scanning line 101 required to be rewritten is selected and, since a jth and j+1th lines are rewritten, the reset timing signal Cr is in the L-level (inactive) during the scanning line signal Yj and Yj+1 are active.

As described, while the selection circuit 1453 (cf. FIG. 8) outputs the common voltage Vcom during the reset timing signal Cb is in the H-level (active), and outputs the PWM signal during the reset timing signal is in the L-level. Since the value of the image data D is '0', the PWM signal is always inactive (in the L-level).

Therefore in the period which the jth and j+1th scanning line 101 are selected, the reset voltage Vrest is supplied to all data lines 102, while in the other selected time of the scanning lines 101, the common voltage Vcom is applied to all data lines 102. Thus, the common voltage Vcom is applied to the pixel electrodes 104 on a 1st through j-1th line and j+2th through mth line, and the reset voltage Vrest is applied to the pixel electrodes 104 on the jth and j+1th line, so that the particles 3 in the pixels on the jth and j+1th lines are initialized. Since applying the common voltage Vcom to the pixel electrodes 104 does not generate an electrostatic field, positions of the pigment particles 3 in the pixels on the 1st through j-1th line and j+2th to mth line do not change.

In the writing operation, the image signal processing circuit 300A outputs image data D to a line required to be rewritten;, while, at the same time, outputting image data D having a value of '0' to the other lines. In this way, rewriting is carried out only in the jth and j+1th lines.

Figure 15:
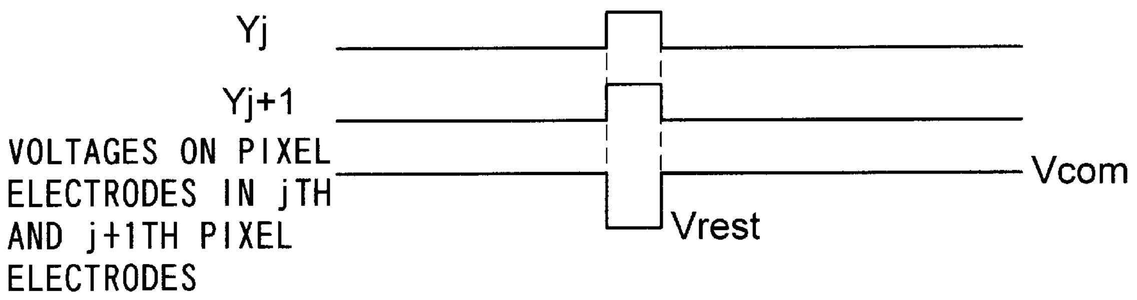
FIG. 15 is a timing chart of the resetting operation which resets horizontal lines simultaneously.
Figure 16:
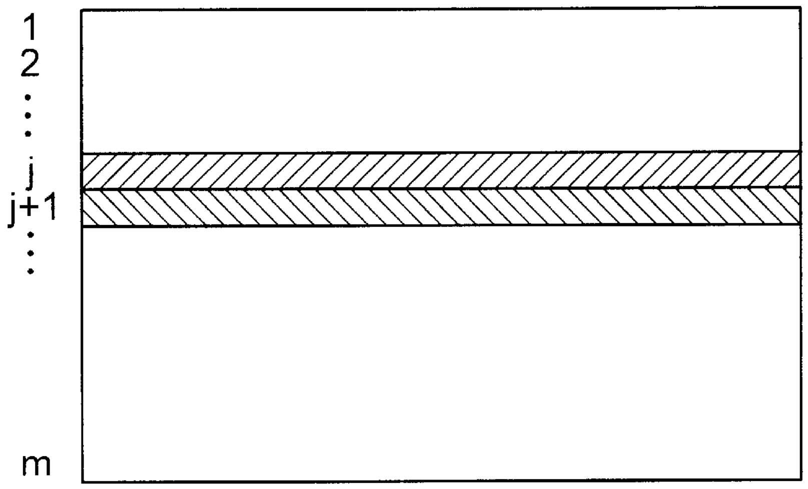
FIG. 16 illustrates horizontal lines to be rewritten.

In the third method, a plurality of lines to be rewritten is reset, and, subsequently, a writing operation is carried out in the usual way. In the above second method, the reset operation is carried out sequentially on a line-by-line basis in such a way that the jth line is reset and the j+1th line is reset and so on. However, it is possible to carry out a reset operation simultaneously if a scanning line drive circuit is able to select simultaneously a plurality of scanning lines 101 to be rewritten. For example, as shown in FIG. 15, it will be apparent that it is possible to reset simultaneously the jth and j+1th line to be rewritten. Writing is carried out in the usual way that the image signal processing circuit 300A outputs an image data D only in the lines to be rewritten and outputs the image data D whose value is '0' to the other lines. This method enables rewriting only in the jth and j+1th line.

Figure 17:
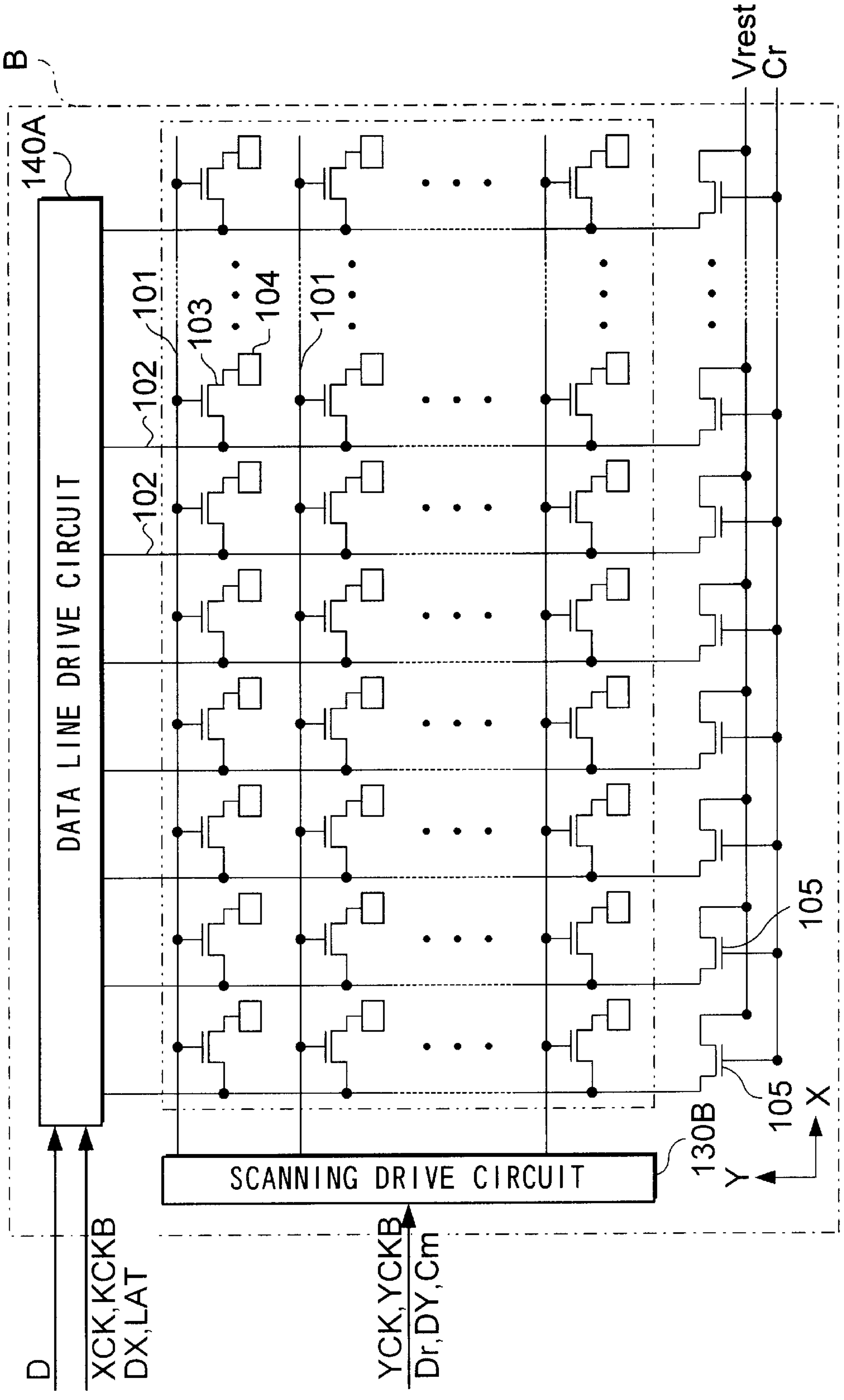
FIG. 17 is a block diagram showing the electrical configuration of the electrophoretic display panel in the fourth manner.

The 4th method is as follows:

All pixels are reset simultaneously and subsequently rewriting is carried out in the usual way of writing. FIG. 17 shows a block diagram of the electrophoretic display panel B based on this method. The electrophoretic display panel B has the same configuration as the electrophoretic display panel A shown in FIG. 3 except that TFTs 105 are provided in each column and that the scanning line drive circuit 130B is able to make all scanning line signals Y1 through Ym active simultaneously.

As shown in FIG. 17, the reset voltage Vrest is applied to source electrodes each of which is on one of TFTs 105 and the reset timing signal Cr is applied to gate electrodes thereon. Each drain electrode theron is connected with each data line 102. When the reset timing signal Cr is brought to be active, all TFTs 105 is turned on simultaneously so that the reset voltage Vrest is applied to each data line 102. On the other hand, the scanning line drive circuit 130B makes all scanning line signals to be active when the reset timing signal Cr is brought to be active. Hence the reset voltage Vrest is applied to all the pixels 104 during the reset timing signal Cr is active, enabling the simultaneous resetting of all pixels.

In this case, it is possible that each source electrode on each TFT is set at ground level and that a positive voltage with reference to the ground potential is applied which is sufficient to initialize a position of the particles 3. That is, a sufficient voltage to initialize another electrode is applied with reference to either the pixel electrode 104 or the common electrode 201. It is also possible to provide a plurality of divided electrodes made by dividing the common electrode 201 (for example, upper half and lower half) to apply a voltage for the initialization to divided electrodes to which an image area to be rewritten belongs.

(2) Second Embodiment (2-1) Outline of the Second Embodiment

Figure 18:
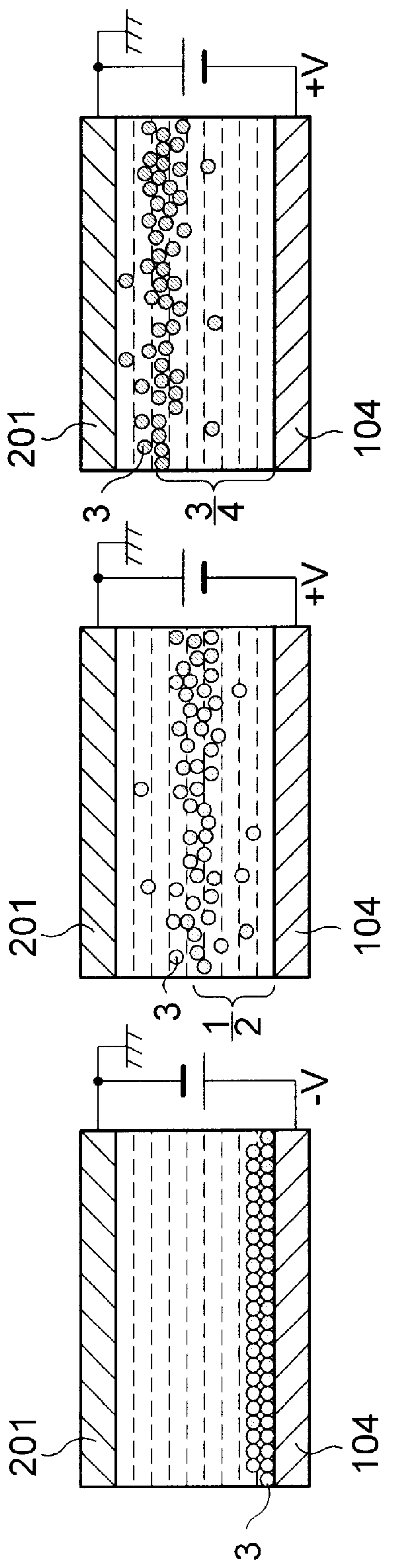
FIG. 18 is a simplified partial, sectional view of the divided cell of the electrophoretic display.

In the above embodiment, rewriting is carried out in a way that after a reset operation as shown in the right diagram of FIG. 18 is carried out, then a writing operation is carried out shown in the middle diagram of FIG. 18 to update a displayed image. In this case, the position of the pigment particles 3 are initialized in displaying a subsequent image. In the case that dielectric fluid 2 is colored black and the pigment particles 3 are colored white, a black-out occurs across the entire image when an image is updated. Since the naked eye cannot recognize a rapid change in an image, if the change is effected sufficiently rapidly, an animation can be displayed by updating images continuously.

Nevertheless, there is a case that the resetting operation needs a long time according to physical property of the dispersal system 1, and a change in brightness in initializing the pigment particles 3 is therefore detectable.

To prevent this, in the second embodiment a difference between the average position to be displayed next and that corresponding to the presently displayed image is obtained and a constant voltage is applied between the two electrodes during a time period corresponding to the difference obtained.

Suppose a present gradation is 50% and a gradation to be displayed next is 75%, for example. If the average position of the particles 3 is 50% in the thickness direction of the dispersal system 1, the gradation displayed is 50%, as shown in the central diagram of FIG. 18. In order to change this gradation to 75%, it is necessary to move the particles 3 to a position of ¾ in the thickness direction. Consequently a constant voltage is applied to a pixel electrode 104 during a time period corresponding to the difference between the gradation to be next displayed and that now displayed, to thereby cause the pigment particles 3 to migrate to a position corresponding to a gradation to be displayed. In this way, a displayed image can be updated without the need for a resetting operation. This is an important feature in displaying an animation (2-2) Configuration of the Electrophoretic Display The electrophoretic display based on the second embodiment has the same configuration as that of the first embodiment, shown in FIG. 3, except that an image signal processing circuit 301A and a PWM circuit 145A in the data line drive circuit 140A are employed, instead of the image signal processing circuit 300A and the PWM circuit 145, respectively.

(2-2-1) Image Signal Processing Circuit

Figure 19:
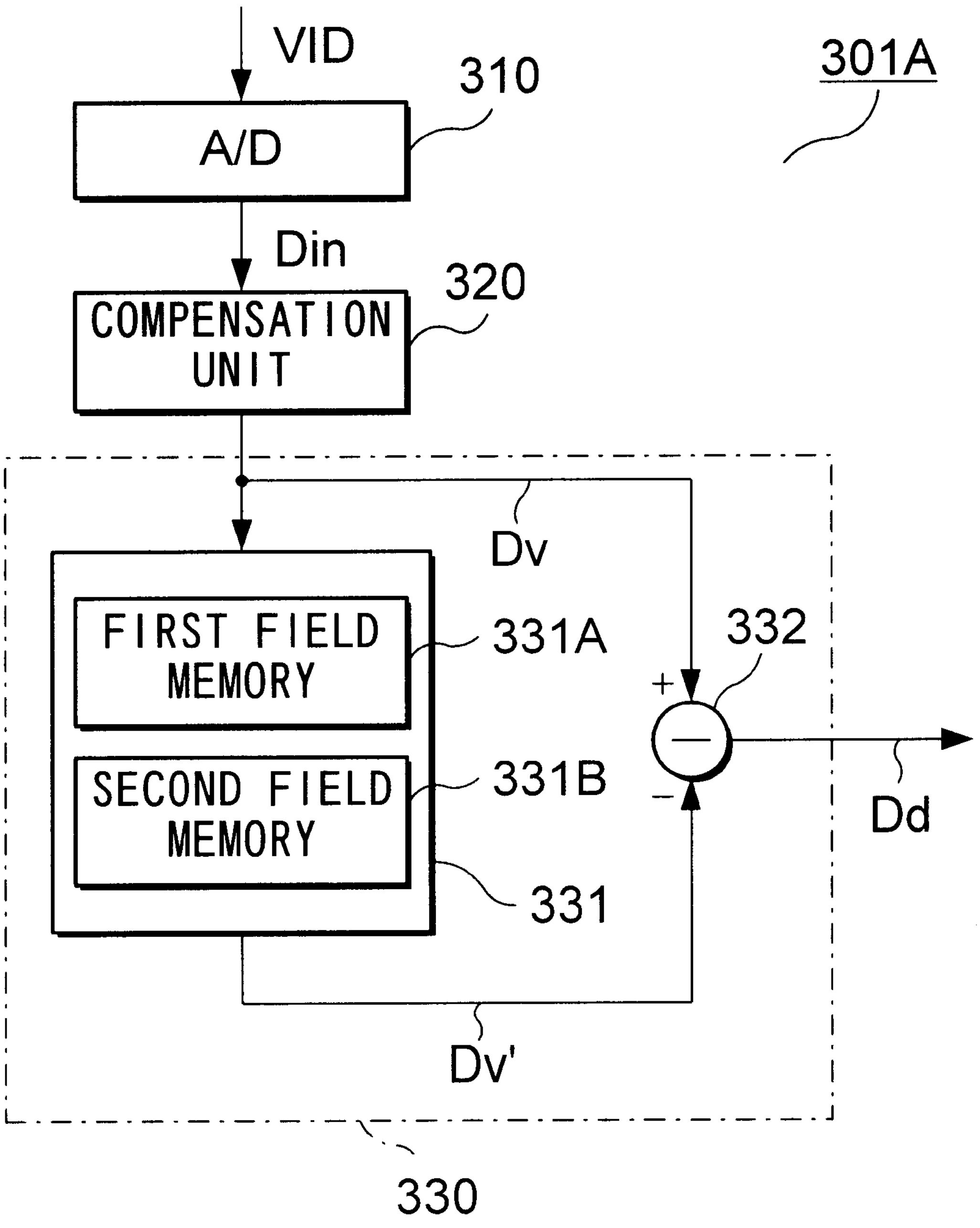
FIG. 19 is a block diagram of the image processing circuit 301A.

FIG. 19 is a block diagram showing a configuration of an image signal processing circuit 301A. The image signal processing circuit 301A has an A/D converter 310, a compensation unit 320, and a calculation unit 330. An externally supplied signal VID is converted through the A/D converter 310 as the input image data Din. The compensation unit 320 has a ROM and generates image data Dv undergoing compensation processing such as gamma correction, and outputs it to the calculation unit 330.

The calculation unit 330 has a memory 331 and a subtracter 332. The memory 331 has a 1st field memory 331A and a 2nd field memory 331B. In the 1st field memory writing is executed in odd fields and reading is executed in even fields. In the 2nd field memory 331B writing is executed in even fields and reading is executed in odd fields. The memory 331 delays the image data Dv by one field and is supplied to the another input terminal of the subtracter 332 as the delayed image data Dv'. The subtracter 332 generates differential image data Dd by subtracting the delayed image data Dv' from the image data Dv, and outputs it. A MSB of this differential image data Dd play the role as a sign bit, meaning a positive value for "0" and negative for "1".

It should be noted that, in a first field, because there is no delayed image data Dd, a dummy data whose value is '0' is supplied to the other input terminal of the subtracter 332. Hence the image signal processing circuit 301A outputs the image data Dv is outputted as the differential image data Dd in the first field.

If the delayed image data Dv' is a presently displayed gradation, the image data Dv is equivalent to a gradation to that to be displayed next. Therefore the differential image data Dd is equivalent to the data corresponding to the difference between the gradation to be displayed next and that currently displayed, and is supplied to the data line drive circuit 140A instead of the image data D.

(2-2-2) PWM Circuit

Figure 20:
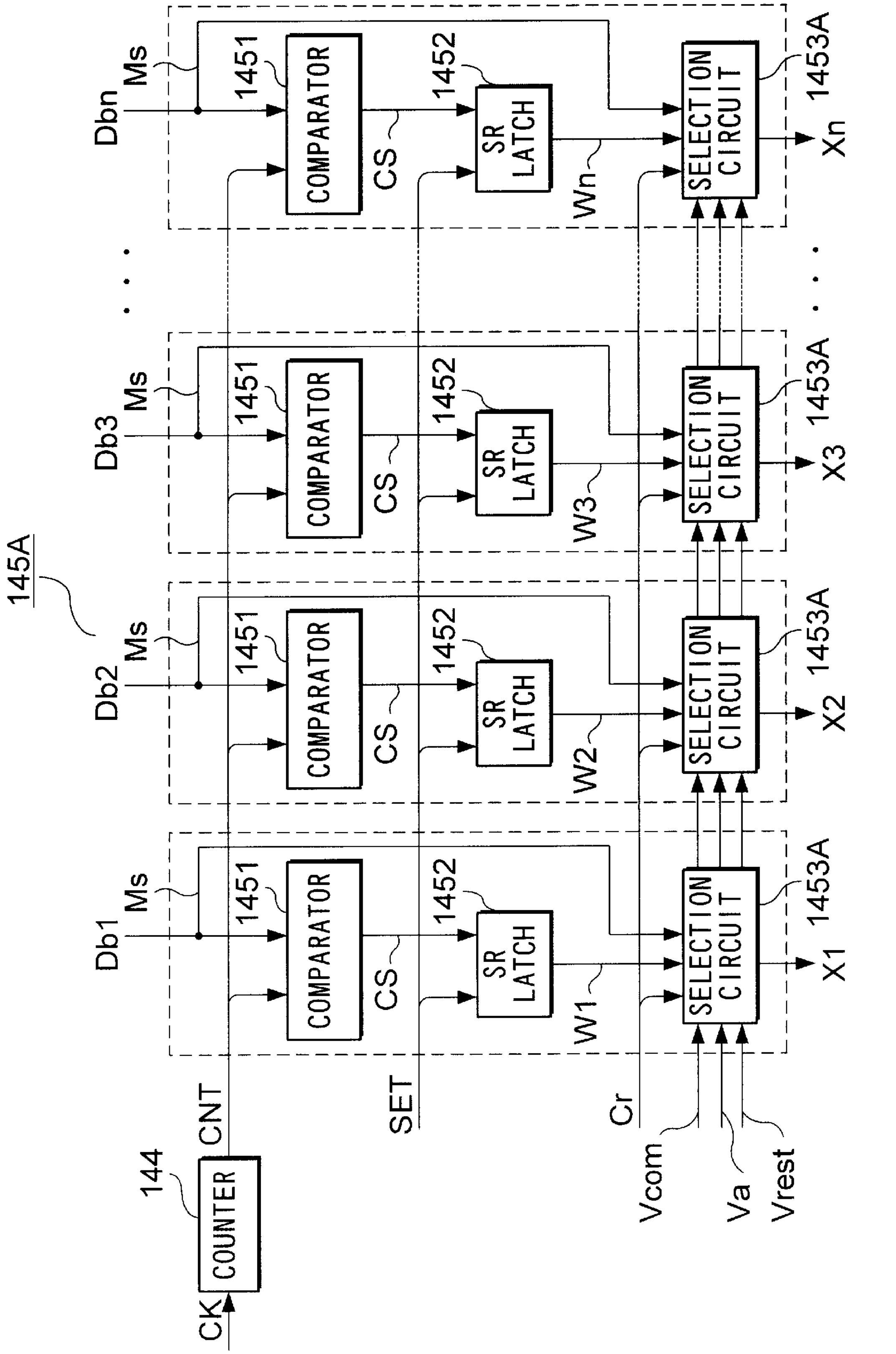
FIG. 20 is a block diagram of the PWM circuit 145A.

FIG. 20 is a block diagram showing a configuration of the PWM circuit 145A. The PWM circuit 145A differs from the PWM circuit 145 shown in FIG. 8 in a point that data Db1 through Db is processed being divided into a most significant bit and the other bits. In the PWM circuit 145A the most significant bit is supplied to a selection circuit 1453 as a selection signal Ms. Data except for the most significant bit from the data Db1 through Dbn is supplied to a comparator 1451. The comparator 1451 compares the lower bits with a count data CNT to generate a comparison signal CS.

The selection circuit 1453A selects an appropriate voltage among the common voltage Vcom, the applied voltage Va, −Va, and the reset voltage Vrest, based on the PWM signal W1 through Wn, the reset timing signal Cr, and the selection signal Ms. The selection criteria is as follows: the selection circuit 1453A selects the reset voltage Vrest if the reset timing signal Cr is active (the H-level); selects the applied voltage Va if the reset timing signal Cr is inactive (the L-level), the PWM signal is active (the H-level), and the selection signal Ms is in the H-level; selects the applied voltage −Va if the reset timing signal Cr is inactive (H-level), the PWM signal is active (H-level), and the selection signal Ms is in the L-level; and selects the common voltage Vcom the reset timing signal is inactive (the L-level) and the PWM signal is inactive (L-level).

The reason for selecting the applied voltage Va or −Va based on the selection signal Ms, unlike the first embodiment, is as follows:

In the first embodiment when updating a display image, the reset voltage is applied to the pixel electrode 104 to attract the particles 3 to the pixel electrode. Thus, in the writing period Tw, it is necessary simply to make the particles 3 migrate from the pixel electrode 104 to the common electrode. In other words, the particles 3 migrate in only one direction in the writing period Tw. While in the second embodiment, a position of the particles 3 is controlled based on the differential image data Dd, thus it is necessary to make the particle 3 migrate in either direction. Therefore the positive voltage Va and a negative voltage −Va with reference to the common voltage Vcom can be selected.

(2-3) Operation of the Electrophoretic Display.

Figure 21:
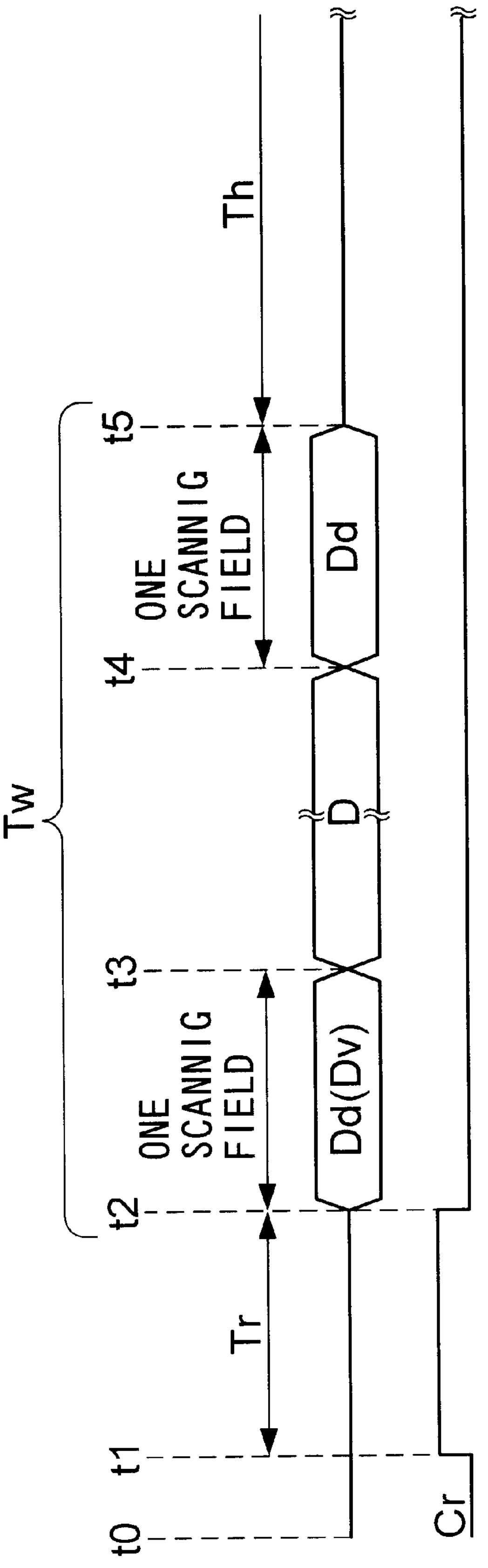
FIG. 21 is a timing chart showing the outputted data from the image signal processing circuit 301A.

FIG. 21 is a timing chart showing the whole operation of the electrophoretic display. The electrophoretic display will be explained with reference to the figure.

Firstly, at time T0, a power supply of the electrophoretic display is turned on and the image signal processing circuit 301A, the timing generator 400A, and the electrophoretic display panel are turned on. After a predetermined time passes and the circuit is stabilized, at time t1, the timing generator 400A make the reset timing signal Cr active during one scanning field.

In this resetting period Tr, the data line drive circuit 140A outputs the reset voltage Vrest to each data line 102 and the scanning line drive circuit 130 sequentially selects each scanning line 101.

In this way, the reset voltage Vrest is applied to all pixel electrodes and the pigment particles 3 are attracted to each pixel electrode, so that the particles 3 are initialized.

At time t2, the writing period Tw begins. In this period Tw, the image signal processing circuit 301A outputs the differential image data Dd. The applied voltage +Va or −Va is applied during the period corresponding 10 to the difference between a color gradation to be next displayed and a present color gradation is applied to each pixel electrode 104.

Nevertheless in the first field (from time t2 to t3), the image data Dv is supplied as the differential image data Dd to the data line drive circuit 140A, which means that the voltage +Va is applied to each electrode 104 during each time period corresponding to each gradation to be displayed. It is to be noted that a color gradation is changed into 0% (or 100%) having carried out resetting, the operation in the first period is essentially equivalent, in terms of basic function, to applying the voltage Va during a time period corresponding to the difference between a present gradation and a gradation to be displayed next, in the first field.

(2-3-1) Writing Operation

Figure 22:
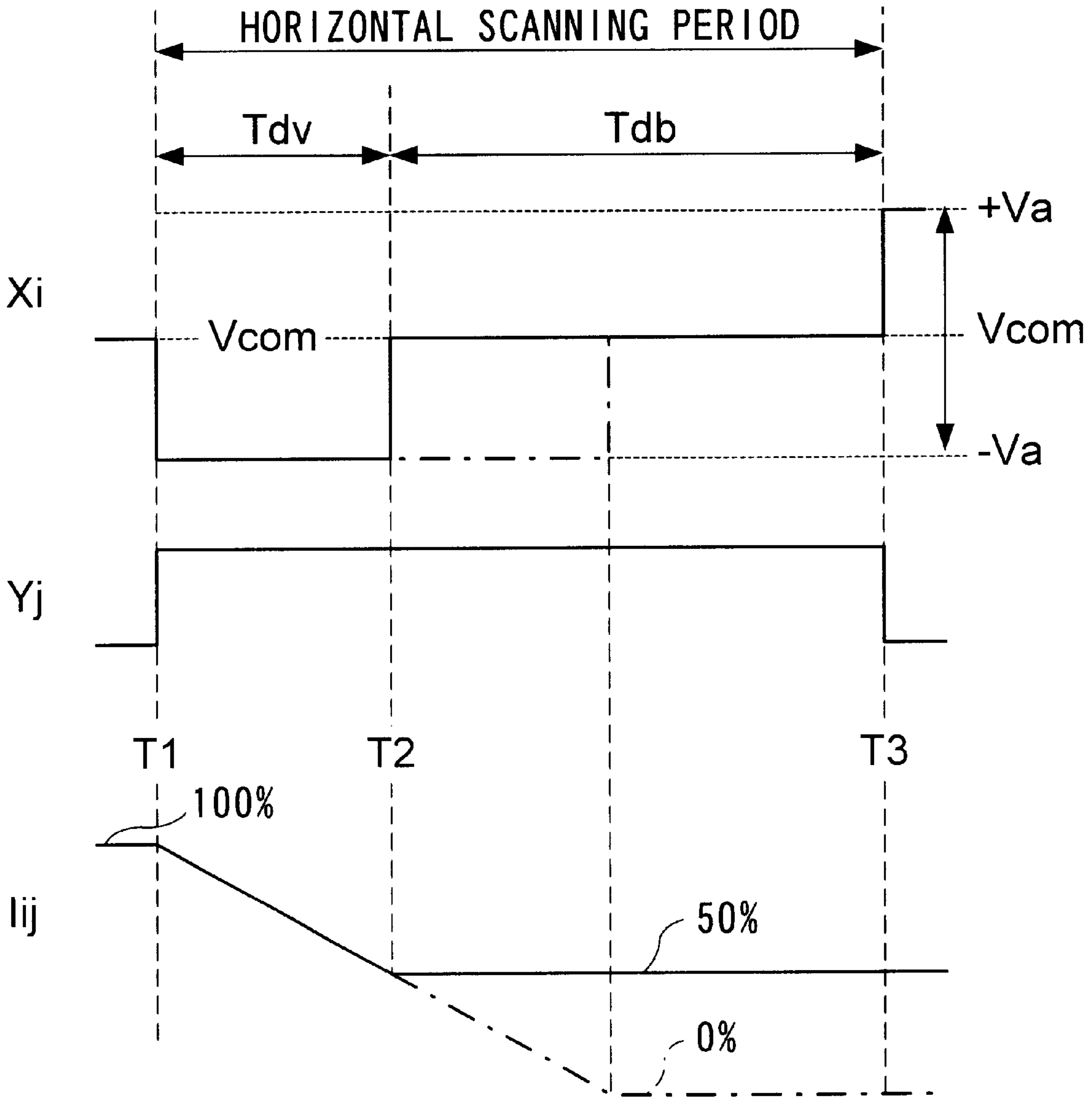
FIG. 22 is a timing chart employed in a writing operation of the electrophoretic display.

FIG. 22 is a timing chart of the electrophoretic display in the writing operation. Here will be described an ith row (ith scanning line) and jth column (jth data line), but it will be apparent that other pixels can be treated similarly. In the case that the pixel Pij is displayed 100% in the immediately preceding field, the solid line and dotted line show 50% and 0% gradation required to be displayed in the present field, respectively.

A voltage of data line signal Xj supplied to the jth line 102 is +Va or −Va in the differential voltage applied period Tdv shown in FIG. 22. If a gradation necessary to be displayed in the present field is 50%, which is equivalent to a 50% decrease from the immediately previous field, and therefore the applied voltage −Va is selected in the period Tdv as shown in FIG. 22. In a no-bias period Tdb the PWM signal Wj is inactive.

The scanning line signal Yi supplied to the ith scanning line 101 is active during the period of the ith horizontal scanning. The TFT 103 of the pixel Pij is switched on during that period and the data line signal Xj from time T1 to T3 is applied to the pixel electrode 104 of the pixel Pij. That is, in this embodiment, an operation that begins with applying the applied voltage −Va to the pixel electrode 104 and ends with applying the common voltage Vcom thereto is completed within a selected period of a horizontal line. Since the holding operation in this embodiment is the same as that employed in the first embodiment, explanation is omitted here.

(3) Third Embodiment

In the first embodiment, firstly the applied voltage Va is applied to the pixel electrodes 104 during a time period corresponding to a color gradation to be displayed, to move the particles 3 by a distance corresponding to the gradation, secondly the common voltage Vcom is applied to the pixel electrodes 104 not to apply any electric field to the particles 3. Additionally, the image data D is compensated in the image signal processing circuit 300A before outputting, taking inertia into consideration, in a case that there is a low fluid resistance in the dielectric fluid 2, and the particles 3 are therefore able to continue to migrate under inertia.

In fact., it can take a considerable time for the pigment particles 3 to lose their kinetic energy depending on the level of fluid resistance encountered in the dielectric fluid 2. In the above example, since pigment particles 3 migrate away from pixel electrodes 104 to the common electrode, if there is little fluid resistance the image displayed will not reach optimum brightness within a desired time.

In the third embodiment, an electrophoretic display designed to prevent fluctuations in brightness is provided. It is configured in the same manner as that of the first embodiment shown in FIG. 3, except that image signal processing circuit 300B and data line drive circuit 140B is used instead of the image signal processing circuit 300A and the data line processing circuit 140A.

(3-1) Image Signal Processing Circuit

Figure 23:
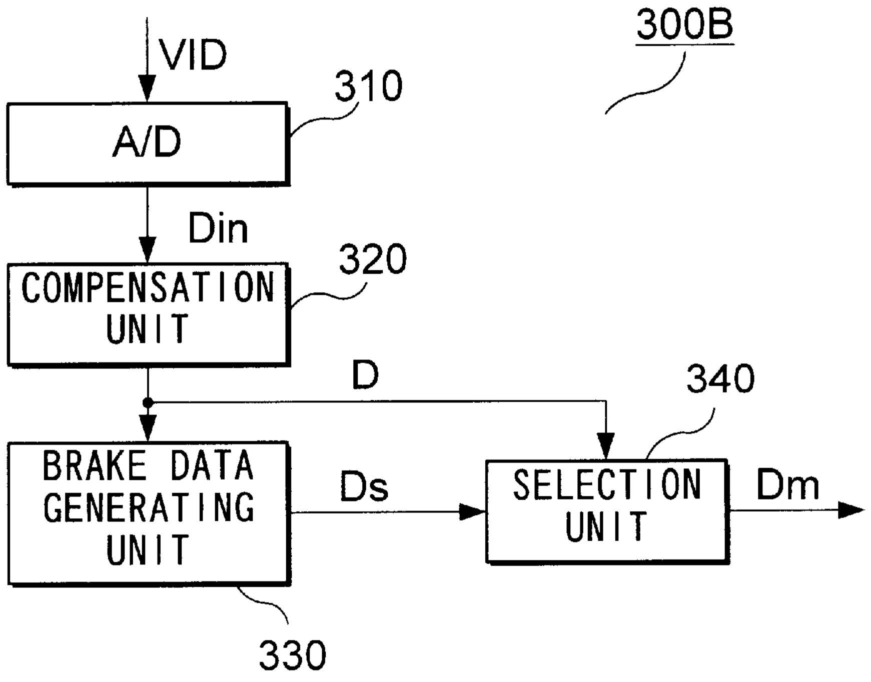
FIG. 23 is a block diagram of the image signal processing circuit 300B.
Figure 24:
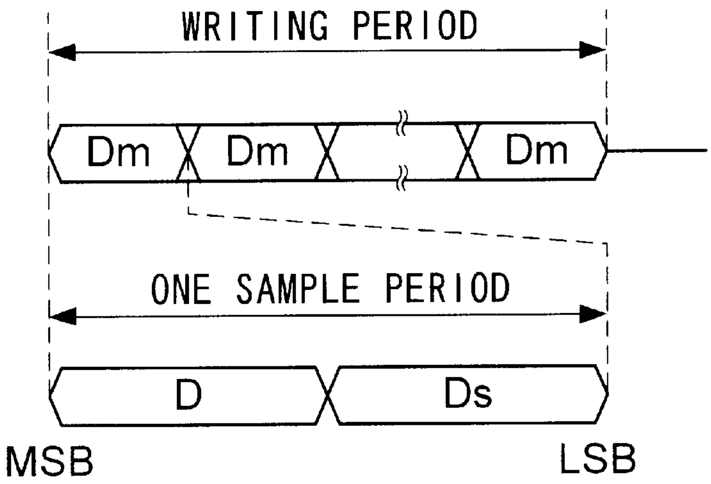
FIG. 24 is a timing chart of the outputted data from the image signal processing circuit 300B.

FIG. 23 is a block diagram of image signal processing circuit 300B and FIG. 24 is a timing chart for output data. As shown in FIG. 23, an image signal processing circuit 300B is provided with an A/D converter 310, a compensation unit 320, a brake voltage generation unit 330 and a selection unit 340. The A/D converter 310 converts an image signal VID from analog to digital form and outputs it as an input image data Din. The compensation unit is provided with a ROM or other suitable memory and generates an image data D undergoing compensation processing such as gamma correction.

The brake voltage generation part 330 is provided with a table in which the brake voltage data Ds and image data D having values corresponding to those of Ds are memorized. The brake voltage data Ds is acquired by accessing the table and using image data D as an address. The table is provided with storage circuits such as RAM or ROM, or other suitable storage circuits. The brake voltage data Ds is employed for braking a motion of the particles 3 and corresponds to the brake voltage applied period Ts.

The particles 3 are subject to the action of a Coulomb force generated by applying an electrostatic field corresponding to the applied voltage Va. In the voltage applied period Tv, the particles are accelerated by the force and migrate. However, when the field is removed, the particles will have inertial movement.

In order to stop this inertial movement, or, in other words, to brake the particles 3, it is necessary to apply an electrostatic field acting in a direction opposite to their initial movement. The duration for applying this field is dependent on the kinetic energy of pigment particles 3, or, in other words, the gradation to be displayed. Therefore, in this embodiment, taking into account a fluid resistance of dielectric fluid 2, among other factors, the brake voltage data Ds, corresponding to the values of the image data D, is generated and memorized in the table beforehand for reading.

As shown in FIG. 24, a selection unit 340 outputs multiplex data Dm combining image data D and brake data Ds in the writing period. For example, the image data D consists of 6 bits; brake data Ds is also 6 bits; with three multiplex data Dm consisting of 12 bits. Consequently, 6 bits from the MSB comprises the image data D, and 6 bits from the LSB comprises the brake data Ds.

(3-2) Data Line Drive Circuit

A data line drive circuit 140B is similar to the data line drive circuit 140A in the first embodiment except for the configuration of the PWM circuit 145B.

Figure 25:
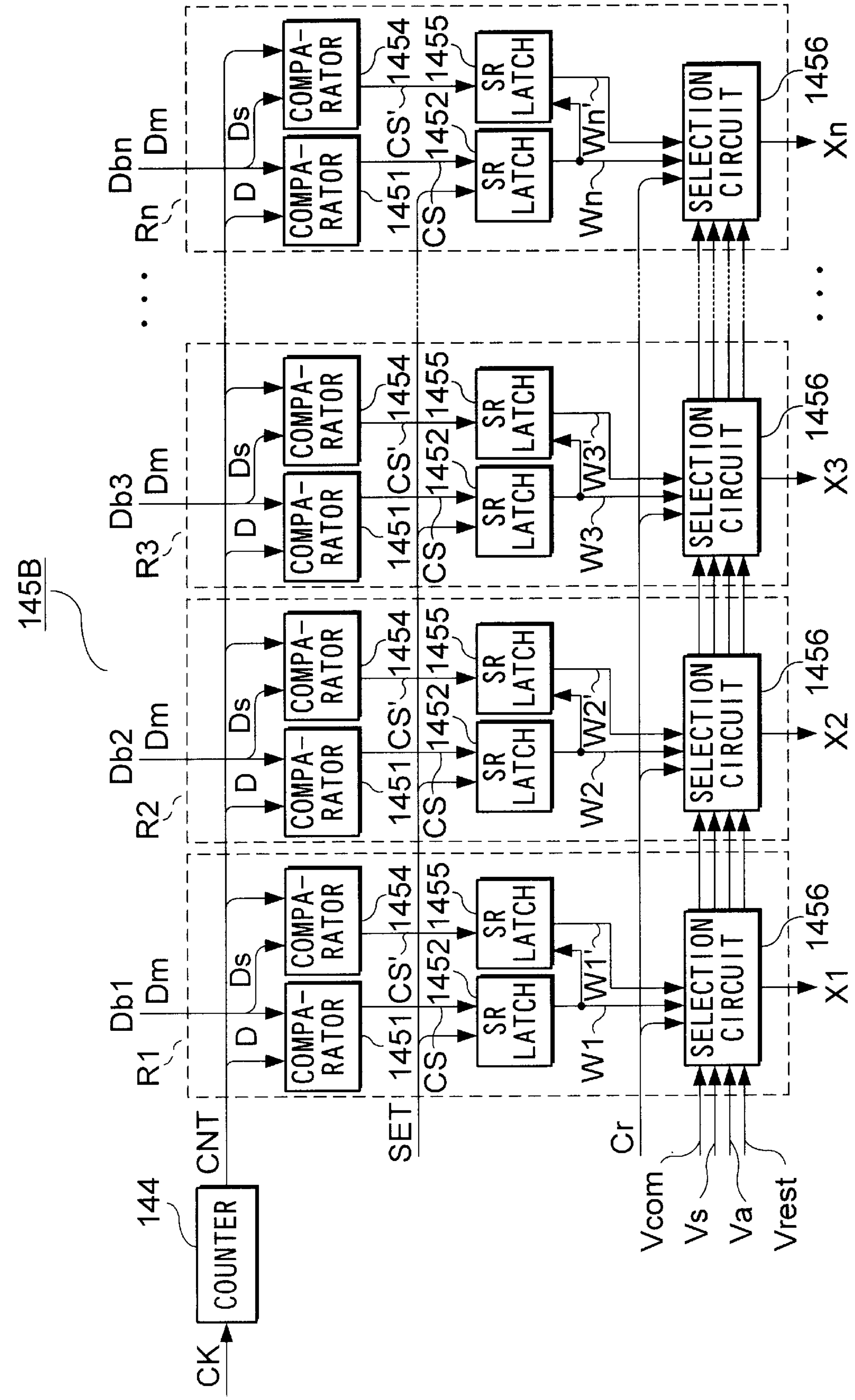
FIG. 25 is a block diagram of the PWM circuit 145B.
Figure 26:
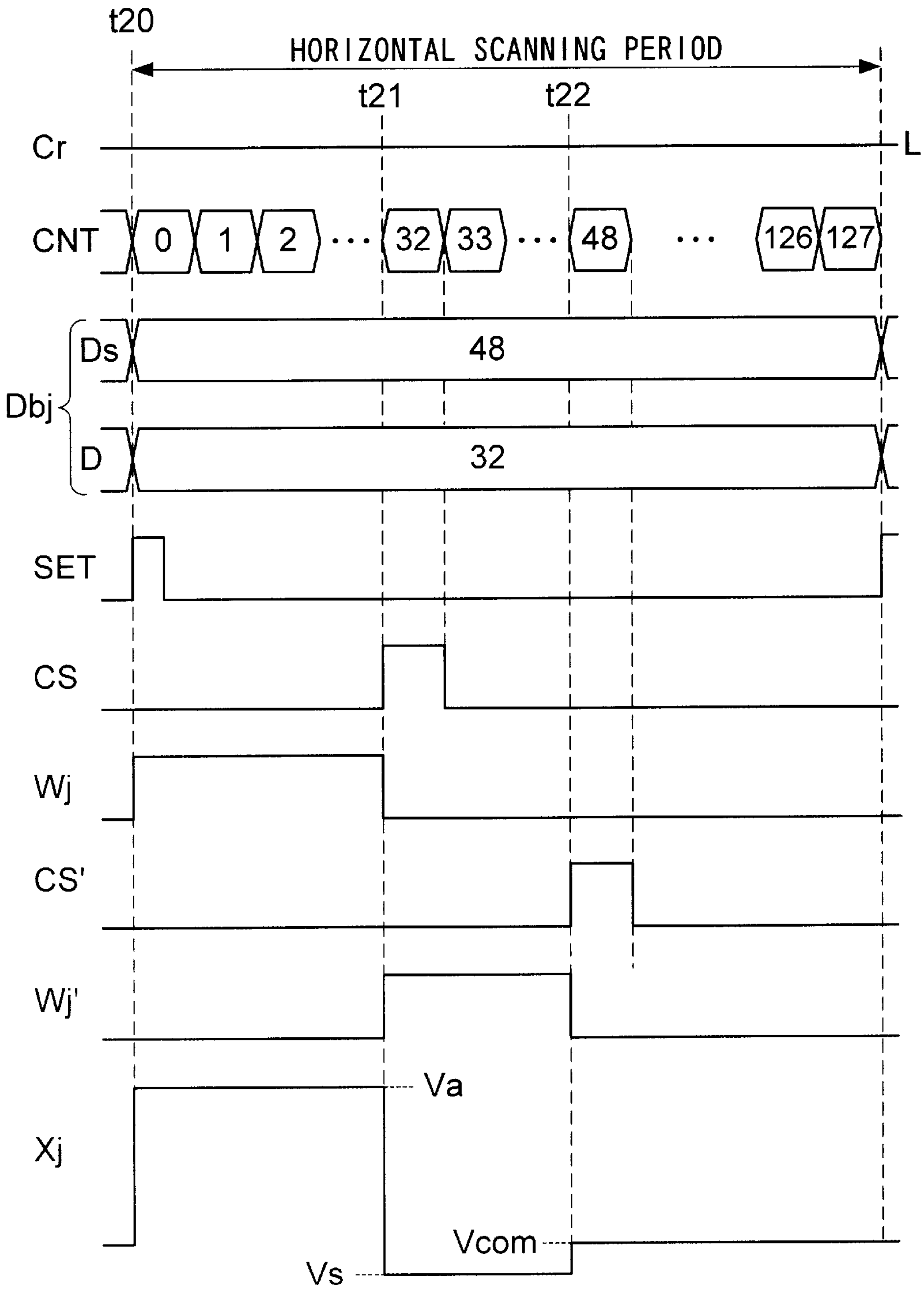
FIG. 26 is a timing chart of a unit circuit Rj of the PWM circuit 145B.
Figure 27:
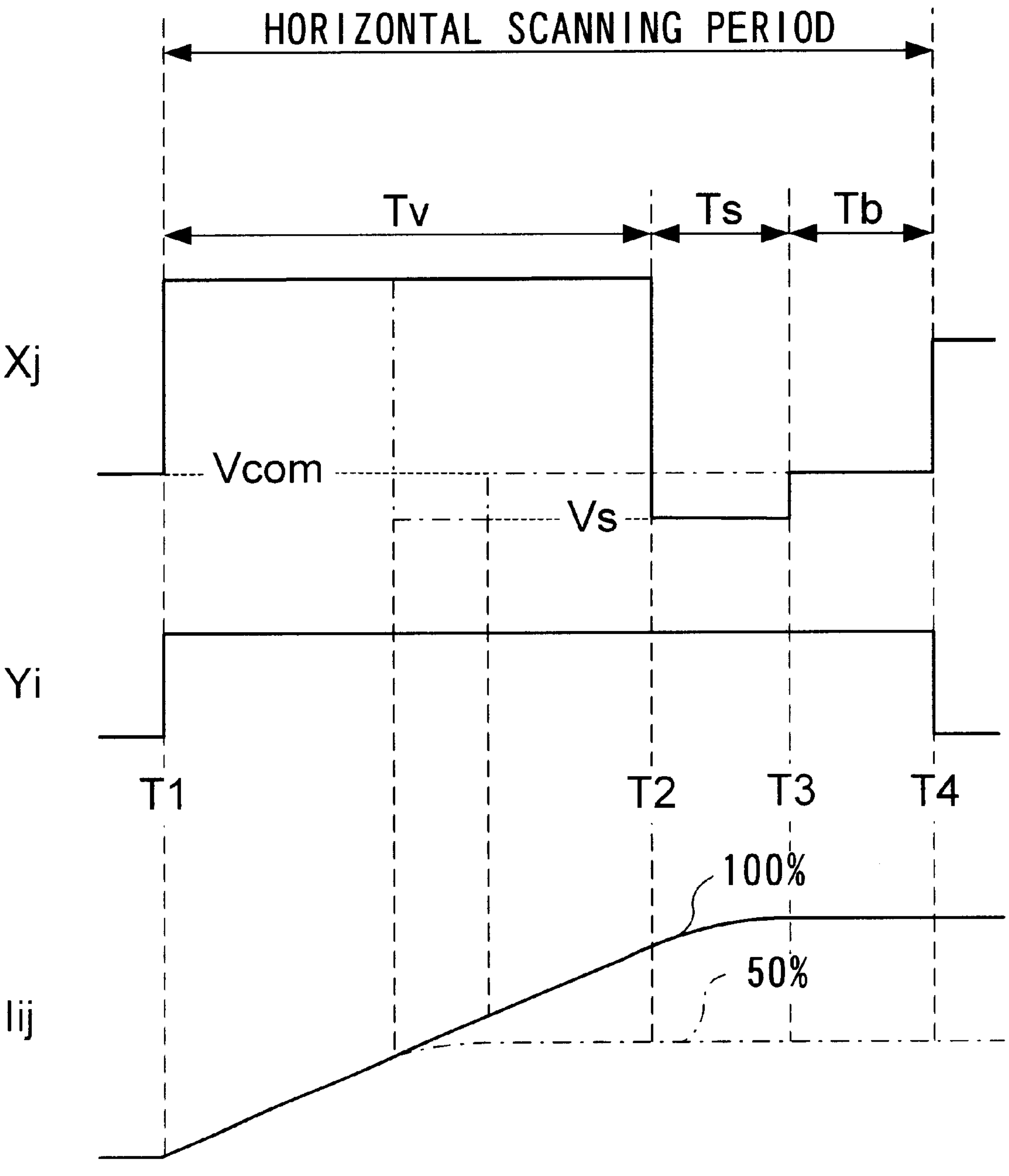
FIG. 27 is a timing chart employed in a writing operation of the electrophoretic display.

FIG. 25 is a block diagram of a selection circuit 145B and FIG. 26 is a timing chart of it. As shown in FIG. 25, the PWM circuit 145*b* is provided with each unit circuit R1 through Rn. Each unit circuit differs from the PWM circuit 145 based on the first embodiment shown in FIG. 8 in a point that a comparator 1454 and a SR latch 1455 are added and a selection circuit 1456 is employed instead of the selection circuit 1453.

The image data D composed of the upper bits of the multiplex data Dm is supplied to the comparator 1451 comprising each unit circuit R1 through Rn, while the brake data Ds composed of the lower bits is supplied to the comparator 1454. The comparator 1454 generates a comparison signals CS' which becomes active (in the H-level) when the data CNT and the stop data Ds agree.

Next, each SR latch 1455 sets the power level (the H-level) on the trailing edge, while resetting it (the L-level) on the rising edge. The PWM signals W1 through Wn, which are outputted from each SR latch 1452, are supplied to the set terminals, while the comparison signals CS' are supplied to the reset terminals thereof. Signals from each SR latch 1455 are supplied as brake signals W1' through Wn' to the selection circuit 1456.

Next, each selection circuit 1456 selects an appropriate voltage from among the reset voltage Vrest, the applied voltage Va, the stop voltage Vs, or the common voltage Vcom and outputs it. The selection criteria is as follows.

The selection circuit 1456 selects the reset voltage Vrest if the reset timing signal Cr is active (in the H-level); selects the applied voltage Va if the reset timing signal Cr is inactive (in the L-level) and the PWM signal is active (in the H-level); selects the brake voltage Vs if the reset timing signal Cris inactive (in the L-level) and the brake signal is active (in the H-level); and selects the common voltage VCom if the reset timing signal Cr and the PWM signal and the brake signal is inactive (in the L-level).

Next will be described in detail an operation of an ith unit circuit Rj referring to FIG. 26. Suppose that the reset timing signal Cr is inactive during a horizontal scanning period and a line-sequential image data Dbj comprises an image data D and a brake data Ds. For example, the image data and the brake data designate the level “32” and “48”, respectively. A shown, a PWM signal Wj keeps the H-level until the count data takes on a value of “32” (during the period from time t20 to t21). The SR latch 1455 is triggered on the trailing edge of the PWM signal Wj, so that the brake signal Wj' shifts from the L-level to the H-level at time t21. At time t22, the count data CNT take a value of “48”, which is the same as that of Ds. At the same time, the comparison signal CS' shifts from the L-level to the H-level and, in synchronous with this rising edge, the brake signal Wj' shifts from the H-level to the L-level.

As mentioned above, the selection circuit 1455 selects the applied voltage Va during the PWM signal Wj in the H-level, selects the stop voltage Vs during application of the brake signal Wj' in the H-level, and selects the common voltage Vcom during these signals in the L-level. Therefore a voltage on the data line signal Xj is, as shown in FIG. 26, equivalent to the applied voltage Va from time t20 to 22, to the stop voltage from time 21 to 22, and to the common voltage Vcom from t22 until the end of the horizontal scan.

The data line signal from X1 to Xn generated in this way is supplied to each data line 102 and is applied to the pixel electrodes 104 synchronous with the scanning line signal Y1 through Ym.

(3-3) Operation of Electrophoretic Device

The operation of an electrophoretic display in this embodiment is similar to that of the first embodiment described with reference to FIG. 11, in that its sequence starts with a resetting operation, to be followed by writing and holding, and ends with a rewriting operation. However, it differs from the operation based on the 1st embodiment in that an additional operation is employed in which the brake voltage Vs is applied to the pixel electrodes 104 during a certain time period in a writing operation (contains rewriting). The difference in this writing operation, will now be described in detail.

FIG. 26 shows a timing chart of the electrophoretic display in which the writing operation is employed. Next will be described an ith row and jth column, but it will be obvious that other pixels are, of course, dealt with likewise.

A data line signal Xj, which is supplied to the jth data line 102. A voltage of the data line signal Xj is equal to the applied voltage Va during the voltage application period Tv which starts with T1 and ends with T2, as shown in FIG. 26; is equal to the brake voltage Vs during a brake voltage application period Ts is from T2 to T3; and is equal to the common voltage Vcom, during a no-bias period Tb from T3 to T4.

A scanning line signal Yi supplied to the ith scanning line 101 is active during an ith horizontal scan. Hence a TFT 103 of the pixel Pij is turned on in the horizontal scanning period, so that the data line signal Xj is supplied to the pixel electrode 104 of the pixel Pij during a period from T1 to T4. Namely, in this example, firstly the applied voltage Va, secondly the brake voltage, and thirdly the common voltage is applied to the pixel electrode 104.

In the following, pigment particle motion will be described with reference to the pixel Pij. The reset operation is carried out before the writing operation and thus all pigment particles of the pixel Pij are positioned on the side of the pixel electrode 104 at time T1. At this time if the applied voltage Va is applied to the pixel electrode 104, an electric field is generated in the direction from the pixel electrode 104 to the common electrode 104. Thus particles 3 start to migrate at time T1 and the brightness Iij is being gradually high.

At time t2, the brake voltage Vs is applied to the pixel electrode 104. A duration of application of the brake voltage Vs is set according to the duration of the voltage Va applied in the immediately previous period. The brake voltage Vs has negative-polarity with reference to the common voltage Vcom. That is because an electric field for counteracting a Coulomb force must be applied, which was applied to the particles 3 in the direction of from the pixel electrodes 104 to the common electrode in the voltage applied period Tv. This brake voltage Vs, as it were, acts as a brake upon the particles 3 to give them Coulomb force whose direction is opposite with respect to their motions. With this operation the particles 3 stop migrating until time T3 which is the end of the brake voltage applied period Ts.

At time T3, the common voltage is applied to the pixel electrode 104. Being equal the voltage of the pixel electrode 104 and the common electrode, the electric charge accumulated between the two electrodes is taken away. As a result, any electric field is no longer generated and thus the positions of the particles 3 can be fixed.

In the writing operation based on this embodiment, firstly the applied voltage Va is applied to the pixel electrode of the pixel Pij 104 during a time period corresponding to a gradation to be displayed, and the particles 3 migrate. Next, the brake voltage is applied to the pixel electrode of the pixel Pij, and the particles 3 are put the brake on until they stop. Therefore even if the fluid resistance of the dielectric fluid 2 is small, a distance which the particles 3 migrate until the particles 3 stop due to the inertia can be short. This enables to display an stable image in a short time without fluctuation of brightness.

(4) Fourth Embodiment

The Fourth embodiment consists of a combination of the technique of differential driving described in the second embodiment and that of braking particles 3 described in the third embodiment. In the third embodiment, a constant voltage is applied to the pixel electrodes during a period corresponding to a gradation to be displayed. It is also possible to apply a constant voltage during a time period corresponding to a difference between a gradation to be next displayed and that now displayed.

The configuration of an electrophoretic display based on the fourth embodiment is similar to that of the second embodiment, except that an image signal processing circuit 301B and a PWM circuit 145B are employed instead of the image signal processing circuit 301A and the PWM circuit 145A, respectively.

(4-1) Image Signal Processing Circuit

Figure 28:
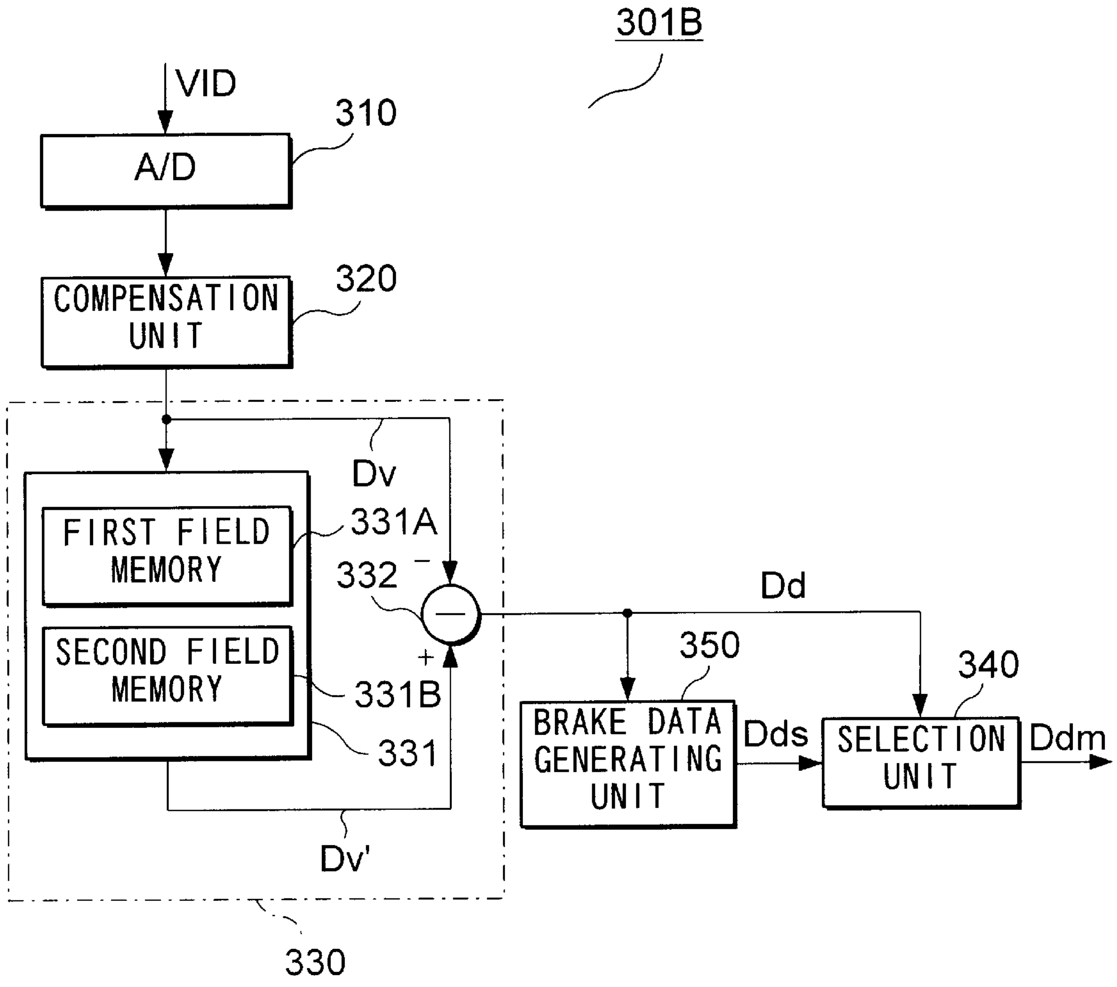
FIG. 28 is a block diagram of the image signal processing circuit 301B.

FIG. 28 is a block diagram of the image signal processing circuit 301B. The image signal processing circuit 301B shown in FIG. 28 differs from the image signal processing circuit 301A shown in FIG. 19 in that in the former a brake data generating unit 350 and a selecting unit 340 are provided subsequent to a calculation unit 330.

The brake voltage generation unit 350 has a table composed of RAMs, ROMs, and other suitable storage circuits. The table memorizes the brake voltage data Dds and a differential image data Dd each of which corresponds to each the brake data Dds. The brake data is employed for braking a motion of the particles 3, and the value of the brake data corresponds to the brake voltage applied period Tds. As mentioned above, the particles accelerate under the action of a Coulomb force and migrate. However, even though there is no electric field applied in the dispersal system 1, the particles continue to migrate under inertia.

In order to brake a motion of the particles 3, it is necessary to apply an electrostatic field to them acting in an opposite direction, and the duration of application is dependent on the kinetic energy of pigment particles 3; in other words, the gradation to be displayed. Therefore, in this embodiment, by taking into account fluid resistance of dielectric fluid 2 among other factors, the brake voltage data Ds corresponding to the values of the image data D is generated and memorized in the table beforehand for reading.

The selection unit 340 selects the differential image data Ds and the brake data Dds and generates multiplex data Dm, combining image data D and brake data Ds. For example, the multiplex data D consists of 6 bits, with brake data Ds also consisting of 6 bits, and thus the multiplex data Dm will consist of 12 bits. Thus, 6 bits from the MSB forms image data D and 6 bits from the LSB forms the brake data Ds. Operation of the selection unit 340 is as shown in FIG. 24, with the exception that differential image data D is replaced with Dd, and brake data Ds with Dds.

(4-2) PWM Circuit

Figure 29:
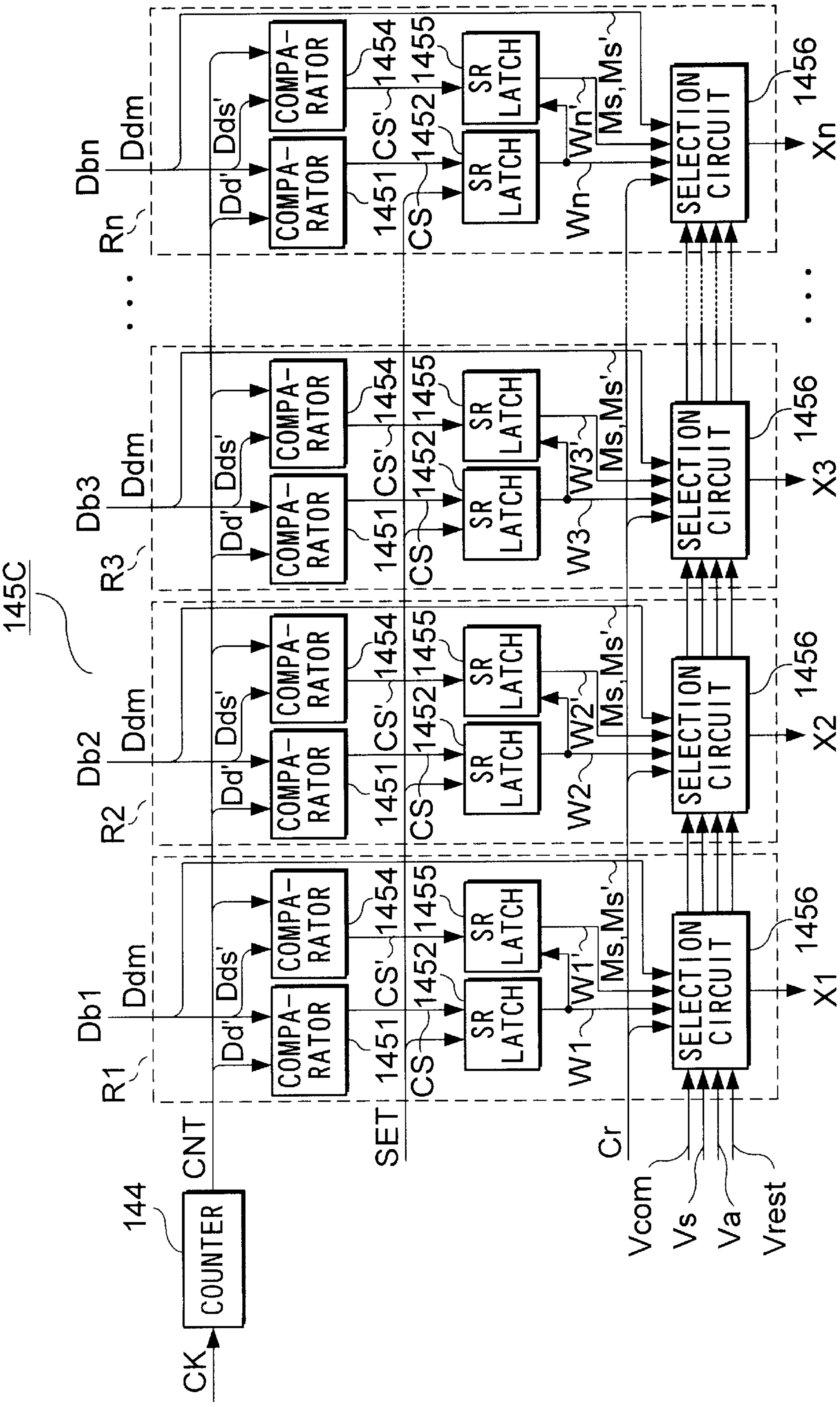
FIG. 29 is a block diagram of the PWM circuit 145C.
Figure 30:
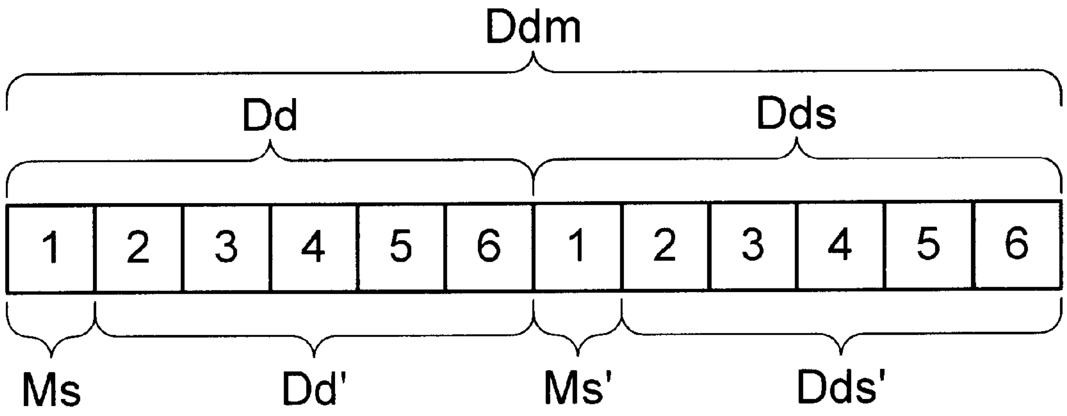
FIG. 30 shows the relation between the multiplex data Ddm and the data made by dividing the same.

FIG. 29 is a block diagram showing a configuration of the PWM circuit 145C and FIG. 30 shows a relation between the multiplex data Ddm and its divided data. As shown in FIG. 29, the PWM circuit 145C is provided with each unit circuit R1 through Rn to which each multiplex data Ddm is supplied as line-sequential data Db1 through Dbn.

Multiplex data Ddm is composed of the differential image data Dd and the brake data Dds as shown in FIG. 30. A most significant bit corresponds to the selection signal Ms, and the remaining lower 5*b* its correspond to the differential image data Dd'. In other words, the selection signal Ms and the differential image data Dd' are obtained by dividing the differential image data Dd into a sign bit (MSB) and other bits representing an absolute value of the differential image data Dd. A most significant bit of the brake data Dds is the selection signal Ms' and lower 5 bits except for the most significant bit is the brake data Dds'. In other words, the selection signal Ms' and the differential image data Dd' are obtained by dividing the differential image data into a sign bit of the differential image data Dd, and other bits representing an absolute value of the differential image data Dd.

Each unit circuit R1 through Rn has a comparator 1451, 1454, and selection circuit 1456. The comparator 1451 compares count data CNT with a differential image data Dd' and generate a comparison signal CS. The comparison signal CS' shifts to be active (in the H level) if the count data CNT agrees with the differential image data Dd'. The comparator 1454 compares the count data CNT with a brake data Dds' and generates a comparison signal CS'. The comparison signal CS' shifts to be active (in the H-level) if the count data CNT agrees with the brake data Dds'.

Each unit circuit 1456 selects an appropriate voltage among the reset voltage Vrest, the applied voltage +Va, −Va, the brake voltage +Vs, −Vs, and the common voltage, based on the reset timing signal Cr, the PWM circuit, the brake signal W1' through Wn', the selection signal Ms, and Ms'.

The selection criteria is as follows:

If the reset timing signal Cr is active (the H-level), the selection circuit 1456 selects the reset voltage Vrest. If the reset timing signal Cr is inactive (L-level) and the PWM signal is active (H-level), the selection circuit 1456 selects the applied voltage +Va or −Va. If the reset timing signal Cr is inactive and the stop signal is active (H-level), the selection circuit 1456 selects the brake voltage +Vs or −Vs. And if both the reset timing signal Cr and the PWM signal are inactive (L-level), the selection circuit 1456 selects the common voltage Vcom.

Additionally, in selecting the applied voltage +Va or −Va, the selection circuit 1456 selects the applied voltage −Va if the selection signal Ms is in the H-level and selects the applied voltage +Va if the signal Ms is in the L-level. And in selecting the brake voltage +Vs or −Vs, the selection circuit 1456 selects the brake voltage −Vs if the selection signal Ms' is in the H-level and selects the brake voltage +Vs if the signal Ms' is in the L-level.

Figure 31:
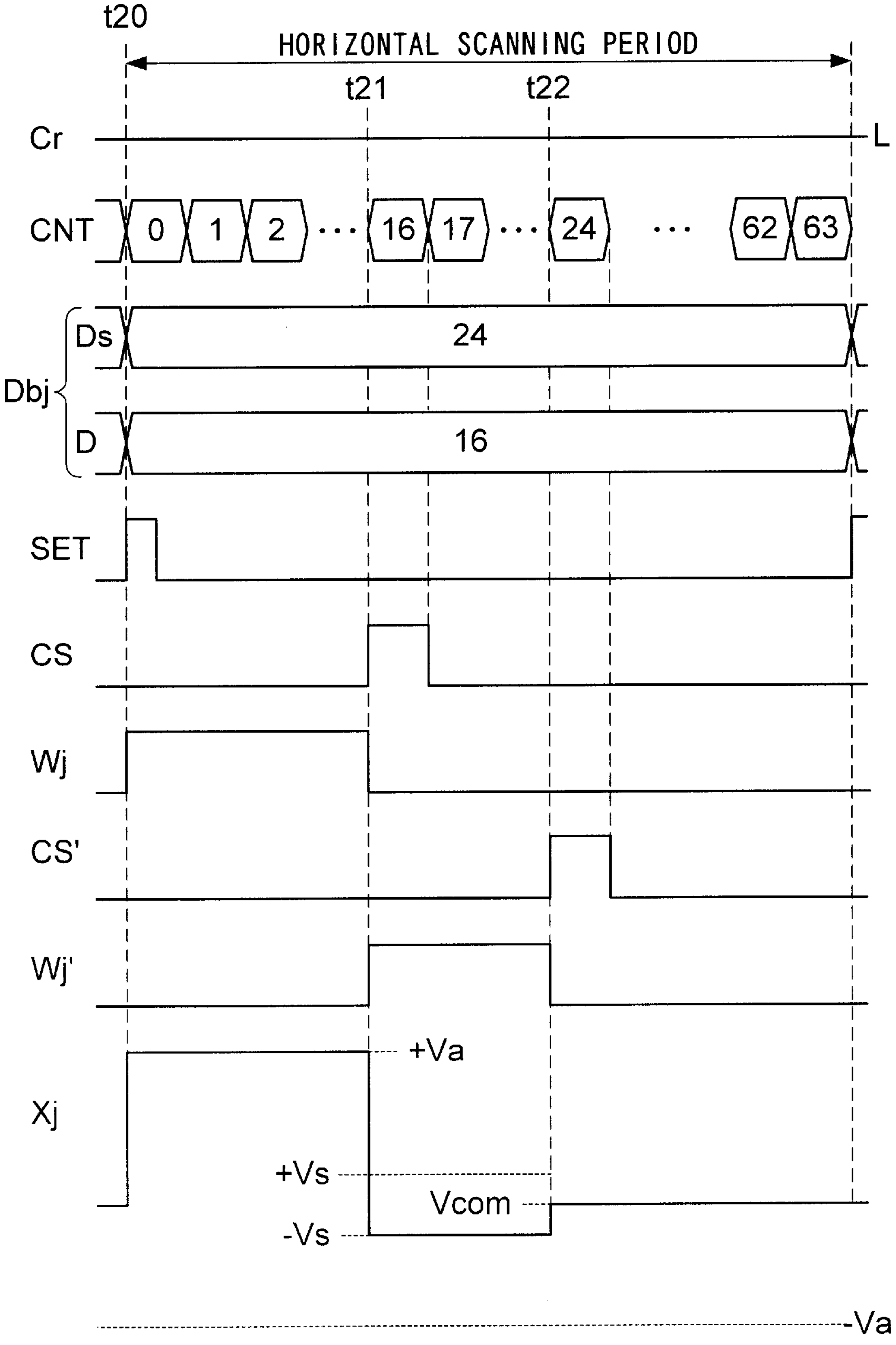
FIG. 31 is a timing chart showing an operation of the unit circuit Rj in the PWM circuit 145B.

An operation of a jth unit circuit Rj will be described specifically, referring to FIG. 31. Suppose that during a horizontal scanning period, the reset timing signal Cr is inactive differential image data Dd' designates the gradation value "16" the brake data Ds' designates the value "24", the selection signal Ms is "0", and the selection signal Ms' is "1".

The PWM signal Wj is in the H-level during a period from the beginning of the horizontal scanning period until the count data CNT has the value of "16" (from time t20 to t21). The SR latch 1455 is triggered on the trailing edge, thus the brake signal Wj' us shifted from the L-level to the H-level at time t21. When a time t22 comes, the count data CNT has the value of "24", being equal to that of the brake data Ds'. At this time the comparison signal CS' is shifted from the L-level to the H-level and the brake signal Wj' is shifted from the H-level to the L-level, synchronous with this rising edge.

As described above, the selection circuit 1456 selects the applied voltage +Va or −Va when the PWM signal Wj is in the H-level and selects the stop voltage +Vs or −Vs when the stop voltage Wj' is in the H-level. The selection signal Ms and Ms' are "0" and "1", respectively, therefore the selection circuit 1456 selects the applied voltage +Va and the brake voltage −Vs.

Further, when the PWM signal Wj and the brake signal Wj' are in the L-level, the common voltage Vcom is selected, thus a voltage of the data line signal Xj is equal to the applied voltage +Va from time t20 to t21. The voltage of the data line signal Xj is the brake voltage −Vs from time t21 to t22 and is the common voltage Vcom from time t22 until the end of the horizontal scanning period.

(4-3) Operation of the Electrophoretic Display

The electrophoretic display based on this embodiment is similar to that of the second embodiment described referring to FIG. 21, in that first a reset operation, second a writing operation, and third a holding operation are carried out in turn. However the display of this embodiment differs in that a process is included by which a brake voltage is applied to the pixel electrodes 104 in a writing operation. The difference in writing operation between the display of the second and present embodiment will now be described in detail.

Figure 32:
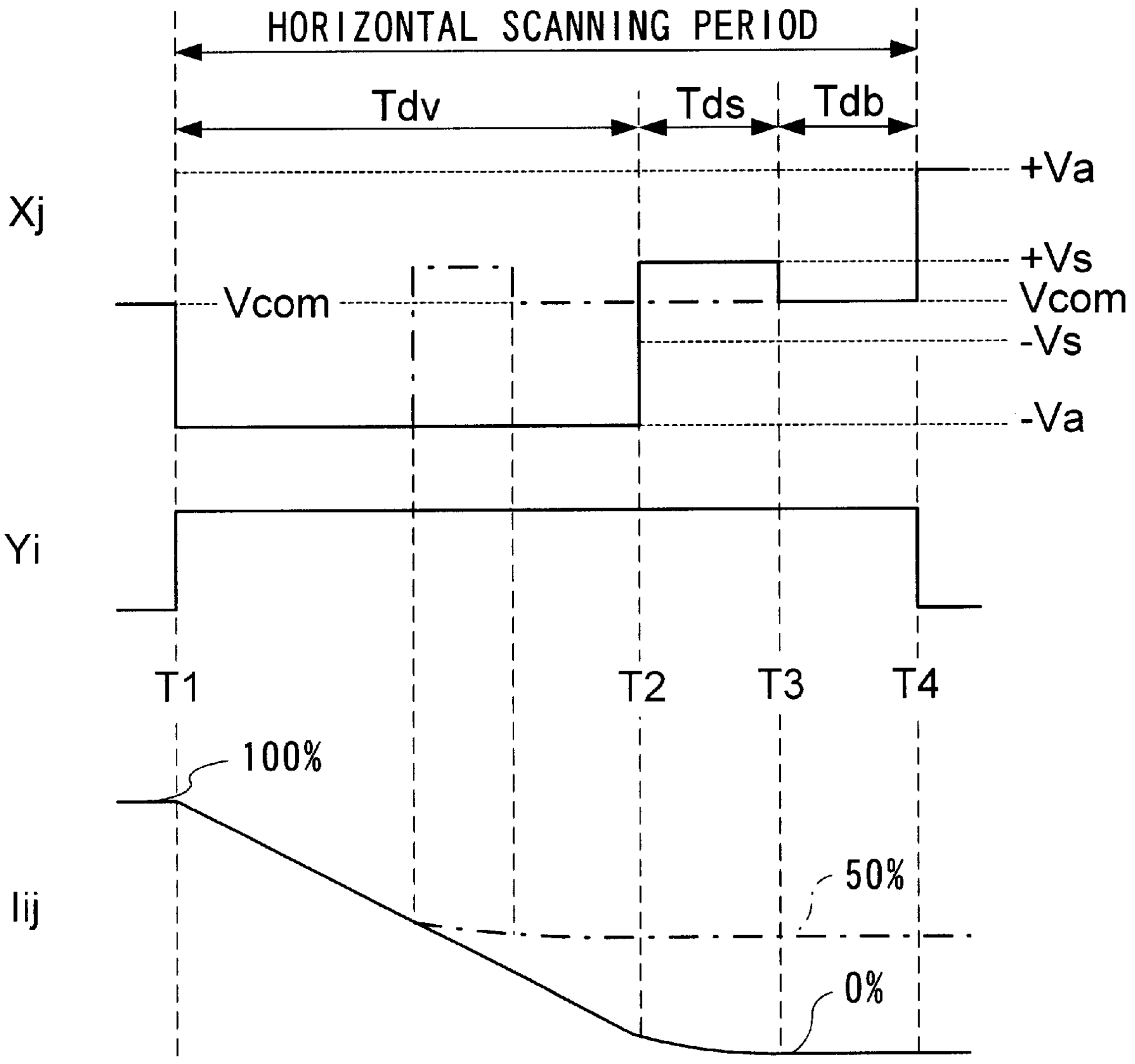
FIG. 32 is a timing chart employed in a writing operation of the electrophoretic display.

FIG. 32 is a timing chart of the electrophoretic display in the writing operation. In this description, an ith row (ith scanning line) and jth column jth data line) are described, but obviously other pixels can be treated in the same way. Suppose the pixel Pij is displayed 100% in the immediately preceding field. A solid line and dotted line show a 0% and 50% gradation required to be displayed in the present field, respectively.

A voltage of the data line signal Xj is equal to the applied voltage Va or −Va during a differential voltage applied period Tdv. A gradation to be displayed in the present field is 50% which entails a 50% decrease in that displayed in the immediately preceding field. Thus the applied voltage −Va is selected during the differential voltage applied period Tdv as shown in FIG. 28. The voltage of the data line signal Xj is +Vs during a brake voltage applied period Tds; and the voltage of the data line signal Xj is the common voltage during a no-bias period Tdb, which is from time T3 to T4.

The scanning line signal Yi is made active during the ith horizontal scanning, and thus the TFT103 of the pixel Pij is turned on during that period. The voltage of the data line signal Xj is applied to the pixel electrode 104 of the pixel Pij during a period from time T1 to T4.

(5) Fifth Embodiment

In this embodiment, similar to the first embodiment, a voltage is applied to the pixel electrodes 104 during a period corresponding to a gradation value of a n image data D. In the first embodiment, one horizontal scanning period is divided into the voltage applied period Tv and the no-bias period Th, whereby both migration and cessation of migration of the pigment particles 3 is completed within the horizontal scanning period. In the fifth embodiment, the applied voltage Va in addition to the common voltage Vcom is applied to the pixel electrodes 104 on a horizontal scanning period basis.

In the following, a period for applying the applied voltage Va and that for applying the common voltage are referred to as a voltage applied period Tvf and a no-bias period Tbf, respectively. The voltage applied period is composed of a plurality of horizontal scanning periods. And the number of the horizontal scanning periods is determined according to the value of an image data D.

In a method for driving the electrophoretic display based on this embodiment, each horizontal scanning period is divided into a first half period Ha and a second half period Hb, and different operations are carried out in the period Ha and Hb.

In the first half of each horizontal scanning period Ha, each scanning line is selected sequentially by applying the applied voltage Va to the pixel electrodes 104 of each the line. For example, the applied voltage Va is applied to the pixel electrodes 104 of the pixel of an ith line Pi1, Pi2 through Pim in the first half of an ith horizontal scanning period.

In the second half of each horizontal scanning period Hb, the common voltage Vcom is applied to each pixel electrode 104 corresponding to a gradation to be displayed as required. Suppose, for example, that a gradation to be displayed in the pixel Pi2, which is in row i and column 2, is "3". In this case, the common voltage is applied to the pixel in the second half of an i+3th horizontal scanning period. As a result, an electrostatic field is applied to the pixel Pi2 during three horizontal scanning periods, which is from the ith to an i+2th horizontal scanning period.

There are the following two prerequisite conditions for applying a voltage to the pixel electrode of pixel Pij. The first is to turn on the TFT 103 of the pixel Pij by selecting the ith scanning line 101. The second is to apply a predetermined voltage (Va or Vcom) to the jth data line 102 during the selected period. However, once the ith scanning line is selected, not only the pixel Pij but also all TFTs 103 are connected to the scanning line 101. Therefore, when the common voltage Vcom is applied to the pixel Pij, TFTs 103 of pixels Pi1 through Pij−1 and Pij+1 through Pim are turned on during the second half of a certain horizontal scanning period. If a voltage is applied to the pixels Pi1 through Pij−1 and Pij+1 through Pim at this time, a desired gradation cannot be attained.

To overcome this problem, in this embodiment data lines 102 connected with the pixels Pi1 through Pij−1 and Pij+1 through Pim are placed in a high-impedance state, to prevent unnecessary voltages being applied to the pixel electrodes 104.

The configuration of the electrophoretic display in this embodiment is similar to that in the first embodiment shown in FIG. 3, with the exception that the image signal processing circuit 300A is provided instead of the image signal processing 300C; the scanning drive circuit 130C instead of the scanning drive circuit 130A; and the data line drive circuit 140C instead of the data line drive circuit 140A.

(5-1) Image Processing Circuit

Figure 33:
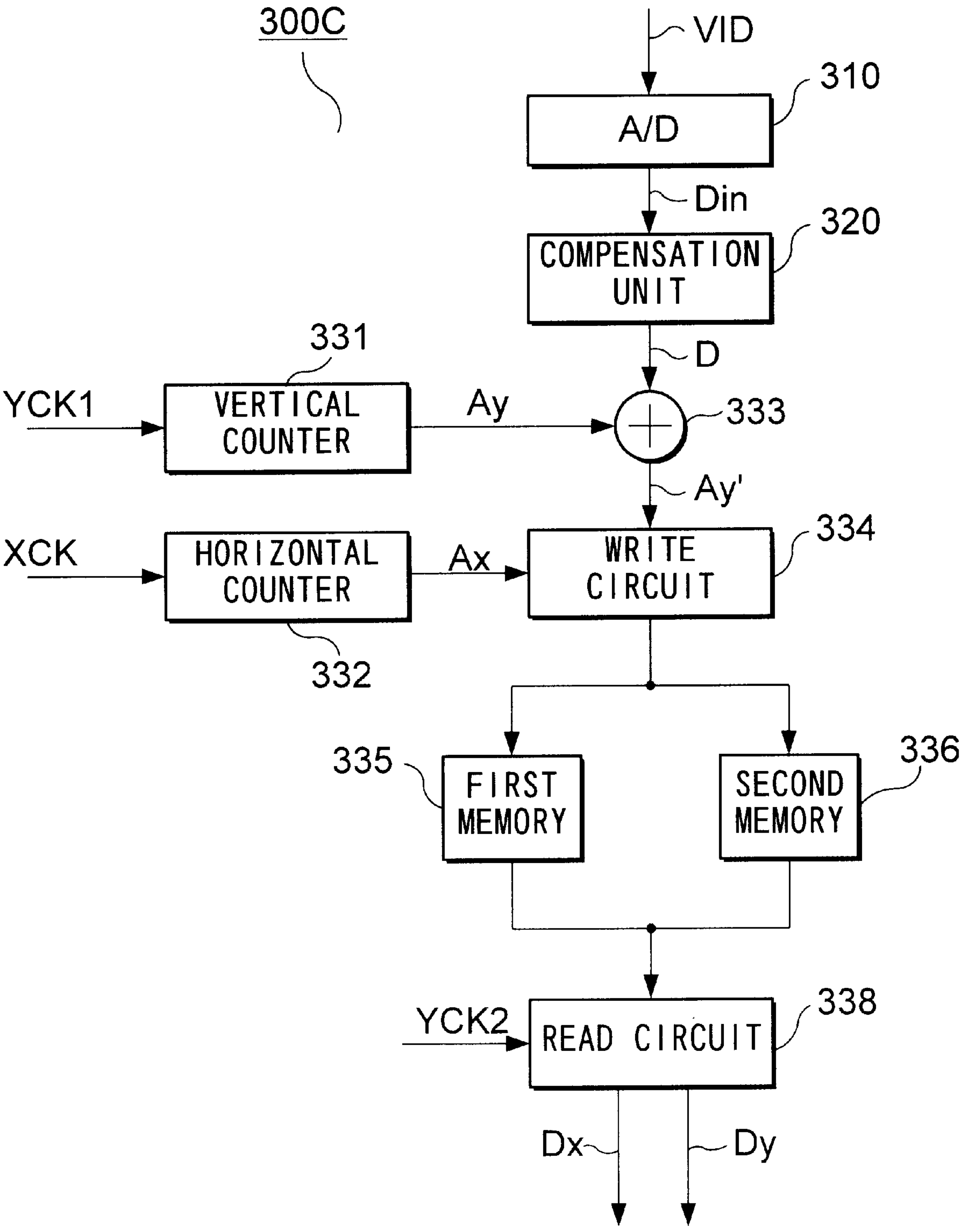
FIG. 33 is a block diagram of the image signal processing circuit 300C.

FIG. 33 is a block diagram of a configuration of the image signal processing circuit 300C. The image signal processing circuit 300C has an A/D converter 310 which translates an image signal VID into a digital signal and a compensation unit 320 which outputs image data D after performing compensation, such as gamma correction. The image data D consists of an equal number of bits as the scanning line 101. In this example, the scanning line 101 has 64 lines and the image data D consists of 6 bits. Additionally, the image signal processing circuit 300C has a vertical counter 331; horizontal counter 332; adder circuit 333; write circuit 334; a first and a second field memories 335 and 336; and a read circuit. The vertical counter 331 counts a first Y-clock YCK1 and generates a row address Ay, while the horizontal counter 332 counts X-clock XCK and generates a column address Ax. The row address Ay and the column address Ax determines when the present image data D is displayed in one scanning field. The adder circuit 333 generates an added address Ay' by adding the value of the image data D to the row address Ay.

The first memory 335 has an area of 128 (=2 m) rows and n columns as shown in FIG. 34, and each area can memorize 1 bit data. Information about a timing in which the common voltage is applied to the data line 102 is stored in the memory 335. Each column of the first memory 335 corresponds to each data line 102, and each line corresponds to the sequence of a horizontal scanning period.

The second memory 336 has an area of 64 (=m) rows and 128 (=2 m) columns as shown in FIG. 34. Each area memorizes 2 bit data. In the following, a storage area in which upper bits are stored is called an upper bits storage area, and that for lower bits is called a lower bits storage area. Data stored in the upper bits storage area designates whether a scanning line 101 is selected in the first half of a horizontal scanning period Ha. And data stored in the lower bits storage area designates whether the scanning line 101 is selected in the second half of the horizontal scanning period Hb. That is, the scanning lines 101 are driven based on the data stored in the second memory 336. The data stored in the first and second memories 335 and 336 are reset to "0" before the writing operation starts.

Next, the write circuit 334 writes data into the first memory 335 in a following procedure. The write circuit 334 writes "1" into an area specifying Ay and Ax as a row and column address, respectively. The write circuit 334 writes data into the second memory 336 in a following procedure. Firstly, the write circuit 334 writes "1" into the upper bits of an area specifying Ay as both row and column address. Secondly, the circuit 334 writes "1" into the lower bits of an area specifying Ay and Ay' as a row and column address, respectively.

Next, after the read circuit 338 finishes writing, it sequentially reads storage data by reading first an area in row 1 and column 1; second an area in row 1 and column 2, . . . , row 2 and column 1, row 2 and column 2, . . . , row 64 and column 1, . . . , row 128 and column n. In this way the read circuit 338 generates one bit data for an applying time data Dx and supplies it to the data line drive circuit 140C.

Furthermore, the read circuit 338 reads data from the second memory 336 in a following procedure, generates scanning data Dy, and supplies the scanning data Dy to the scanning line drive circuit 130C. The read circuit 338 reads data from the second memory 336 synchronous with the second Y-clock YCK2 whose frequency is be 2·m·fh (m=64) if the horizontal scanning frequency is fh. Firstly, the read circuit 338 reads data from the upper bits area in row 1 and column 1 then the upper bits area in row 1 and column 2, . . . , and the upper bits row 1 and column 64. Secondly, it sequentially reads data from the lower bits area in row 1 and column 1 then the lower bits area in row 1 and column 2, . . . , and the lower bits area in row 1 and column 64.

Subsequently the read circuit 338 reads data from column 2 to 128 as carried out for column 1. Therefore the scanning data Dy generated in the half period Ha of an ith horizontal scanning period is composed of data read out from the upper bits area in row 1 and column j, the upper bits area in row 2 and column j, . . . , and the upper bits area in row 64 and column j. While the scanning data Dy generated in the second half period Hb of the jth horizontal scanning period is composed of data read out from the lower bits area in row 1 and column j, the lower bits area in row 2 and column j, . . . , and the lower bits area in row 64 and column j.

In the following, an operation of the image signal processing circuit 300C will be described with reference to a case where the row address is "i", the column address is "j", and the value of the image data D is "3" as an example. The image data D here designates a gradation of the pixel Pij in row i and column j.

The write circuit 334 writes "1" into the upper bits area of row i and column j and writes "1" into the lower bits area of row i and column i+3 in the second memory 336 as shown in FIG. 35. As described above, the ith row in the second memory corresponds to the ith scanning line 101. The ith and i+3th column in the second memory 336 correspond to the ith and i+3th horizontal scanning period, respectively. And the lower bits area corresponds to the second half period of a horizontal scanning period, therefore the value "1" written in the lower bits area of row i and column i+3 means that the ith scanning line 101 is selected in the second half period of the i+3th horizontal scanning period.

Further, the write circuit 334 writes "1" into an area of row 1+3 and column j in the first memory 335. Each storage area in the jth column corresponds to the jth data line 102 and each storage area in the i+3th row corresponds to the i+3th horizontal scanning period. Thus the value "1" written in the area of row i+3 and column j means that the common voltage Vcom is applied to the jth data line 102 in the second half period Hb of the i+3th horizontal scanning period.

Therefore, the applied voltage Va is applied to the pixel electrode 104 of the pixel Pij during a period from the beginning of the ith horizontal scanning period until the end of the first half period Ha of the i+3th horizontal scanning period. When the second half period of the i+3th horizontal scanning period starts, the common voltage Vcom is applied to the pixel electrode 104 of the pixel Pij. As a result, the applied voltage Va can be applied to the pixel during a period corresponding to the gradation value designated by the image data D.

(5-2) Scanning Line Drive Circuit

Figure 36:
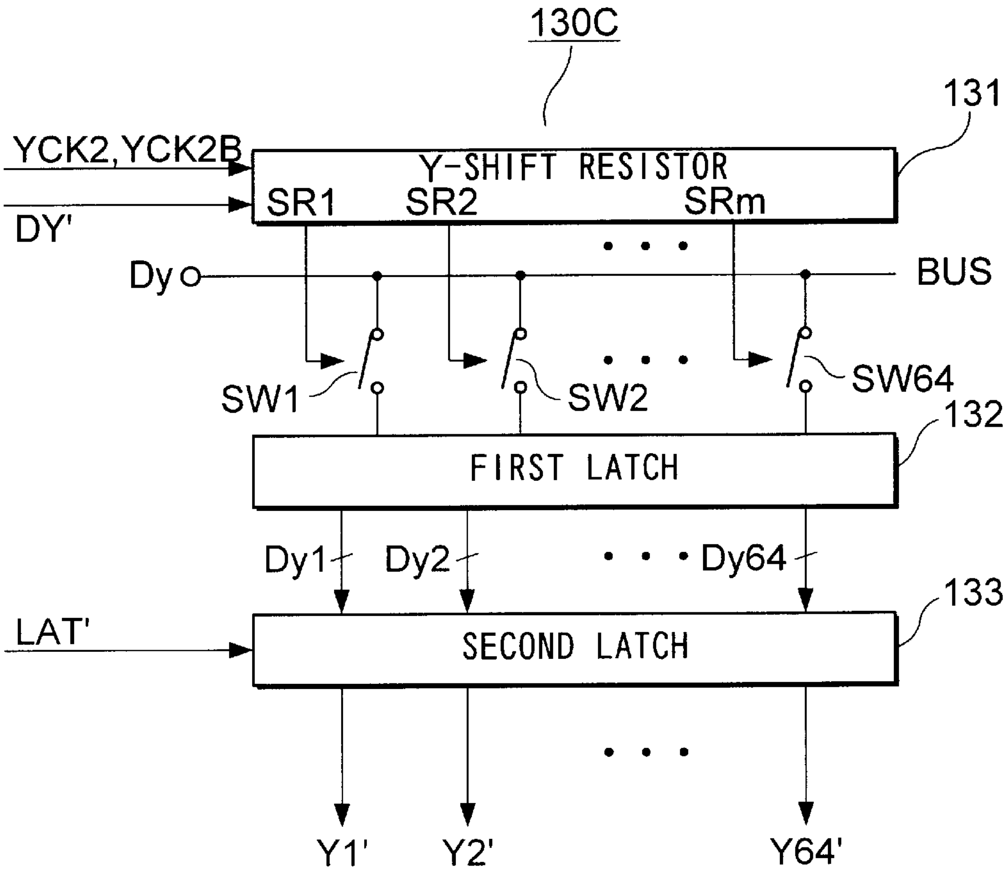
FIG. 36 is a block diagram of the scanning drive circuit 130C.
Figure 37:
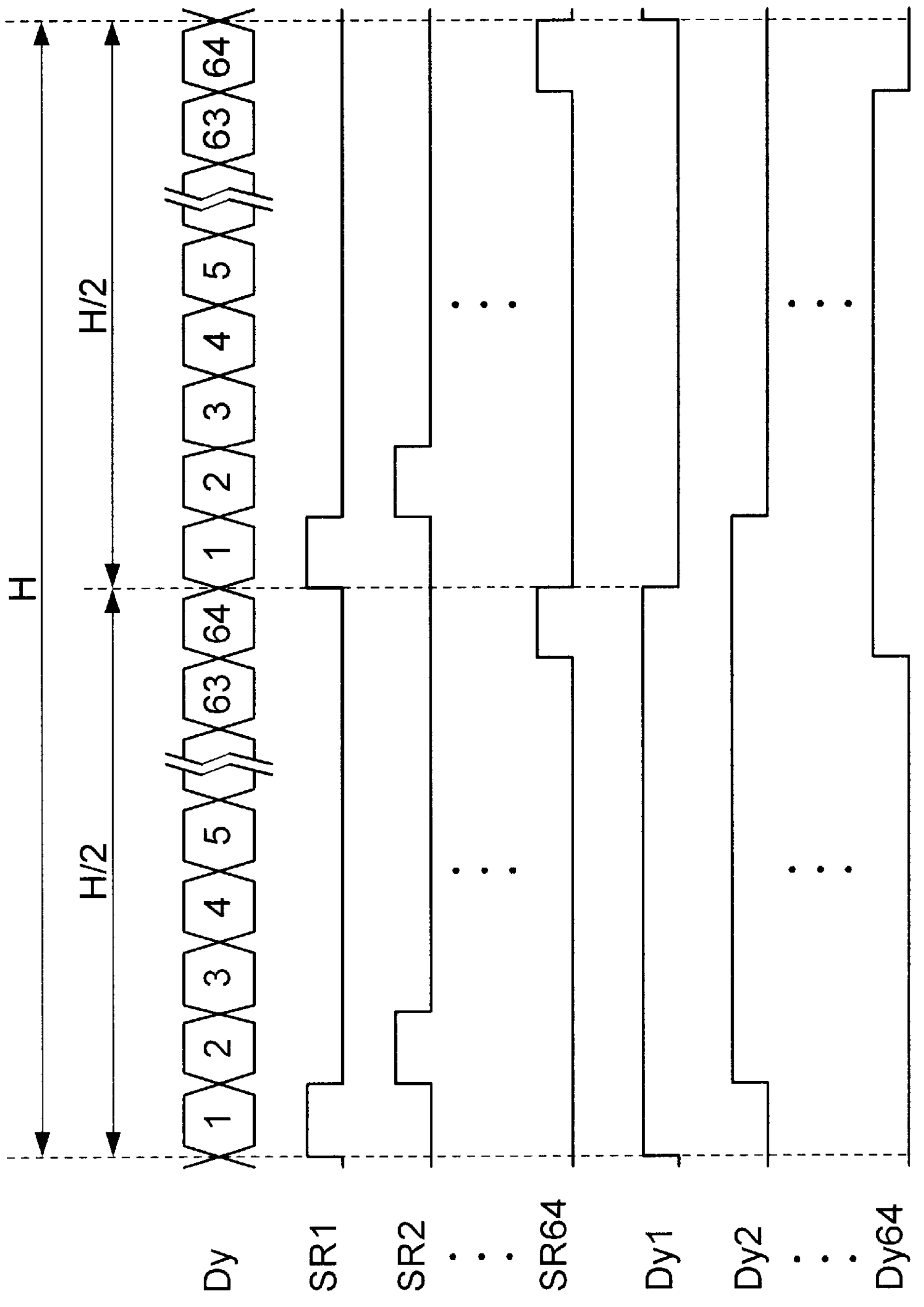
FIG. 37 is a timing chart of the scanning drive circuit 130C.
Figure 38:
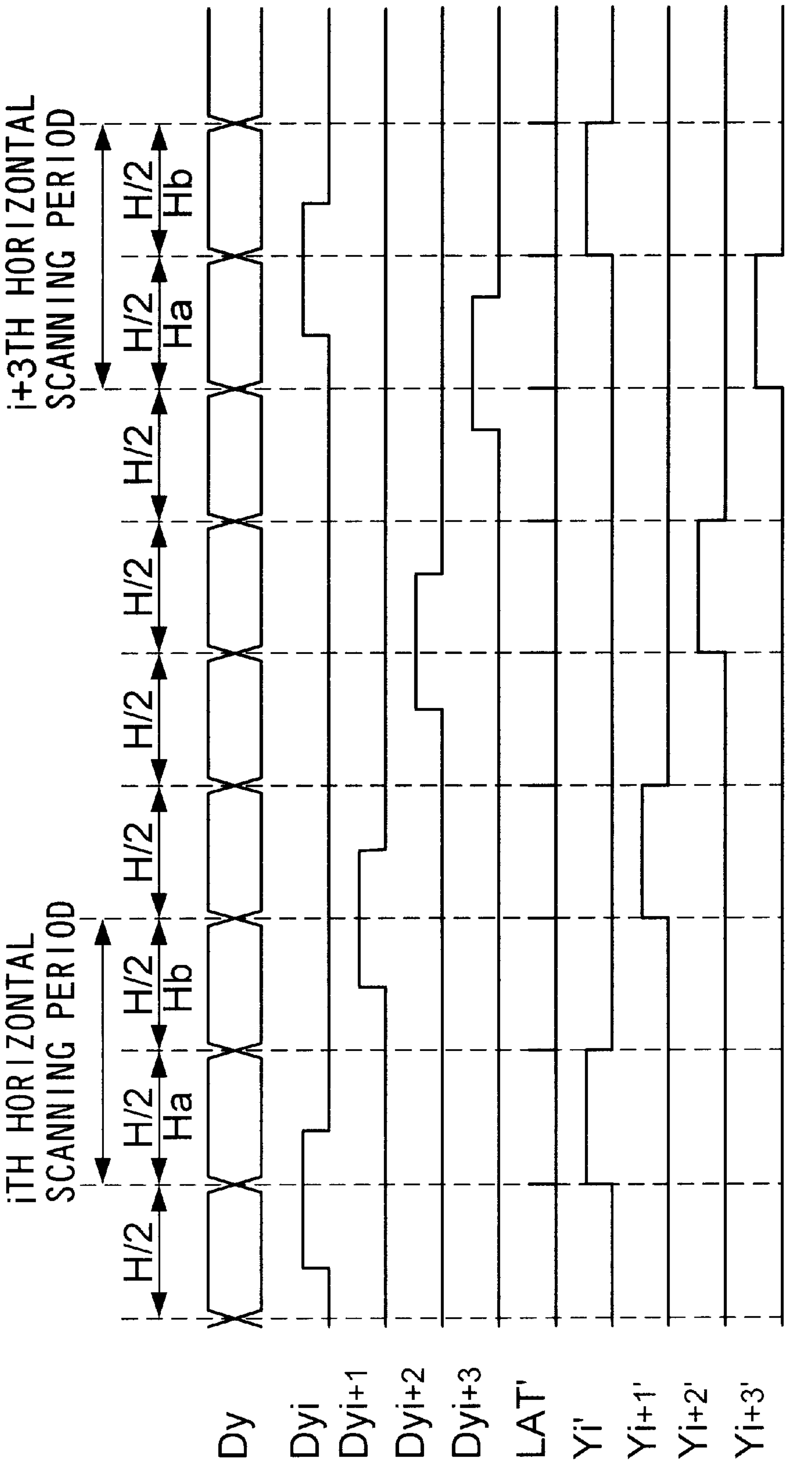
FIG. 38 is a timing chart of the scanning drive circuit 130C.

The scanning line drive circuit 130C will now be described. FIG. 36 is a block diagram of a configuration of scanning line drive circuit and FIG. 37 and FIG. 38 are a timing chart of the circuit. In this example, "m" representing the number of the scanning lines 101 is 64. The scanning line drive circuit 130C has a Y-shift register 131, switches from SW1 to SWm, a first latch 132, and a second latch 133.

The Y-shift register 131 sequentially shifts a transfer start pulse DY' according to the second Y-clock YCK2 and its reverse Y-clock YCK2B to generate sampling pulses from SR1 to SRm. Since a frequency of the second Y-clock YCK2 is chosen to 2·m·fh (m=64), one set of sampling pulses SR1, SR2, . . . , SR64 is generated within a half horizontal scanning period as shown in FIG. 37. Thus 64 scanning data Dy is sequentially sampled by the switches SW1 through SW64. The first latch 132 holds the sampled data and outputs data Dy1 through Dy64 as shown in FIG. 37. The second latch 133 latches the outputted data Dy1 through Dy64 according to a pulse LAT' having a period of a half horizontal scanning period. Outputted signals from the second latch 133 are supplied to each scanning line 101 as scanning signals Y1' through Y64'. For example, if the lower bits area in row i and column i+3 in the second memory 336 is "1" as shown in FIG. 35, output data from Dy1 to Dyi+3 will be as shown in from FIG. 38. The latch pulse LAT' latches the data, so that scanning signals Yi through Yi+3 shown therein are obtained. In other words, the scanning signal Yi' becomes active in the first half period Ha of the ith horizontal scanning period and in the second half period Hb of the i+3th horizontal scanning period.

(5-3) Data Line Drive Circuit

Figure 39:
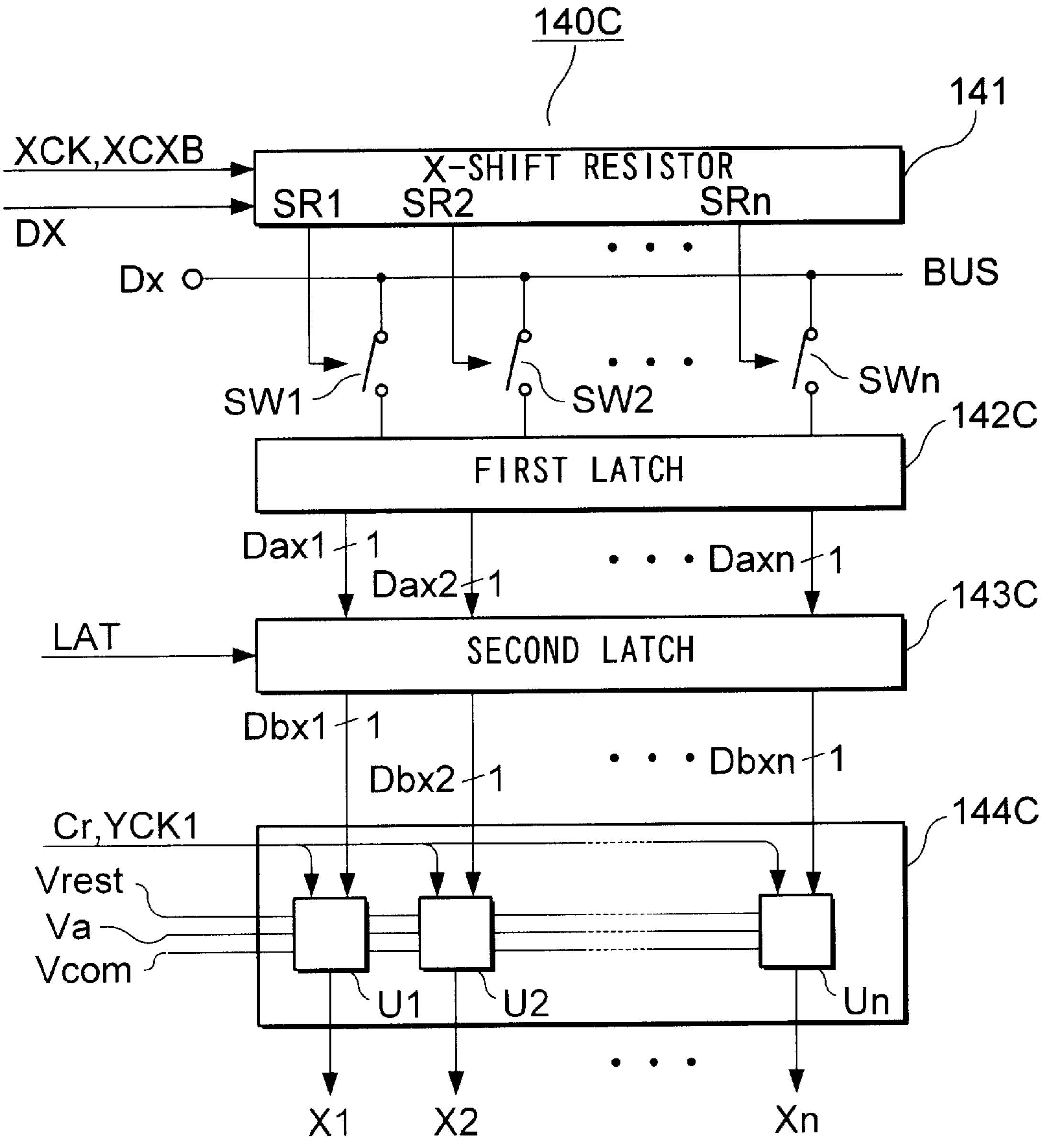
FIG. 39 is a block diagram of the data line drive circuit 140C.

The data line drive circuit 140C will now be described. FIG. 39 is a block diagram showing a configuration of the a data line drive circuit 140C. Circuit 140C is the same as 140A shown in FIG. 6, except that applying time data Dx is provided instead of an image data D, that a bus BUS, a first and a second latch 142C and 143C are composed of one bit, and that a PWM circuit 144C is provided instead of the PWM circuit 145.

The first latch 142C converts applying time data Dx into dot-sequential applying time data Dax1 through Daxn. The second latch 143C converts the dot-sequential data Dax1 through Daxn into line-sequential data Dbx1 through Dbxn. The PWM circuit 144C has n selection units from U1 to Un, each of which selects an appropriate voltage among the reset voltage, the applied voltage Va, or the common voltage based on the reset timing signal Cr, the first Y-clock YCK1, and applying time data Dbx1 through Dbxn and outputs the selected voltage.

Figures 40, 41:
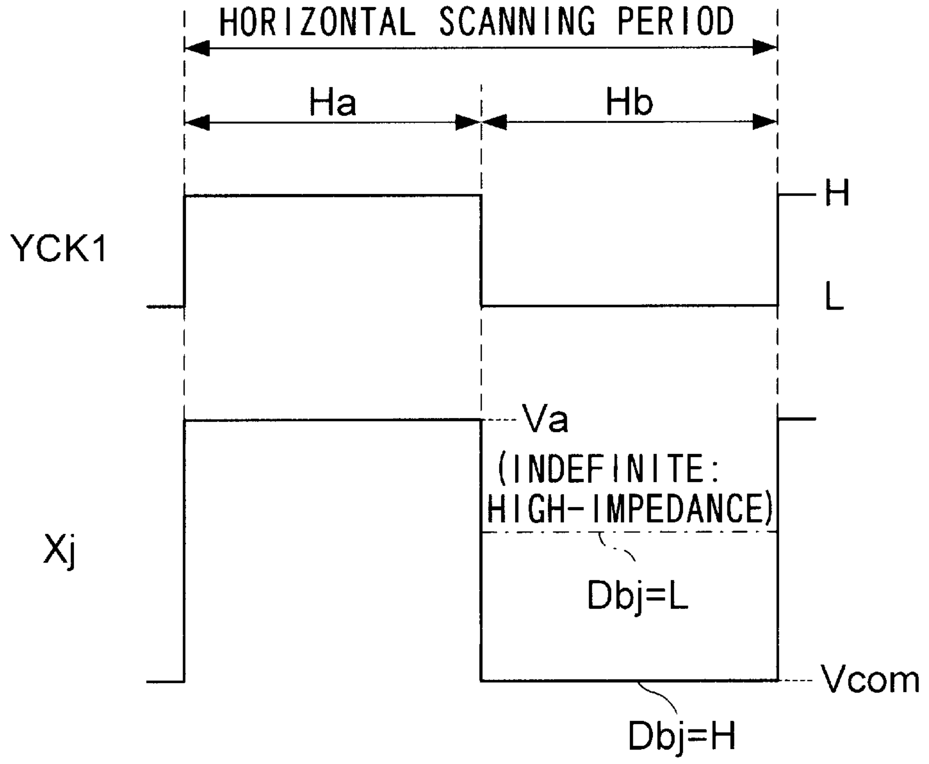
FIG. 40 is a truth table of the selection unit Uj used in the PWM circuit 144C.
FIG. 41 includes timing charts of the data line signal Xj and Y-clock YCK in case the reset-timing signal Cr is inactive.

FIG. 40 is a truth table showing an output state of a jth selection unit. It is noted that other units have similar truth tables. As shown therein it is obvious that when the reset timing signal Cr is active (the H-level), the data line signal Xj is equal to the reset voltage Vrest. While if the rest timing signal Cr is inactive (L-level), the selection unit Uj selects a voltage based on the first Y-clock YCK1 and the applying time data Dbj. A period of the first Y-clock YCK1 is the same as that of one horizontal scanning.

FIG. 41 is a timing showing a relation between the data line signal Xj and the first Y-clock YCK1 in case the reset timing signal Cr is inactive. As shown therein, in the first half period Ha of a horizontal scanning period, The first Y-clock YCK1 shifts to the H-level. As shown in the truth table, the data line signal Xj is set to the applied voltage Va regardless of the logic level of the applying time data Dbj. That is, if the reset timing signal Cr is inactive, all data lines 102 has applied voltage Va during the first half period of the horizontal scanning period. While in the second half period Hb, the first Y-clock YCK1 is in the L-level.

In this case a voltage of the data line signal Xj is determined by the applying time data. A voltage of the data line signal Xj is equal to the common voltage Vcom if the applying time data is in the H-level, while is in the high-impedance state if the applying time data Dbj is in the L-level. That is, in the second half period Hb, the signal Xj is in the high-impedance state unless the applying time data Dbj shifts to the H-level. Hence when the applying time data Dbj is in the L-level, no voltage is applied to each the pixel electrode 104 corresponding to the jth data line 102, even if the scanning line signal shifts to active.

(5-5) Whole Operation

Figure 42:
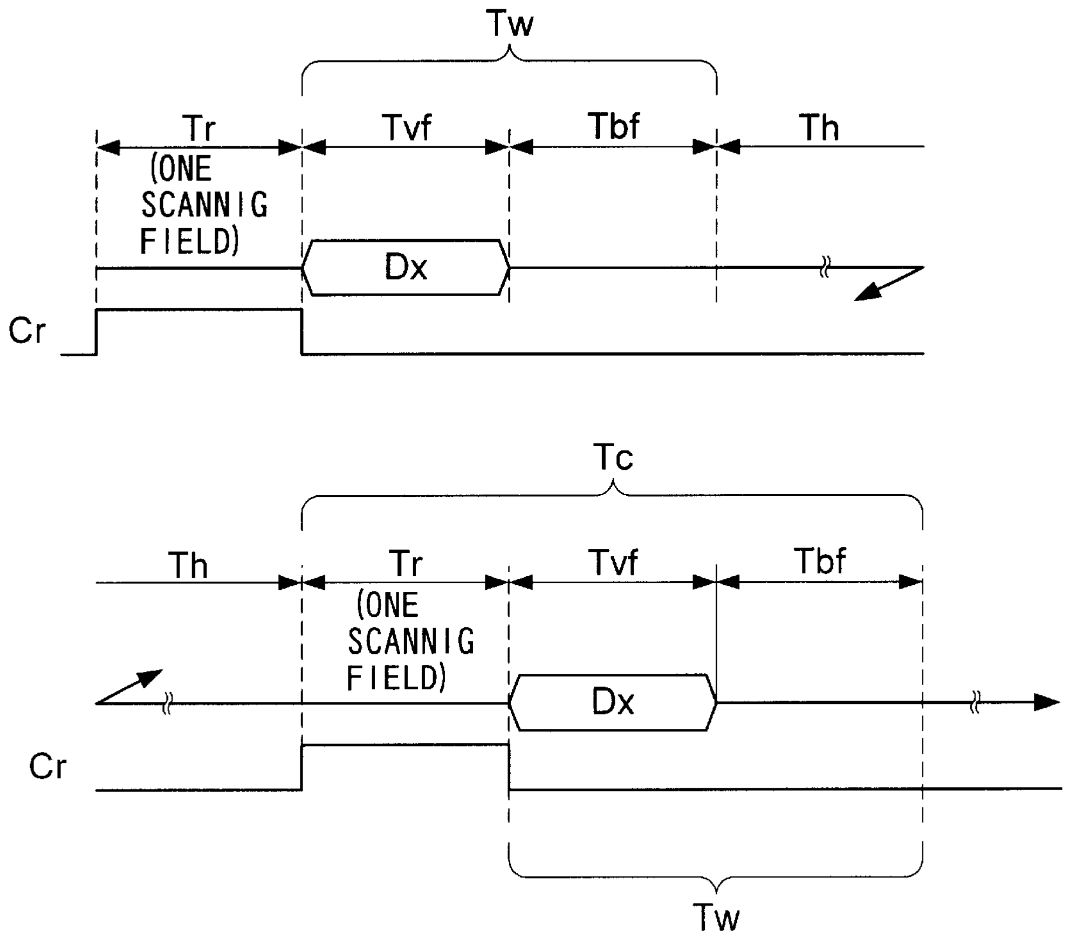
FIG. 42 illustrates all operations of the electrophoretic display.

FIG. 42 is a timing chart showing an entire operation of the electrophoretic display. In the reset period Tr, the pigment particles 3 are attracted to the pixel electrodes 104, thus the position of the particles is initialized.

A writing period Tw is composed of an applied voltage period Tvf and a no-bias period Tbf. In the applied voltage period, the voltage Va is applied to each electrode 104 over a predetermined time based on the applying time data outputted from the image processing circuit 300C. In the no-bias period Tbf, the common voltage Vcom is applied to the pixel electrode 104.

Figure 43:
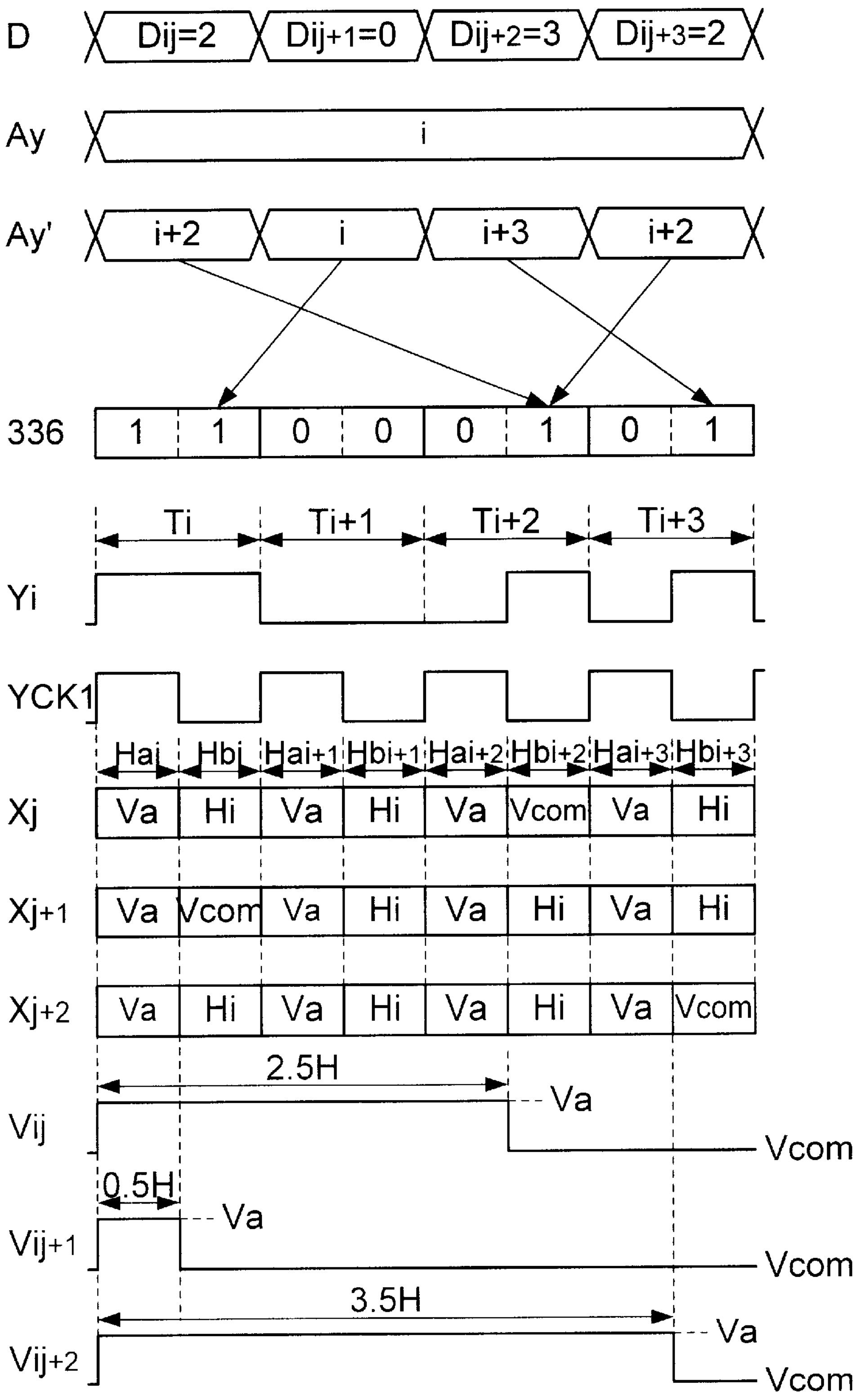
FIG. 43 is a timing chart of one example of the writing operation of electrophoretic display.

In the holding period Th, there is no electrostatic field between the common electrode 201 and each of the pixel electrodes 104, thus an image is held which is written in the immediately preceding writing period. In the rewriting period Tc, a series of operations is carried out in the same way as the writing operation: namely, resetting, next applying the voltage to attain the appropriate displayed color gradation, and then carrying out a no-bias operation (applying the common voltage Vcom). Now a writing operation of an electrophoretic display based on the fifth embodiment will be described. FIG. 43 is a timing chart showing an example of writing operations of the electrophoretic display. Here Dij represents an image data D of the pixel Pij in row i and column j. Suppose, for example, that Dij=2, Dij+1=0, Dij+2=3, and Dij+3=2. The add address Ay' is obtained by adding Ay to the image data D, thereby the value of the add address Ay' changes in the following order such as "i+2", "i", "i+3", "i+2". An area of the ith line in the second memory 336 stores data shown in the figure.

Data stored in the upper bits area corresponds to a scanning line signal in the first half period Ha while that in the upper bits area corresponds to the signal in the second half period Hb. This results in the ith scanning signal Yi shown in FIG. 43. In this figure Ti through Ti+3 show ith through i+3th horizontal scanning period. On the other hand, voltages of the data line signal Xj through Xj+2 is as shown in FIG. 43, where "Hi" indicates the high-impedance state. Here, a voltage of the pixel electrode 104 in row i and column j will be considered. In the horizontal scanning period Ti the ith scanning line 101 is selected and in the first half period Hai of Ti a voltage of the data line signal Xj is Va, which means that the voltage Vij is equal to Va in the period Hai.

In the period Hbi the ith scanning line 101 is selected but the data line signal Xj is in the high-impedance state. That is, the voltge Vij doesn't change during the period Hbi. In addition, the ith scanning line 101 is not selected in the period Hai+1, Hbi+1, and Hai+2. Thus, the voltage Vij also does not change in these periods.

When the ith scanning line 101 is selected in the period Hbi+2, the voltage Vcom of the data line signal Xj is applied to the pixel electrodes in row i and column j. Therefore the voltage Vij is the voltage Vcom during the period Hbi. In other words, the voltage Vij is equal to the Va during a period of 2.5 H. A voltage Vij+1 of the pixel electrode 104 in row i and column j+1 is Va during the period Hai. When a voltage of the data line signal Xj+1 coincides with the voltage Vcom in the period Hbi, the voltage Vij+l is brought to the voltage Vcom. Except the period Hai (=0.5 H), voltages Vijm Vij+1, Vij+2 have the value Va during 2 H, 0 H, 3 H, respectively. Namely, the voltage Va is applied to the pixel electrodes 104 during a period corresponding to the value of the image data D on a horizontal scanning period basis.

Writing operations in a case where 100% and 50% gradation are displayed in the pixel Pij will now be described referring to FIG. 44. In the first scanning field, the data line signal Xj has a period of one horizontal scanning. Although in the second half period Hb, the data line signal Xj is the common voltage Vcom as shown therein, it is possibly in the high-impedance state as described above referring to FIG. 35.

Figure 44:
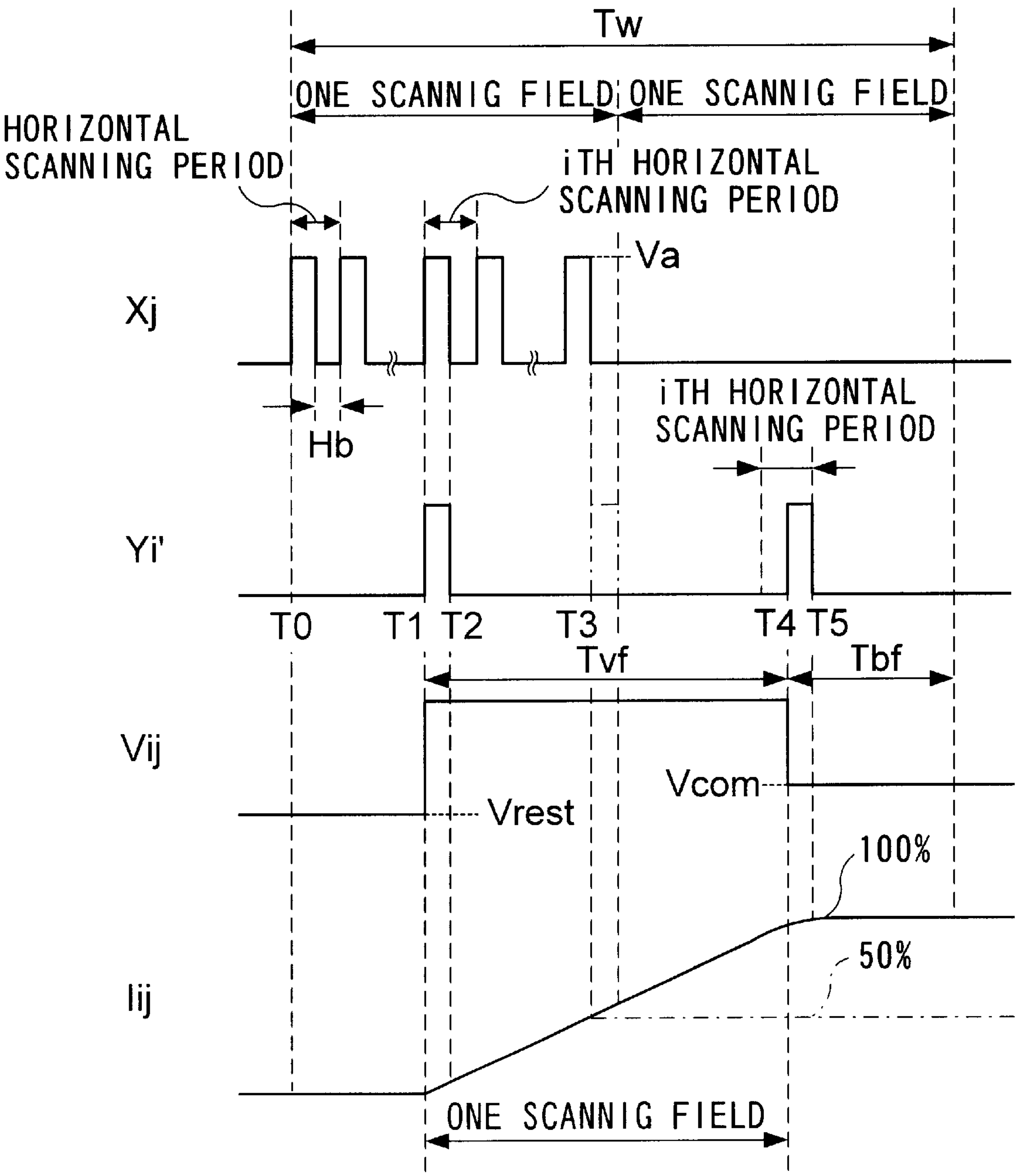
FIG. 44 is a timing chart of the electrophoretic display in the writing operation.

A waveform of the scanning signal Yi' is depicted in a solid line in FIG. 44 since the gradation to be displayed in the pixel Pij is 100%. In this case, in the first scanning field, the scanning line signal Yi' becomes active in the first period Ha of the horizontal scanning period and the add address Ay' has the value "i+6". Therefore after 64 scanning lines 64 horizontal scanning periods passes when the scanning line signal Yi' shifts to active next. That is, the scanning line signal Yi' shifts to active after one scanning field period passes.

When the scanning line signal Yi' shifts to active (the H-level) in a period T1 through T2, the applied voltage Va is applied to the pixel electrode 104 of the pixel Pij, thereby a voltage of the pixel electrode 104 shifts from the reset voltage Vrest into the applied voltage Va. As a result, a constant voltage is applied to the dispersal system 1.

When the scanning signal Yi shifts to inactive (L-level) at time T2, a TFT 103 of the pixel Pij is turned off. However the capacitor composed of the pixel electrode 104 and the common electrode accumulated electric charge, thus the voltage Vij of the pixel electrode 104 maintains the applied voltage Va. And Yi shifts to active in the second half period Hb (from time T4 through T5) of the ith horizontal scanning period of the next scanning field. At this time the data line signal Xj is equal to the common voltage Vcom, which means the common voltage is applied to the pixel electrode 104. As a result, the voltage Vij of the pixel electrode 104 coincides with the common voltage Vcom at time T4. In other words, the voltage applying period Tvf is determined by a gradation value designated by the image data D. The no-bias period Tbf comes after the voltage applying period Tvf.

In the following, the particle motion will be described with reference to the pixel Pij. Having been carried out the reset operation before the writing operation begins, all particles of the pixel Pij are positioned on the side of the pixel electrode 104 at time T0. At time T1 time when the applied voltage Va is applied to the pixel electrode 104, an electric field is generated in the direction from the pixel electrode 201 to the common electrode 201. Thus the particles 3 start to migrate at time T1 and the brightness Iij gradually increases. An electrostatic field of the applied voltage Va is applied during a period corresponding to a gradation to be displayed. When 100% gradation is required, the electrostatic field is applied during one scanning field period from time T1 through T4. When 50% gradation is required, the electrostatic field is applied during a half scanning field period.

In the first embodiment the applied voltage Va is applied in a predetermined time in a horizontal scanning period, while in the fifth embodiment the applied voltage Va is applied on a horizontal scanning basis. Since the amount of migration of the pigment particles 3 depends on a strength and duration of an electrostatic field applied to the dispersal system 1. In this embodiment, an electrostatic field is applied for a long time, so that the desired brightness Iij is attained even through a weak electrostatic field is employed. Therefore in this embodiment a low voltage can be applied to the data lines 102 X1 through Xn to drive the data lines 102.

(5-6) Modification of the Fifth Embodiment

In the first embodiment the writing period Tw is composed of the voltage applying period Tvf and the no-bias period Tbf as shown in FIG. 42. However, it is possible for the writing period Tw to be composed of the voltage applying period Tvf, a brake voltage applying period Tsf, and the no-bias period Tbf.

Figure 45:
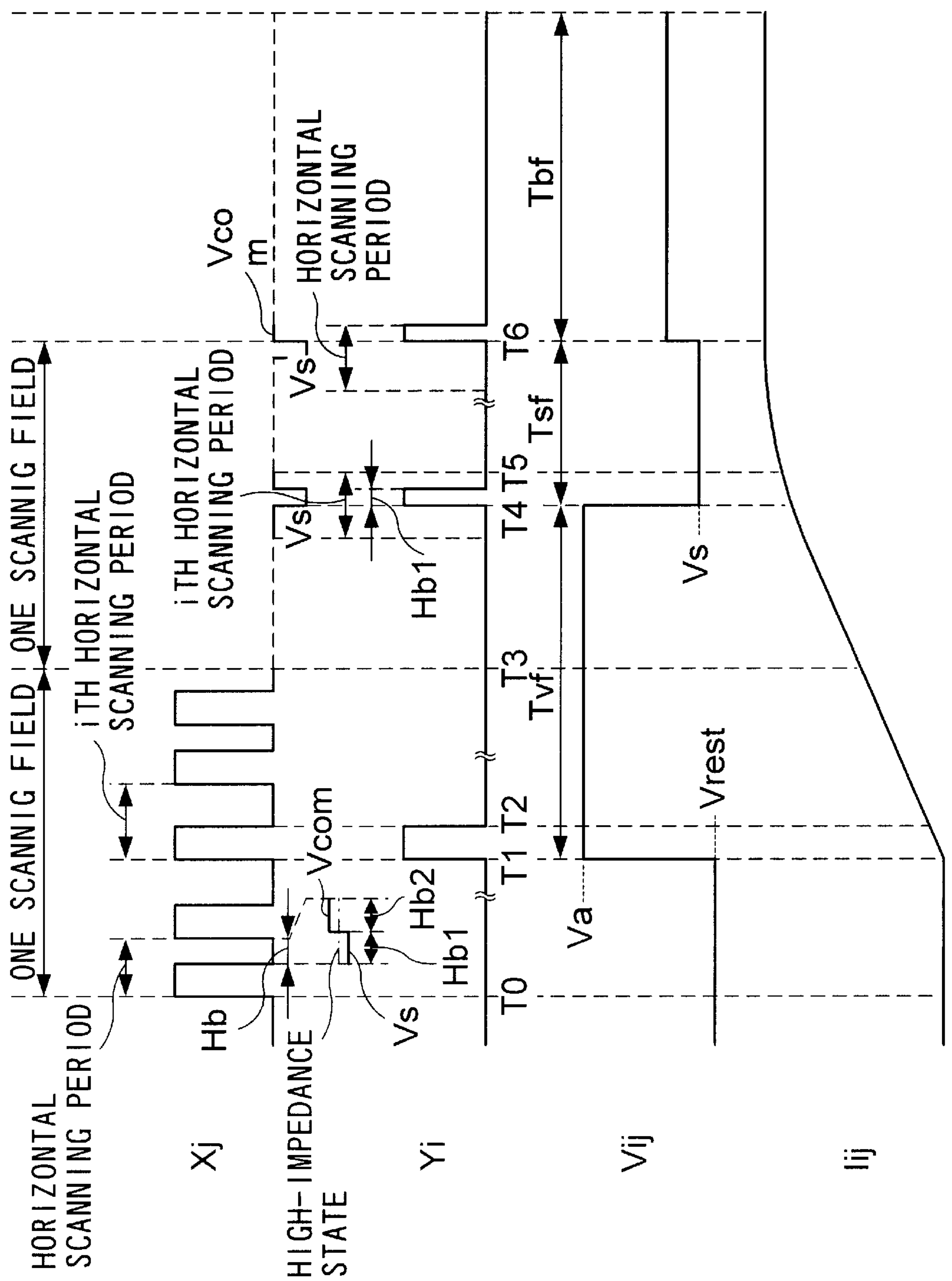
FIG. 45 is a timing chart of the electrophoretic display in the writing operation.

FIG. 45 is a timing chart showing an operation of the electrophoretic display based on a modification of the fifth embodiment in the writing period. It is to be noted that, similar to the fifth embodiment, the reset operation is carried out before the writing period Tw to initialize the pigment particles The second half period Hb is subdivided into a first section Hb1 and second section Hb2. The data line signal Xj is in the high-impedance state or the brake voltage Vs during the first section of the second half period Hb1, while it is in the high-impedance state or the common voltage Vcom during the second section of the second half period.

In the voltage applying period Tvf the voltage Vij of the pixel electrodes equal to the applied voltage Va.

In this period the particles 3 start to migrate with brightness Iij gradually increasing. In the brake voltage applying period Tsf from time T4 through T6, the brake voltage Vs is applied to the pixel electrode 104.

(6) Sixth Embodiment

In the fifth embodiment, a constant voltage is applied to the pixel electrodes 102 during a period corresponding to color gradations to be displayed. However it is possible for a constant voltage to be applied during a time period corresponding to the difference between the gradation to be next displayed and that now displayed.

(6-1) Image Signal Processing Circuit

Figure 46:
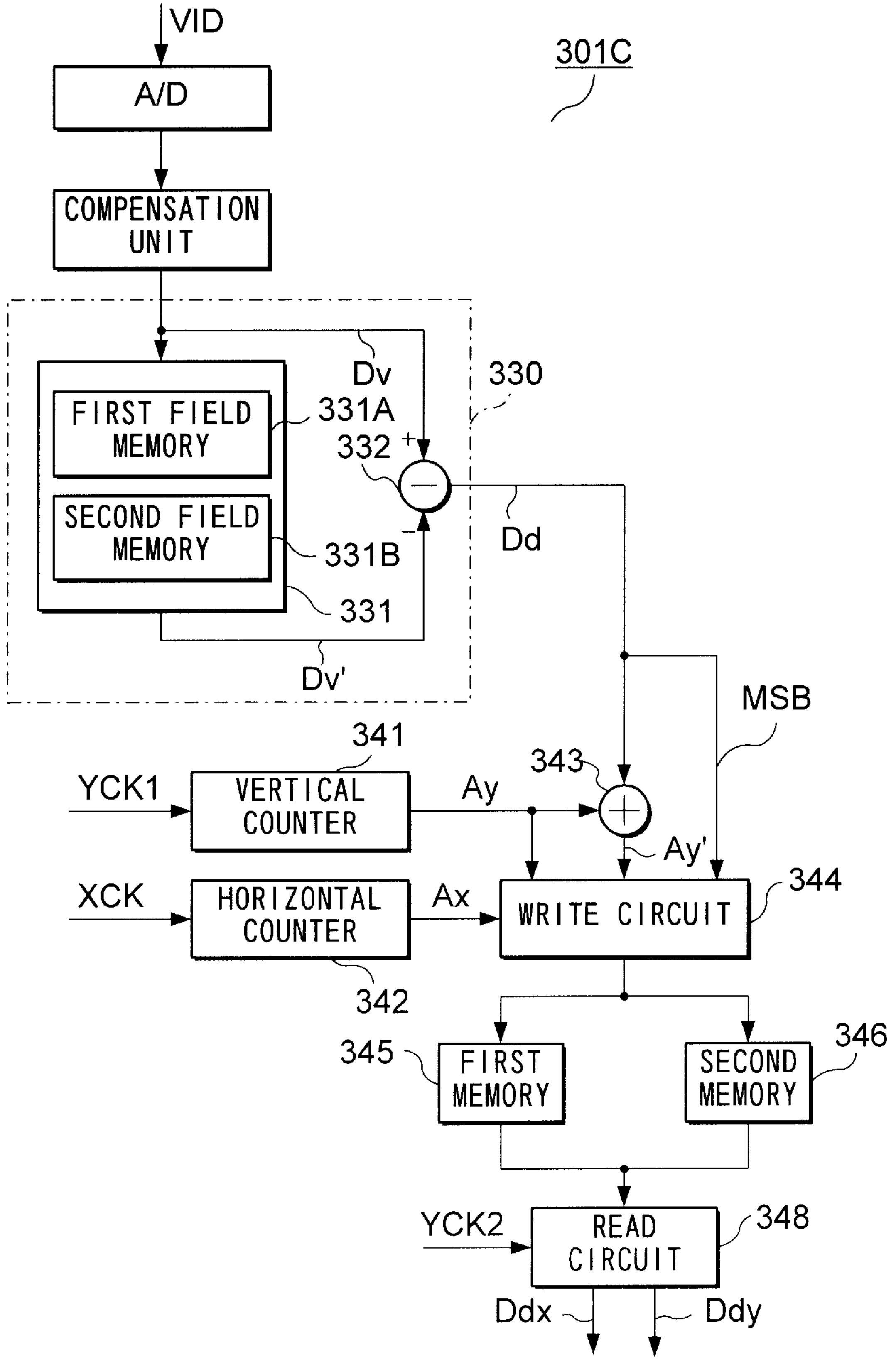
FIG. 46 is a block diagram of the image processing circuit 301C.
Figure 47:
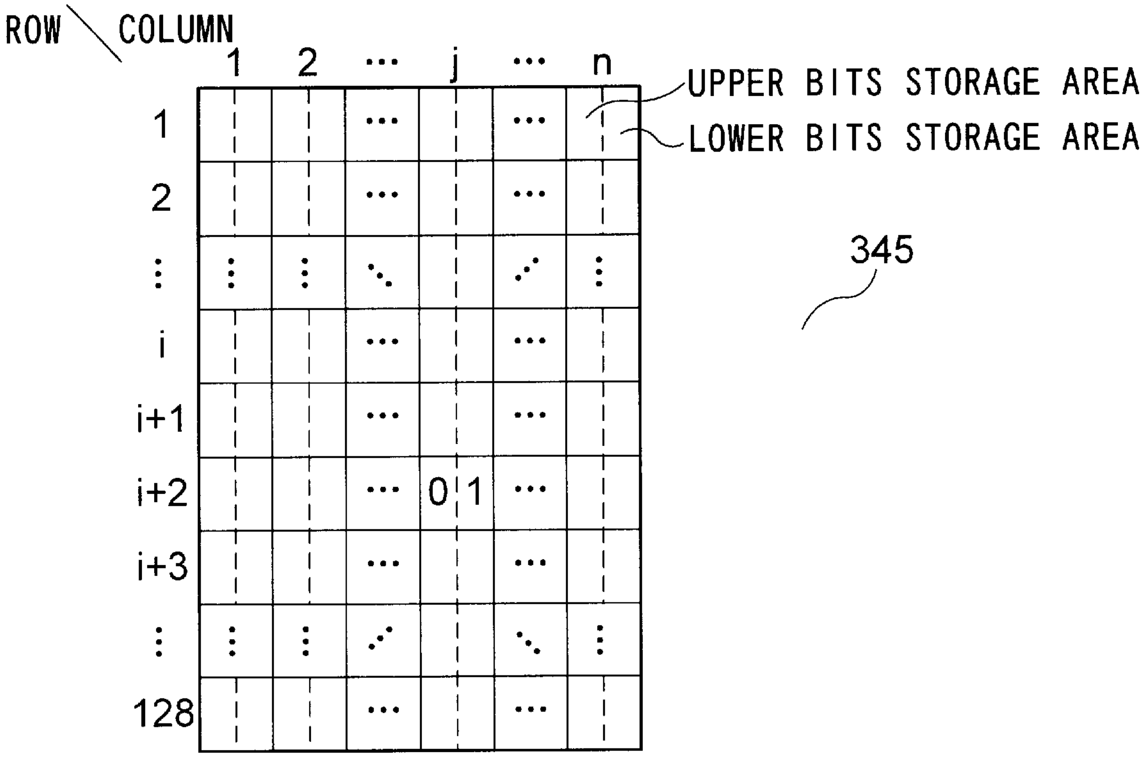
FIG. 47 is a conceptual diagram showing the relation between the address of the first field memory 335 and the pixels.

FIG. 46 is a block diagram showing a configuration of an image processing circuit 301C. As shown therein, the image signal processing circuit 301C is same as the image signal processing circuit 301A shown in FIG. 19, except that a vertical counter 341, a horizontal counter 342, add circuit 343, write circuit 344, first and second memories 345 and 346, and read circuit 348 is provided in subsequent to the calculation unit 330. The number of bits of the differential image data Dd and the number of the scanning lines 101 is the same.

In this embodiment, the scanning line 101 consists of 64 lines and the differential image data consists of 6 bits. The MSB of the differential image data Dd is a sign bit. If the value of the image data Dv is that of a delayed image data Dv' or bigger, the sign bit is "0". If the value of the image data Dv is less than that of the delayed image data Dv', the sign bit is "1".

The vertical counter 341 counts the first Y-clock YCK1 to generate a row address Ay and the horizontal counter 342 counts the X-clock XCK to generate a column address Ax. Both the row address Ay and the column address Ax are employed to determine a timing in which the differential image data Dd is displayed in one scanning field. The add circuit 343 adds the value of the differential image data Dd to the row address Ay to generate an add address Ay'.

The first memory 345 has a storage area consists of 128 (=2 m) rows and n columns. Each area consists of an upper and lower bits storage area. The upper bits area stores the sign bit (MSB) of the differential image data Dd and the lower bits area stores data designating a timing when the common voltage is applied to the data lines 102. And each column and row of the first memory 335 correspond to each data line 102 in order of the horizontal scanning period, respectively. The second memory 346 is similar to the second memory 336, thus explanation is omitted.

The write circuit 344 writes data into the first memory 345 in the following procedure. Firstly, the write circuit 344 writes the sign bit (MSB) of a differential image data Dd into the storage area which is designated by the column address Ay and row address Ax. And the circuit 344 writes "1" into the area designated by the row address Ay' and column address Ax. The circuit 334 writes data into the second memory 336 in a similar way to that described in the fifth embodiment.

After data writing is finished, the read circuit 348 sequentially reads data from each storage area in the following order row 1 and column 1, row 1 and column 2, . . . , row 2 and column 1, row 2 and column 2, . . . , row 64 and column 1, . . . , row 128 and column n. The data read out is 2 bits polarity-and-duration data Ddx. The upper bit if the polarity-and-duration data Ddx is the sign bit of the differential image data Dd which designates a polarity of the voltage applied to the pixel electrodes 104. The lower bit of the data Dx designates when the common voltage Vcom is applied to the pixel electrodes 104. An operation of reading out data from the second memory 346 is similar to that from the second memory 336 as described in the fifth embodiment.

(6-2) Data Line Drive Circuit

Figure 48:
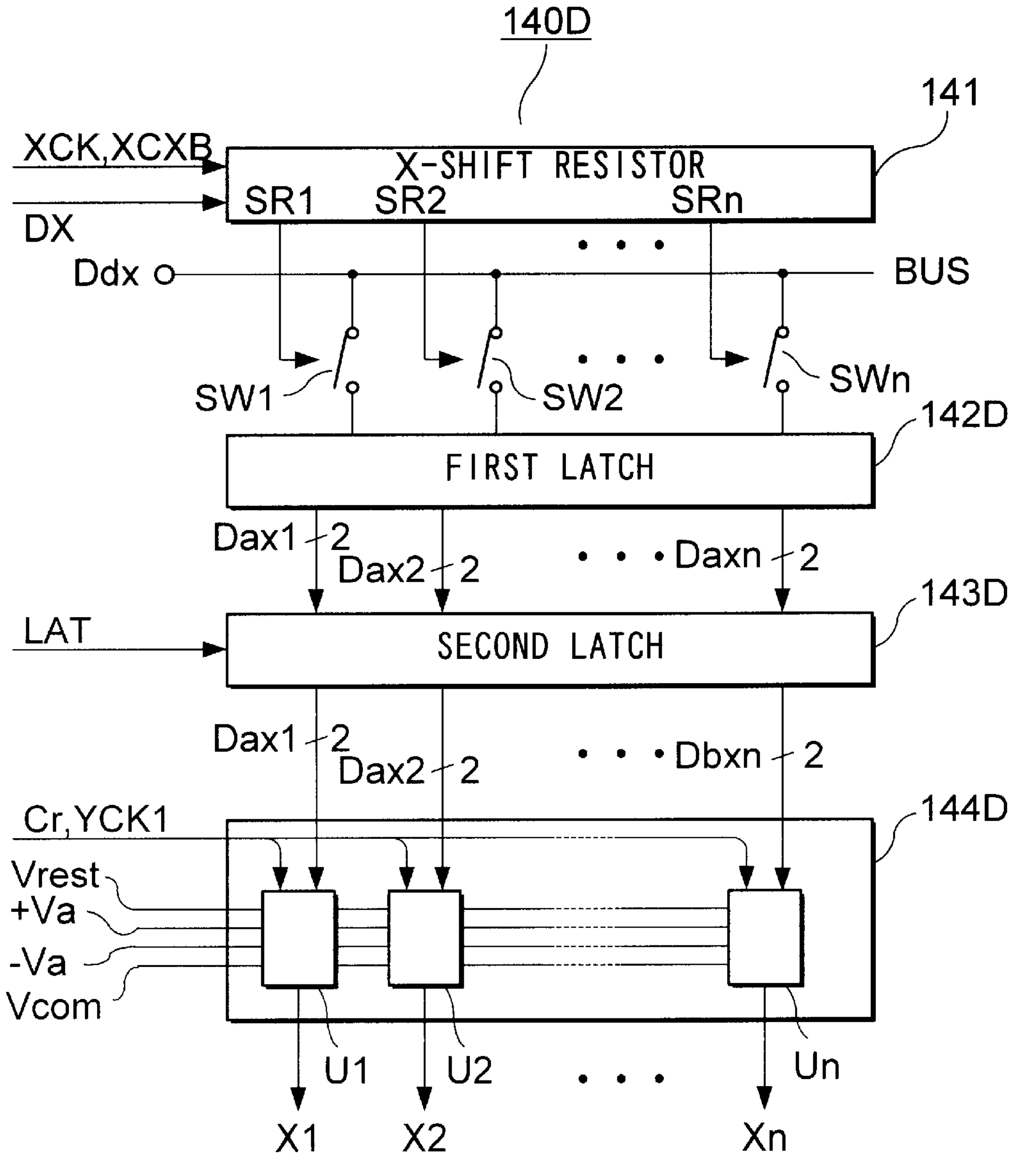
FIG. 48 is a block diagram of the data line drive circuit 140D.

A data line drive circuit 140D will now be described. FIG. 48 is a block diagram showing a configuration of the data line drive circuit. The data line drive circuit 140D is similar to the data line drive circuit 140C described in the fifth embodiment shown in FIG. 39, except that polarity-and-duration data Ddx is provided instead of the applying time data Dx, that the bus BUS, a first and second latches 142D and 143D consists of 2 bits, and that the PWM circuit 144D is employed instead of the PWM circuit 144C. The PWM circuit 144D has n selection units U1 through Un. Each unit U1 through Un selects an appropriate voltage among the reset voltage Vrest, the applied voltage +Va, −Va, and the common voltage Vcom based on the reset timing signal Cr, the first Y-clock YCK1, and the polarity-and-duration data Dbx1 through Dbxn.

FIG. 49 is a truth table showing how a jth selection unit Uj selects voltages. It is noted that other selection units can be dealt alike. This figure clearly shows that the data line signal Xj is equal to the reset voltage Vrest when the reset timing signal Cr is active (the H-level).

Figure 50:
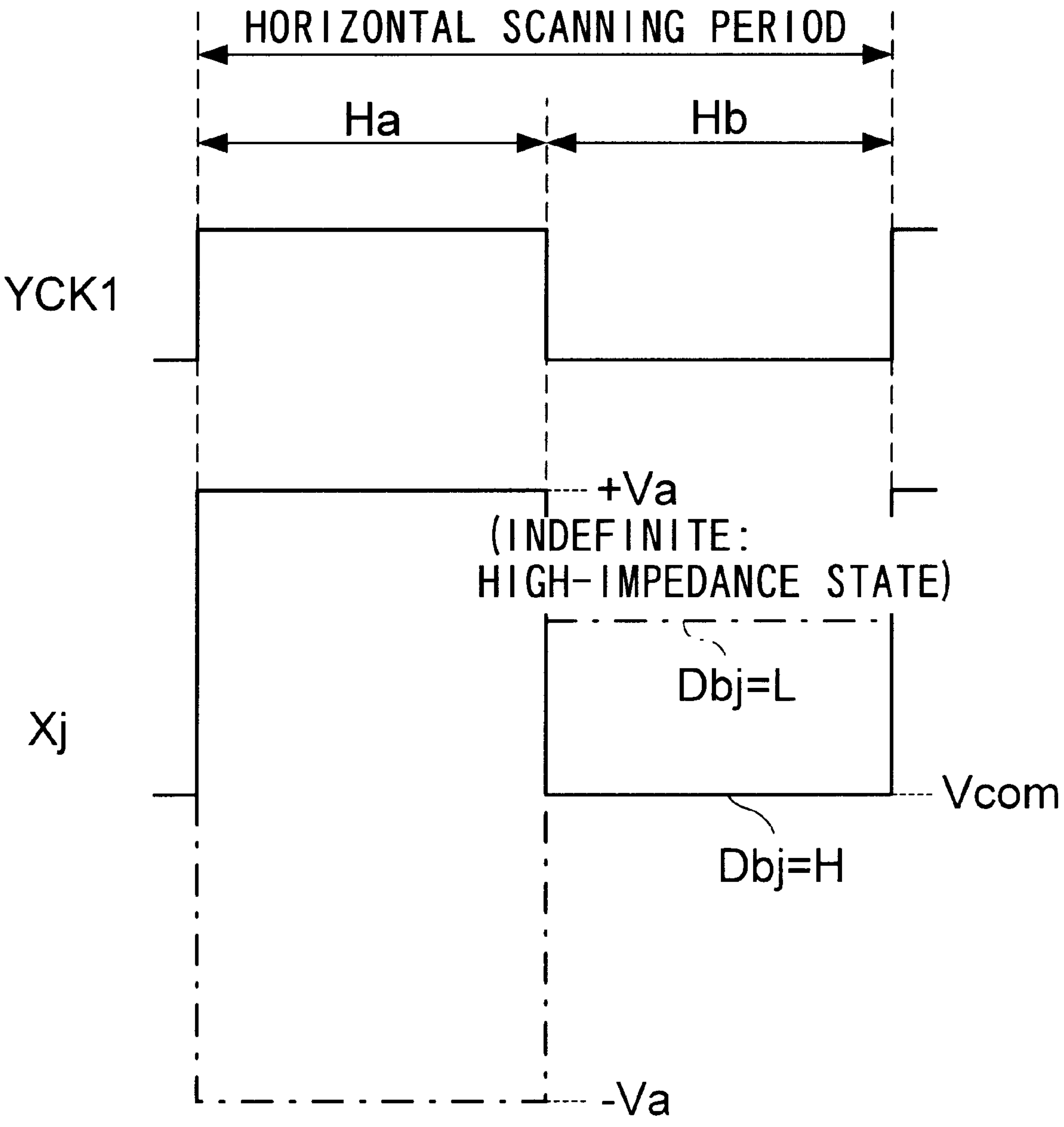
FIG. 50 is timing chart of the data line signal Xj and Y-clock in case the reset timing signal Cr is inactive.

When the reset timing signal is inactive (the L-level), the selection unit selects based on the first Y-clock YCK1 and polarity-and-duration data Dbi. FIG. 50 shows a timing chart of the data line signal Xj and the Y-clock YCK in case the reset timing signal Cr is inactive. Therefore the voltage of the data line signal Xj is the applied voltage +Va or −Va during the first half period Ha.

If the first Y-clock YCK is in the H-level, the selection unit Uj selects either the applied voltage +Va or −Va based on the upper bit of the polarity-and-duration data Dbj. Therefore in the second half period, the voltage of the data line signal Xj coincides with the common voltage Vcom if the polarity-and-duration data Dbj is in the H-level, while the data line signal Xj is in the high-impedance state if the lower bit of the polarity-and-duration Dbj is in the L-level. A solid line in FIG. 50 shows the data line signal Xj in a case where the upper bits are in the L-level. When the first Y-clock YCK1 is in the L-level, the selection unit Uj selects based on the lower bit of the polarity-and-duration data Dbj. To be more specific, in the second half period, the data line signal Xj coincides with the common voltage Vcom if the lower bit of the data Dbj is in the H-level, while the signal Xj is in the high-impedance state if the lower bit of the data Dbj is in the L-level.

(6-3) Complete Operation of the Electrophoretic Display

Figure 51:
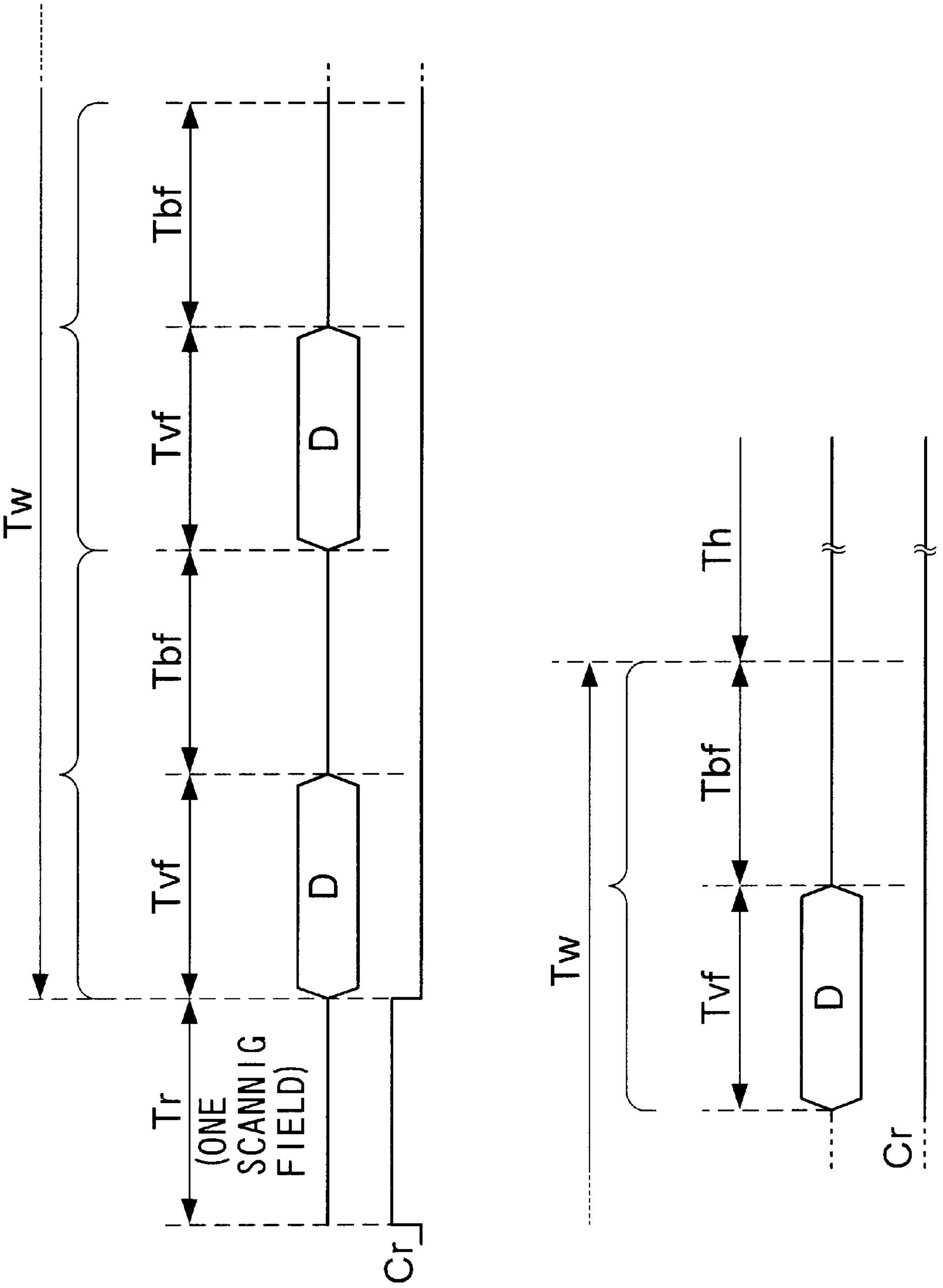
FIG. 51 is a timing chart showing all operations of the electrophoretic display.

FIG. 51 is a timing chart showing a whole operation of the electrophoretic display. The pigment particles 3 are attracted to each pixel electrode 104 to initialize the position of the particles in the reset period Tr.

The writing period Tw is composed of a plurality of unit periods, each of which is composed of the applying voltage period Tvf and the no-bias period Tbf. In the voltage applying period Tvf, the applied voltage +Va or −Va is applied to each pixel electrode 104 during a predetermined time based on the polarity-and duration data Dx. In the no-bias period Tbf, the common voltage Vcom is applied to each pixel electrode 104.

In the holding period Th, there is no electrostatic field generated between each pixel electrode 104 and the common electrode 201, so that an image was held written in the immediately preceding writing period.

Figure 52:
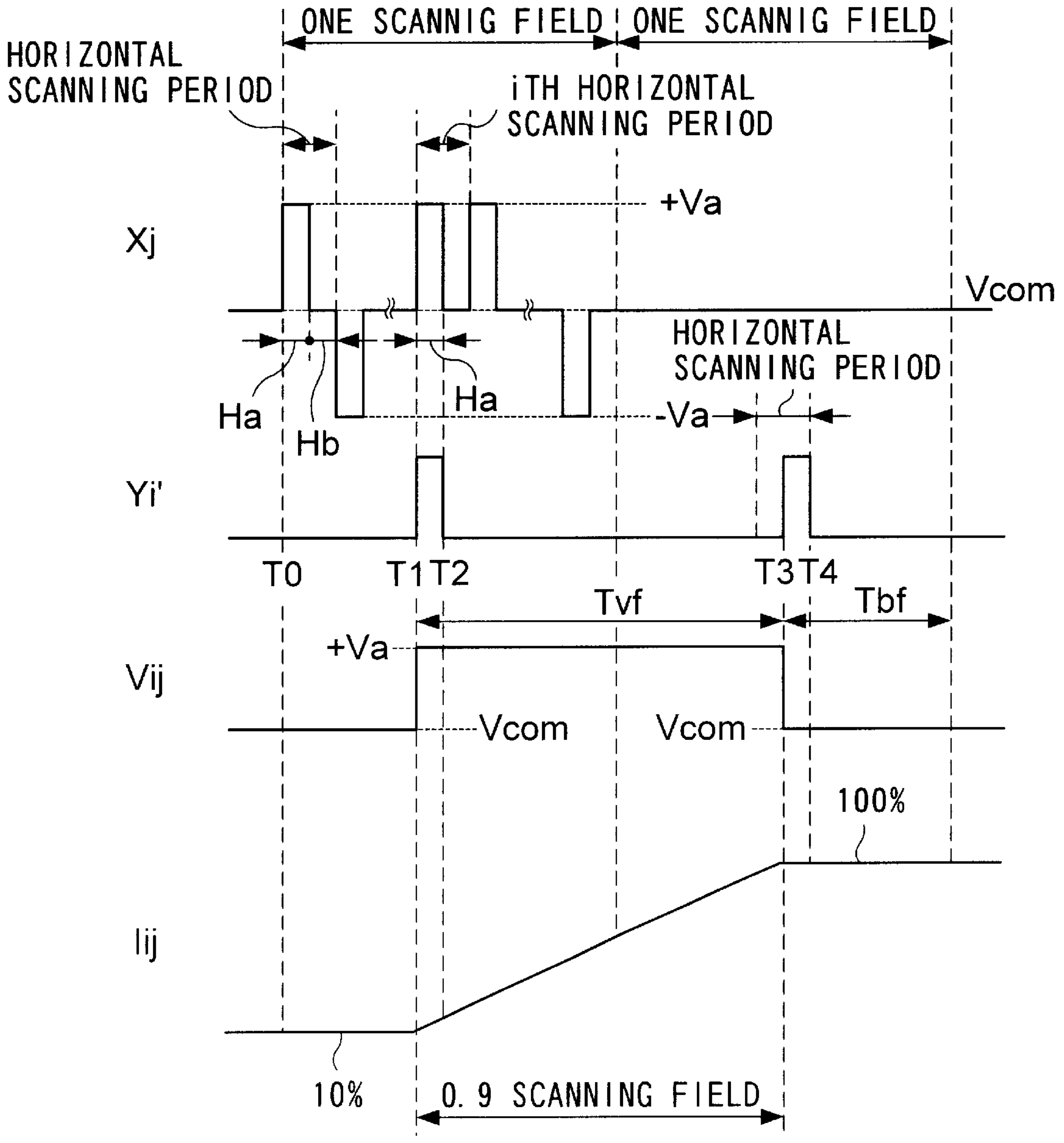
FIG. 52 is a timing chart employed in a writing operation of the electrophoretic display.

FIG. 52 is a timing chart of an electrophoretic display based on this embodiment in a writing operation. The writing operation in the pixel Pij in row i and column j will now be described. By way of example, suppose that the gradation of the pixel Pij in the immediately preceding unit period is 10% and that in the present unit period is 100%.

In the first half period of a horizontal scanning period, the polarity of the voltage applied to the data line signal Xj depends on which of gradations presently displayed and to be displayed is greater. In this example, the gradation is increased from 10% to 100%, and thus the voltage of the data line signal Xj is +Va during the first half period of the ith horizontal scanning period. The scanning lines signal Yi' shifts to active in the first half period Ha of the ith horizontal scanning period in the first scanning field. In this example the gradation increase by 90%, thereby the signal Yi' again becomes active at time T3 after 0.9 scanning field passes from time Ti. When the scanning line signal Yi' shifts to active (the H-level) in a period time T1 through T2, the applied voltage +Va is applied to the pixel electrode 104 of the pixel Pij. The voltage Vij shifts from the common voltage to the applied voltage Va at time T1. The data line signal Xj coincides with the common voltage Vcom during a period time T3 through T4, in which the scanning line Yi becomes active again. As a result, the voltage Vij of the pixel electrode 104 coincides with the common voltage at time T3.

Next, the particle motion in the pixel Pij will be described. That he pixel Pij displays 10% gradation in the immediately preceding unit period means the particles 3 in the pixel Pij stay at a position close to the pixel electrode 104 but little toward the common electrode 201. At this time when the applied voltage Va is applied to the pixel electrode 104, an electric field is generated in the direction from the pixel electrode 104 to the common electrode 104. Thus the particles 3 start to migrate at time T1 and the brightness Iij gradually increases. The electrostatic field is generated during a time period corresponding to a differential color gradation. In this example, since the gradation is changed from 10% to 100% the duration of generation is 0.9 scanning field.

In the second embodiment the applied voltage Va or −Va is applied during a time period in a horizontal scanning period, but in the sixth embodiment the voltage +Va or −Va is applied to the pixel electrode 102 on a horizontal scanning period basis. The amount of migration of particles 3 depends on the strength and duration of the field applied to the dispersal system 1. In this embodiment, an electrostatic field is applied for a long time, so that a desired brightness Iij is attained even through only a weak electrostatic field is employed. Therefore in this embodiment a low voltage can be applied to the data lines 102 X1 through Xn to drive the data lines 102

(6-3) Modification of the Sixth Embodiment

In the sixth embodiment the unit period Tu is composed of the voltage applying period Tvf and the no-bias period Tbf as shown in FIG. 51. However it is possible that the unit period Tu is composed of the voltage applying period Tvf, a brake voltage applying period Tsf, and the no-bias period Tbf.

Figure 53:
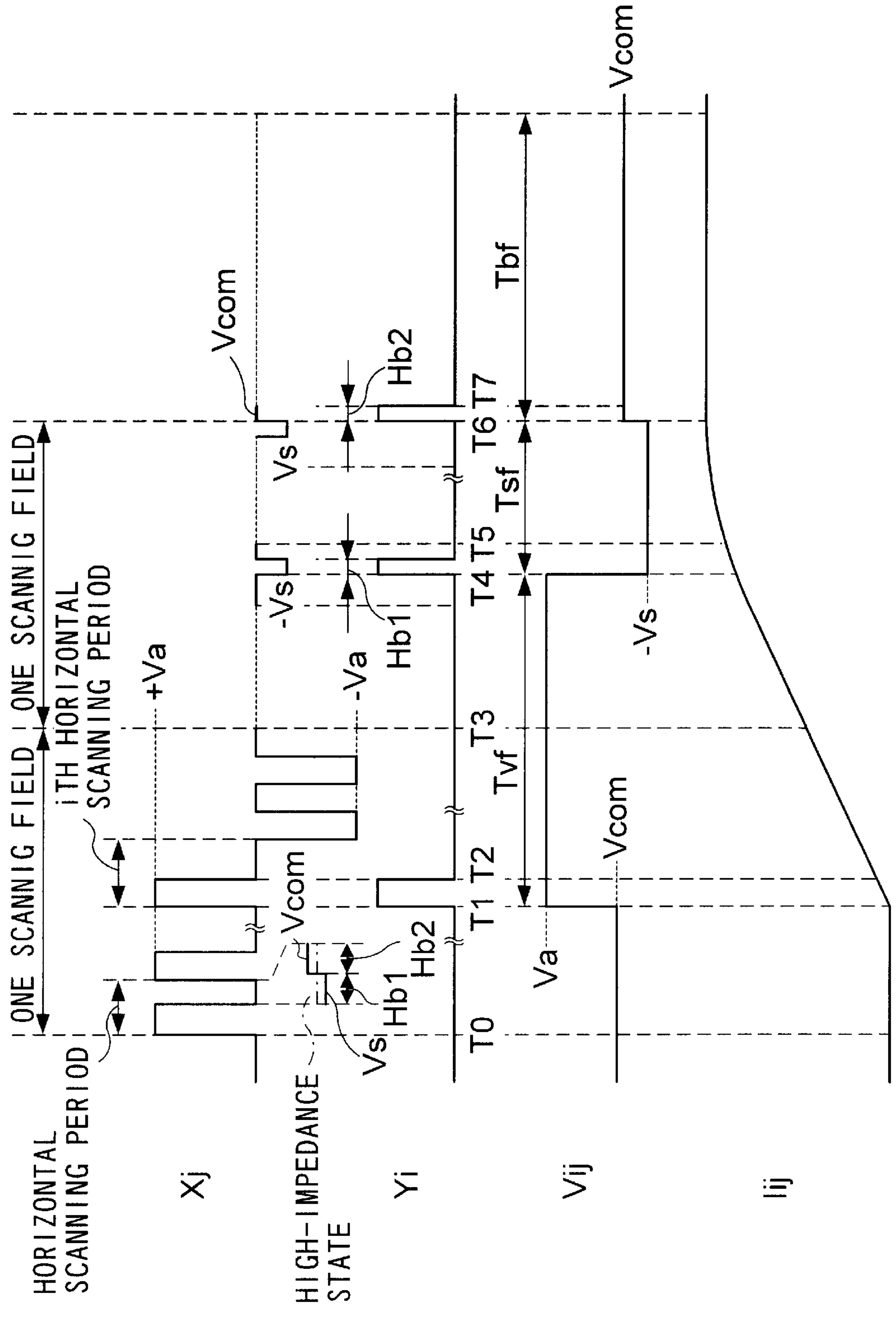
FIG. 53 is a timing chart employed in a writing operation of the of the electrophoretic display.

FIG. 53 is a timing chart showing an operation of the electrophoretic display based on the modification of the sixth embodiment within a unit period Tu. In this embodiment a second half period Hb is subdivided into the first section Fb1 and the second section Hb2, similar to the modification of the fifth embodiment. The data line signal Xj is either in the high-impedance state, the brake voltage +Vs, or −Vs. The common voltage Vcom is the reference voltage for the Vs and −Vs. These two voltages +Vs and −Vs having different polarities are necessary in order for the particles 3 to migrate in both directions. That is, if the applied voltage +Va is selected, the brake voltage −Vs is selected; and if the voltage −Va is selected, the brake voltage +Vs is selected.

(7) Applications

Although there have been described certain preferred embodiments of the invention, the present invention is not limited to these disclosed embodiments, and is susceptible to many modifications and adaptations without departing from the spirit thereof.

(7-1) Displaying of Animation

In the above embodiments, the process of displaying an image consists of first resetting then writing, subsequently holding, and then rewriting if necessary. As a result, the electrophoretic displays in those embodiments are suitable for displaying a static image. However it is possible to display an animation by making the reset period Tr as well as by repeating rewriting periodically. In displaying an animation, it is preferable that the velocity of the pigment particles 3 should be high. This means that small fluid resistance is more suitable. In such a situation, the pigment particles 3 are likely to continue to move due to their inertia after removal of the electrostatic field. Therefore it is preferable to brake the particles 3 by applying the brake voltage as described above.

(7-2) Refresh Period

Figure 54:
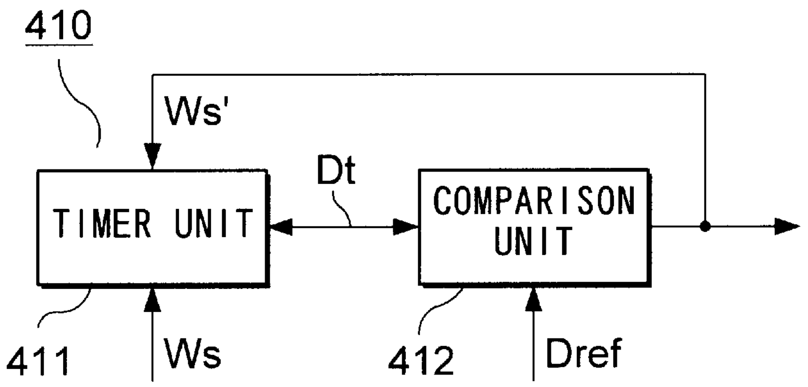
FIG. 54 is a block diagram of the timer apparatus.

It is preferable that the specific gravity of the dielectric fluid 2 and that of the pigment particles 3 which comprise the dispersal system 1 be equal. However, it is difficult to achieve complete parity of the respective specific gravities, due to restrictions of materials employed and variations therein. In such a case, when the dispersal system 1 is left in stasis for a long time once an image is displayed, the pigment particles 3 sink down or float up due to gravitational effect. In order to overcome this problem, it is preferable for a timer apparatus to be provided in the timing generator 400 as shown in FIG. 54, to rewrite the same image for a certain period. The timer apparatus 410 has a timer unit 411 and a comparison unit 412. The timer generates duration data Dt measuring time, in which the value of the duration data Dt is reset to '0' when either a writing start signal Ws which designates an ordinary writing, or a rewriting signal Ws' becomes active. The comparison unit 412 compares the duration data Dt with the predetermined reference time data Dref which designates the refresh period and, if they coincide, generates the rewriting signal Ws' which is active during a preset period.

Figure 55:
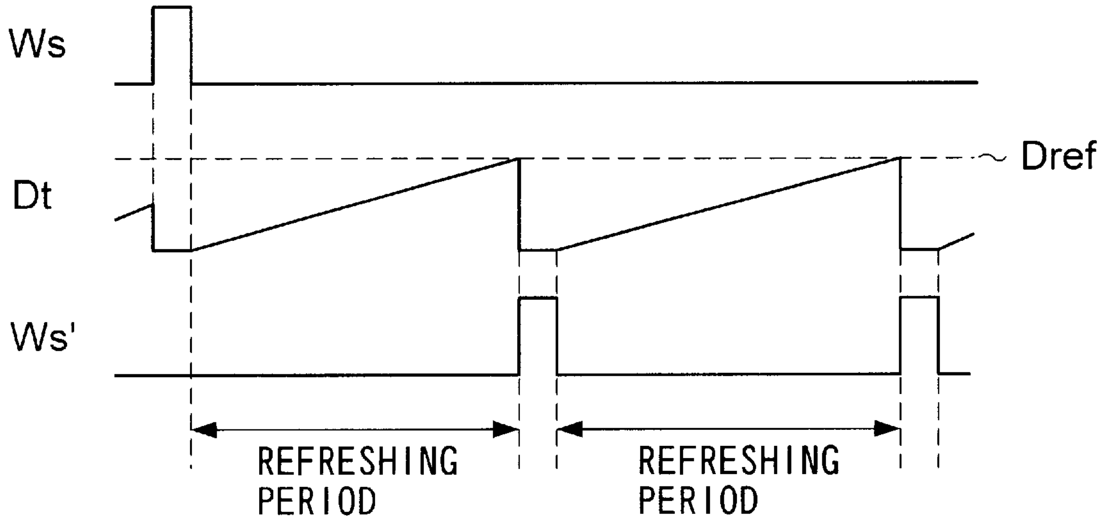
FIG. 55 is a timing chart showing an operation of the timer apparatus.

FIG. 55 is a timing chart of the timer apparatus 410. As shown, when the writing signal Ws becomes active, the duration data Dt of the timing part 411 is reset and measurement starts. When a predetermined refresh period has passed, the duration data Dt and the reference time data Dref coincides, so that the rewriting signal Ws' becomes active. The measurement of refreshing period starts when the writing signal Ws becomes active, or the rewriting signal Ws' is active once the refresh period passes.

By executing the rewriting operation (but the same image) described in the above embodiments, by using the rewriting signal Ws' which is generated to function as a trigger, a displayed image is refreshed.

(7-3) Electronic Devices

Electronic devices attached to the electrophoretic display described above are described as follows:

(7-3-1) Electronic Books

Figure 56:
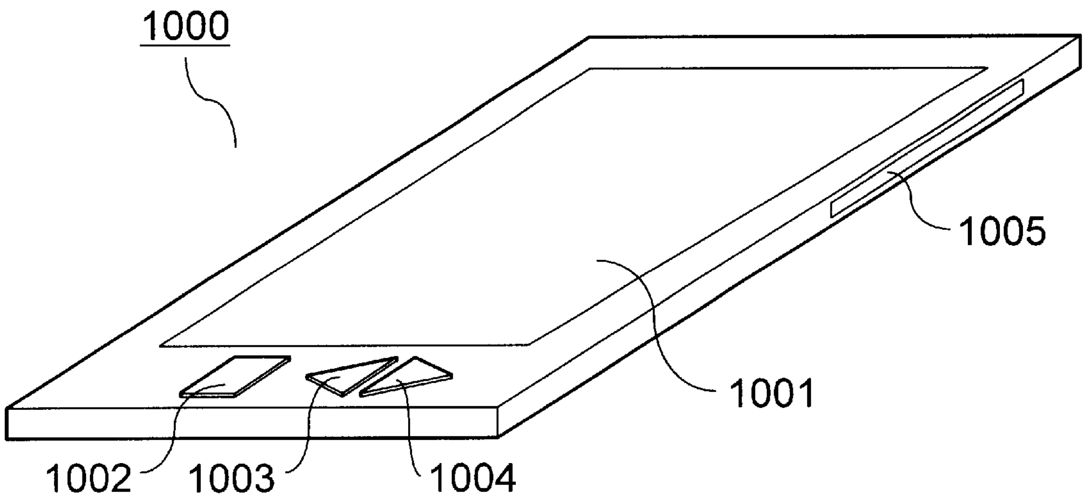
FIG. 56 is a perspective overview of an electronic book using an electrophoretic device.

FIG. 56 is a perspective view showing an electronic book. This electronic book 1000 is provided with an electrophoretic display panel 1001, a power switch 1002, a first button 1003, a second button 1004, and a CD-ROM slot 1005, as shown.

When a user activates the power switch 1002 and then loads a CD-ROM in the CD-ROM drive 1005, contents of the CD-ROM are read out and their menus displayed on the electrophoretic display panel 1001. If the user operates the first and second buttons 1003 and 1004 to select a desired book, the first page of the selected book is displayed on the panel 1001. To scroll down pages, the second button 1004 is pressed, and to scroll up pages, the first button 1003 is pressed.

In this electronic book 1000, if a page of the book is once displayed on the panel screen, the displayed screen will be updated only when either the first or second button 1003 or 1004 is pressed. This is because, as stated previously, the pigment particles 3 will migrate only when an electrostatic field is applied. In other words, it is not necessary to apply a further voltage to hold the same screen display. Only during a period for updating displayed images, is it necessary to feed power to the driving circuits to drive the electrophoretic display panel 1001. Thus, in comparison to liquid crystal displays, power consumption is greatly reduced.

Further, images are displayed on the panel 1001 by way of the pigment particles 3 thereby enabling a display of the electronic book 1000 to be visually identical to printed matter, being devoid of excess brightness. As a result, the display can be read for long periods of time without eye strain.

(7-3-2) Personal Computer

Figure 57:
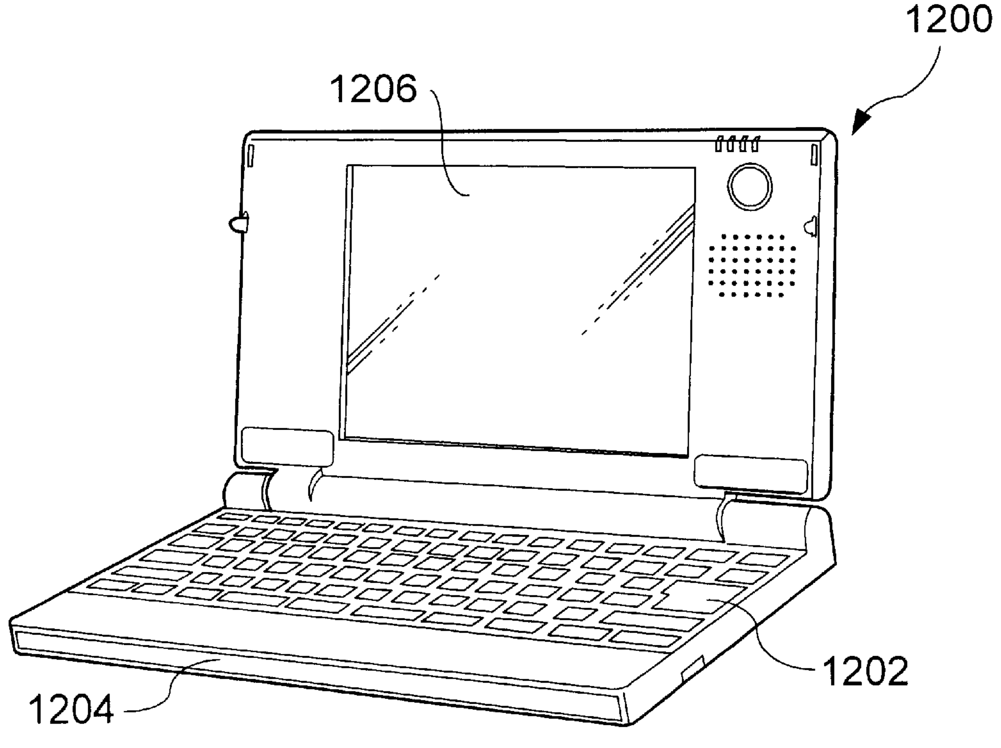
FIG. 57 is a perspective overview of a personal computer using an electrophoretic device.
Figure 58:
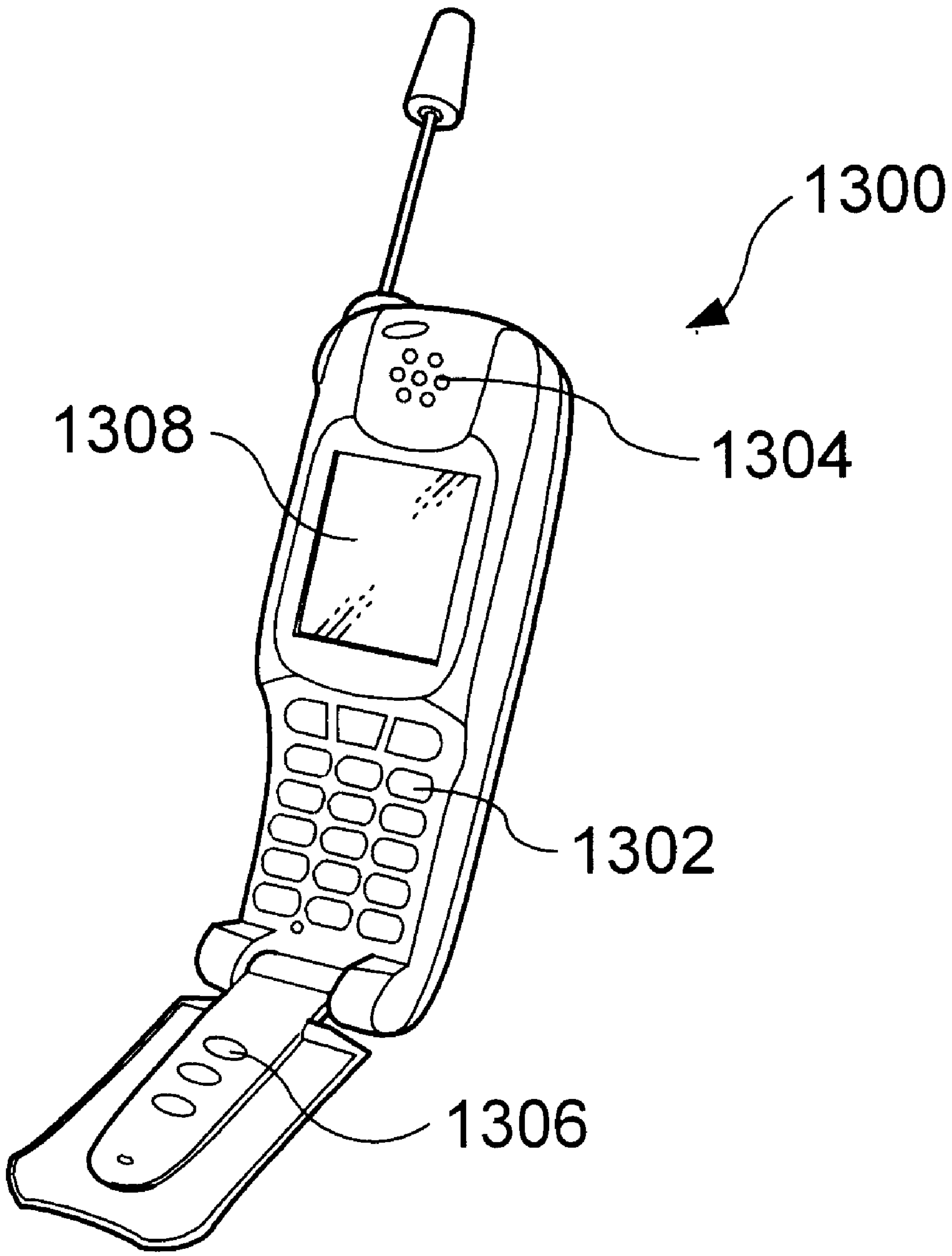
FIG. 58 is a perspective overview of a mobile phone using an electrophoretic device.

A portable, notebook computer in which the electrophoretic display is applied will now be exemplified. FIG. 57 is an external perspective view showing such a computer. As shown, the computer 1200 has a main unit 1204 on which a keyboard 1202 is mounted, and an electrophoretic display panel 1206. On the panel 1206, images are displayed via pigment particles 3. Consequently, it is unnecessary to mount a back light, which is required in transmission type and semi-transmission type of liquid crystal displays, thereby enabling the computer 1200 to be small, lightweight, and able to run on minimal power.

(7-3-2) Mobile Phone

A mobile phone provided with the electrophoretic display panel will now be exemplified. FIG. 41 is an external perspective view of a portable phone. As shown, a portable phone 1300 is provided with a plurality of operating buttons 1302, an earpiece 1304, a mouthpiece 1306, and an electrophoretic display panel 1308.

In liquid crystal displays, a polarizing plate is a requisite component for enabling a display screen to be darkened. In the electrophoretic display panel 1308, however, a polarizing plate is not required. Hence the portable phone 1300 is equipped with a bright and readily viewable screen.

Electronic devices other than those shown in FIGS. 39 to 41 include a TV monitor, outdoor advertising board; traffic sign; view-finder type or monitor-direct-viewing type display of a video tape recorder; car navigation device, pager; electronic note pad; electronic calculator; word processor; work station; TV telephone; POS terminal; devices having a touch panel; and others. Thus, the electrophoretic display panel according to each of the foregoing embodiments can be applied for use with such devices. Alternatively, an electro-optical apparatus having such electrophoretic display panel can also be applied to such devices.

What is claimed is:

1. A method for driving an electrophoretic display, the display comprising:

a first electrode;

a second electrode; and a dispersal system containing pigment particles which is provided between said first electrode and said second electrode; and the method comprising:

applying a constant voltage between said first electrode and said second electrode during a set time period to cause said particles to migrate to a position corresponding to a gradation which includes levels of gradation between zero and one hundred percent, to be displayed.

2. The method of claim 1, wherein when an image displayed is to be switched;

said constant voltage is applied during a time period corresponding to a gradation difference between a gradation displayed before and after switching.

3. The method of claim 1, wherein after application of said constant voltage;

a potential difference between said 1st electrode and said 2nd electrode is canceled.

4. The method of claim 1, wherein after application of said constant voltage;

a voltage for braking said pigment particles is applied between said 1st and said 2nd electrodes after applying said constant voltage before canceling said potential difference between said 1st and said 2nd electrodes.

5. The method of claim 1, further comprising:

measuring a time after finishing applying said constant voltage between said 1st and said 2nd electrodes; and applying said constant voltage between said 1st and said 2nd electrodes during said time period if said measured time exceeds a predetermined time.

6. A method for driving an electrophoretic display, the display comprising:

a plurality of data lines;

a plurality of scanning lines, each of which intersects said data lines;

a common electrode;

a plurality of pixel electrodes, with one of said plurality of pixel electrodes being provided at one of each of said intersections of said data lines and said scanning lines, each of said pixel electrodes being provided in opposing spaced relation to said common electrodes;

a plurality of dispersal systems comprising a pigment particles, with each of said dispersal systems being provided between said common electrode and one of said pixel electrodes; and a plurality of switching elements, with one of each of said switching elements being provided at a corresponding one of each of said intersections of said data lines and said scanning lines, with an on/off control terminal being connected to one of said scanning lines passing through one of said intersections; and with one of said data lines passing through one of said intersections, being connected to one of said pixel electrodes provided at one of each of said intersections; and the method comprising:

applying a predetermined common voltage to said common voltage;

selecting said scanning lines sequentially;

applying a voltage to said selected scanning line, to turn on all switching elements connected to the said selected scanning line;

applying a constant voltage to a plurality of said data lines in order to cause said pigment particles in said pixels being provided at said corresponding intersections of the said data lines and the said selected scanning line, to cause said particles to migrate to a position to desired color gradations of an image displayed in the said pixels, during a time period corresponding to said desired color gradations.

7. The method of claim 6, wherein when an image displayed to be switched;

said constant voltage is applied during a time period corresponding to a gradation difference between a gradation displayed before and after switching said image.

8. The method of claim 6, wherein after application of said constant voltage to said data lines;

a brake voltage for braking said pigment particles is applied to the said data lines before applying said common voltage to the said data lines.

9. A method for driving an electrophoretic display, the display comprising:

a plurality of data lines;

a plurality of scanning lines, each of which intersects said data lines;

a common electrode;

a plurality of pixel electrodes, with one of said plurality of pixel electrodes being provided at one of each of said intersections of said data lines and said scanning lines, each of said pixel electrodes being provided in opposing spaced relation to said common electrodes;

a plurality of dispersal systems comprising a pigment particles, with each of said dispersal systems being provided between said common electrode and one of said pixel electrodes; and a plurality of switching elements, with one of each of said switching elements being provided at a corresponding one of each of said intersections of said data lines and said scanning lines, with on/off control terminal being connected to one of said scanning lines passing through one of said intersections; and with one of said data lines passing through one of said intersections, being connected to one of said pixel electrodes provided at one of each of said intersections; and the method comprising:

applying a predetermined common voltage to said common electrode;

selecting said scanning lines sequentially in a 1st period of a horizontal scanning period;

applying a selection voltage to said selected scanning line, to turn on all switching elements connected to the said selected scanning line;

applying a constant voltage to each said selected data line;

when a time for migrating said pigment particles in said pixels to a position corresponding to a color gradation to be displayed passes after finishing application of said constant voltage;

selecting said scanning line corresponding to the pixels in a second period of a horizontal scanning period;

applying said selection voltage to the selected scanning line; and applying said common voltage only to said data lines corresponding to the pixels in said second period.

10. A method for driving an electrophoretic display, the display comprising:

a plurality of data lines;

a plurality of scanning lines, each of which intersects said data lines;

a common electrode;

a plurality of pixel electrodes, with one of said plurality of pixel electrodes being provided at one of each of said intersections of said data lines and said scanning lines, each of said pixel electrodes being provided in opposing spaced relation to said common electrodes;

a plurality of dispersal systems comprising a pigment particles, with each of said dispersal systems being provided between said common electrode and one of said pixel electrodes; and a plurality of switching elements, with one of each of said switching elements being provided at a corresponding one of each of said intersections of said data lines and said scanning lines, with on/off control terminal being connected to one of said scanning lines passing through one of said intersections; and with one of said data lines passing through one of said intersections, being connected to one of said pixel electrodes provided at one of each of said intersections; and the method comprising:

applying a predetermined common voltage to said common voltage;

selecting said scanning lines sequentially in a 1st period of a horizontal scanning period;

applying a selection voltage to said selected scanning line, to turn on all switching elements connected to the said selected scanning lines;

applying a constant voltage to each the said selected data line;

when a time for migrating said pigment particles in said pixels to a position corresponding to a color gradation to be displayed passes after finishing application of said constant voltage;

selecting said scanning line corresponding to the said pixels in a second period of a horizontal scanning period;

applying said selection voltage to the said selected scanning lines; and applying a brake voltage for braking said pigment particles only to said data lines corresponding to the said pixels in said second period;

after said particles are fixed;

selecting the said scanning line corresponding to the said pixels in a 3rd period;

applying said selection voltage to the said selected scanning lines; and applying said common voltage to the said selected data lines in said 3rd period.

11. The method of claim 9, wherein when an image displayed to be switched;

said period of applying said constant voltage, which starts from finishing applying of said constant voltage and ends with selecting the said scanning line corresponds to a gradation difference between a gradation displayed before and after switching.

12. A drive circuit for an electrophoretic display, the display comprising:

a plurality of data lines;

a plurality of scanning lines, each of which intersects said data lines;

a common electrode;

a plurality of pixel electrodes, with one of said plurality of pixel electrodes being provided at one of each of said intersections of said data lines and said scanning lines, each of said pixel electrodes being provided in opposing spaced relation to said common electrodes;

a plurality of dispersal systems comprising a pigment particles, with each of said dispersal systems being provided between said common electrode and one of said pixel electrodes; and a plurality of switching elements, with one of each of said switching elements being provided at a corresponding one of each of said intersections of said data lines and said scanning lines, with an on/off control terminal being connected to one of said scanning lines passing through one of said intersections; and with one of said data lines passing through one of said intersections, being connected to one of said pixel electrodes provided at one of each of said intersections; and the circuit comprising:

an applying unit, which applies a predetermined common voltage to said common electrode;

a scanning line drive unit, which selects said scanning lines sequentially and applies a selection voltage to said selected scanning line, to turn on all switching elements connected to the said selected scanning line; and a data line drive unit, which in a certain period of a selected scanning line, after applying a constant voltage during a time period to cause said pigment particles of each pixel to migrate to a position corresponding to the said selected scanning line to a position according to a color gradation of an image of each of said pixel, applies said common voltage to each of said pixel.

13. The drive circuit of claim 12, wherein said data line drive unit comprising:

after applying said constant voltage to each of the said data line;

applying a brake voltage to each the said data line before applying said common voltage to each the said data line.

14. A drive circuit for an electrophoretic display, the display comprising:

a plurality of data lines;

a plurality of scanning lines, each of which intersects said data lines;

a common electrode;

a plurality of pixel electrodes, with one of said plurality of pixel electrodes being provided at one of each of said intersections of said data lines and said scanning lines, each of said pixel electrodes being provided in opposing spaced relation to said common electrodes;

a plurality of dispersal systems comprising a pigment particles, with each of said dispersal systems being provided between said common electrode and one of said pixel electrodes; and a plurality of switching elements, with one of each of said switching elements being provided at a corresponding one of each of said intersections of said data lines and said scanning lines, with an on/off control terminal being connected to one of said scanning lines passing through one of said intersections; and with one of said data lines passing through one of said intersections, being connected to one of said pixel electrodes provided at one of each of said intersections; and the circuit comprising:

an applying unit, which applies a predetermined common voltage to said common electrode;

a scanning line drive unit, which selects said scanning lines sequentially and applies a selection voltage to said selected scanning line, to turn on all switching elements connected to said selected scanning line in a 1st period of each horizontal scanning period;

when a time for migrating said pigment particles in said pixels to a position corresponding to a color gradation to be displayed passes after finishing application of said constant voltage;

selects said scanning line corresponding to the said pixels in a second period of a horizontal scanning period; and applies said selection voltage to the said selected scanning line; and a data line drive unit, which applies a constant voltage to all said data lines in said 1st period of each of said horizontal scanning period and applies said common voltage only to the said data lines corresponding to the said pixels in said 2nd period.

15. A drive circuit for an electrophoretic display, the display comprising:

a plurality of data lines;

a plurality of scanning lines, each of which intersects said data lines;

a common electrode;

a plurality of pixel electrodes, with one of said plurality of pixel electrodes being provided at one of each of said intersections of said data lines and said scanning lines, each of said pixel electrodes being provided in opposing spaced relation to said common electrodes;

a plurality of dispersal systems comprising a pigment particles, with each of said dispersal systems being provided between said common electrode and one of said pixel electrodes; and a plurality of switching elements, with one of each of said switching elements being provided at a corresponding one of each of said intersections of said data lines and said scanning lines, with on/off control terminal being connected to one of said scanning lines passing through one of said intersections; and with one of said data lines passing through one of said intersections, being connected to one of said pixel electrodes provided at one of each of said intersections; and the circuit comprising:

an applying unit, which applies a predetermined common voltage to said common electrode;

a scanning line drive unit, which selects said scanning lines sequentially in a 1st period of a horizontal scanning period having said 1st, a 2nd, and 3rd period;

when a time for migrating said pigment particles in said pixel at an intersection of said scanning line and said data line to positions corresponding to a color gradation to be displayed passes after selection of the said scanning line;

selects said selected scanning line in said 2nd period; and when a predetermined time passes, selects said selected scanning line in said 3rd period; and a data line drive unit, which applies a constant voltage to all said data lines in said 1st period in which the said scanning line is selected;

applies a brake voltage for braking the said pigment particles in said 2nd period in which the said scanning line is selected to the said data lines; and applies said common voltage to the said data lines in said 3rd period in which the said scanning line is selected.

16. The circuit of claim 14, wherein when an image displayed to be switched;

said constant voltage is applied during a time period corresponding to a gradation difference between a gradation displayed before and after switching said image.

17. An electronic device, comprising:

an electrophoretic display panel, comprising:

a plurality of data lines;

a plurality of scanning lines, each of which intersects said data lines;

a common electrode;

a plurality of pixel electrodes, with one of said plurality of pixel electrodes being provided at one of each of said intersections of said data lines and said scanning lines, each of said pixel electrodes being provided in opposing spaced relation to said common electrodes;

a plurality of dispersal systems comprising pigment particles, with each of said dispersal systems being provided between said common electrode and one of said pixel electrodes; and a plurality of switching elements, with one of each of said switching elements being provided at a corresponding one of each of said intersections of said data lines and said scanning lines, with on/off control terminal being connected to one of said scanning lines passing through one of said intersections; and with one of said data lines passing through one of said intersections, being connected to one of said pixel electrodes provided at one of each of said intersections;

an applying unit, which applies a predetermined common voltage to said common electrode;

a scanning line drive unit, which selects said scanning lines sequentially and applies a selection voltage to said selected scanning lines, to turn on all switching elements connected to said selected scanning lines; and a data line drive unit, which in a certain period of a selected scanning line, after applying a constant voltage during a time period to cause said pigment particles of each pixel to migrate to a position corresponding to the said selected scanning line to a position according to a color gradation of an image of each of said pixel, applies said common voltage to each of said pixel.

18. The method of claim 10, wherein when an image displayed to be switched;

said period of applying said constant voltage, which starts from finishing applying of said constant voltage and ends with selecting the said scanning line corresponds to a gradation difference between a gradation displayed before and after switching.

19. The circuit of claim 15, wherein when an image displayed to be switched;

said constant voltage is applied during a time period corresponding to a gradation difference between a gradation displayed before and after switching said image.

* * * * *